(12) United States Patent
Lee

(10) Patent No.: US 12,132,909 B2
(45) Date of Patent: Oct. 29, 2024

(54) IMAGE ENCODING/DECODING METHOD AND APPARATUS

(71) Applicant: INTELLECTUAL DISCOVERY CO., LTD., Seoul (KR)

(72) Inventor: Bae Keun Lee, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 328 days.

(21) Appl. No.: 17/440,248

(22) PCT Filed: Mar. 26, 2020

(86) PCT No.: PCT/KR2020/004136
§ 371 (c)(1),
(2) Date: Sep. 17, 2021

(87) PCT Pub. No.: WO2020/197290
PCT Pub. Date: Oct. 1, 2020

(65) Prior Publication Data
US 2022/0174287 A1    Jun. 2, 2022

(30) Foreign Application Priority Data

Mar. 26, 2019 (KR) .................... 10-2019-0034020

(51) Int. Cl.
*H04N 19/137* (2014.01)
*H04N 19/159* (2014.01)
(Continued)

(52) U.S. Cl.
CPC ......... *H04N 19/137* (2014.11); *H04N 19/159* (2014.11); *H04N 19/176* (2014.11); *H04N 19/513* (2014.11)

(58) Field of Classification Search
CPC .. H04N 19/137; H04N 19/159; H04N 19/176; H04N 19/513; H04N 19/52;
(Continued)

(56) References Cited

U.S. PATENT DOCUMENTS

2021/0185328 A1* 6/2021 Xu ........................ H04N 19/117
2021/0321096 A1* 10/2021 Ahn ..................... H04N 19/176
2021/0329288 A1* 10/2021 Wang ................... H04N 19/105

FOREIGN PATENT DOCUMENTS

KR    10-2015-0145688 A    12/2015
KR    10-2016-0132952 A    11/2016
(Continued)

OTHER PUBLICATIONS

Naeri Park et al., "CE4-related: Candidates optimization on MMVD", JVET-M0307-v2, Joint Video Experts Team of ITU-T SG 16 WP 3 and ISO/IEC JTC 1/SC 29/WG 11, 13th Meeting, Marrakech, MA, Jan. 9-18, 2019, 7pages.
(Continued)

*Primary Examiner* — Nasim N Nirjhar
(74) *Attorney, Agent, or Firm* — BROADVIEW IP LAW, PC

(57) ABSTRACT

An image encoding/decoding method and apparatus according to the present invention may generate a prediction block of a current block on the basis of a pre-defined prediction mode, generate a residual block of the current block on the basis of a predetermined transformation type, and reconstruct the current block on the basis of the prediction block and the residual block.

10 Claims, 48 Drawing Sheets

(51) Int. Cl.
*H04N 19/176* (2014.01)
*H04N 19/513* (2014.01)

(58) Field of Classification Search
CPC .... H04N 19/119; H04N 19/12; H04N 19/186; H04N 19/70; H04N 19/53; H04N 19/139
See application file for complete search history.

(56) References Cited

FOREIGN PATENT DOCUMENTS

| | | | |
|---|---|---|---|
| KR | 20200113346 A | * 10/2020 | |
| WO | WO-2016057701 A1 | * 4/2016 | ........... H04N 19/176 |
| WO | 2018/175720 A1 | 9/2018 | |
| WO | 2018/231700 A1 | 12/2018 | |

OTHER PUBLICATIONS

International Search Report for PCT/KR2020/004136 dated Jun. 26, 2020 [PCT/ISA/210].

\* cited by examiner

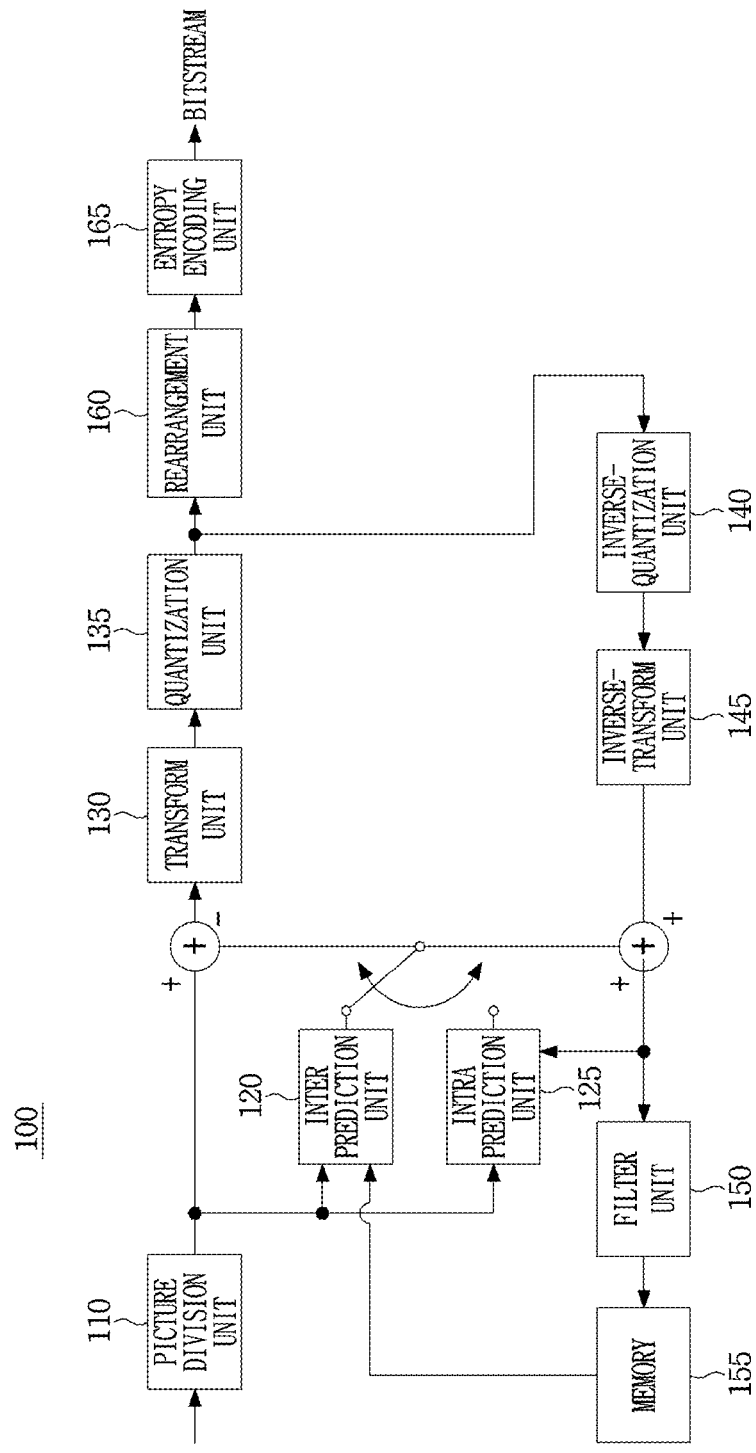
[FIG. 1]

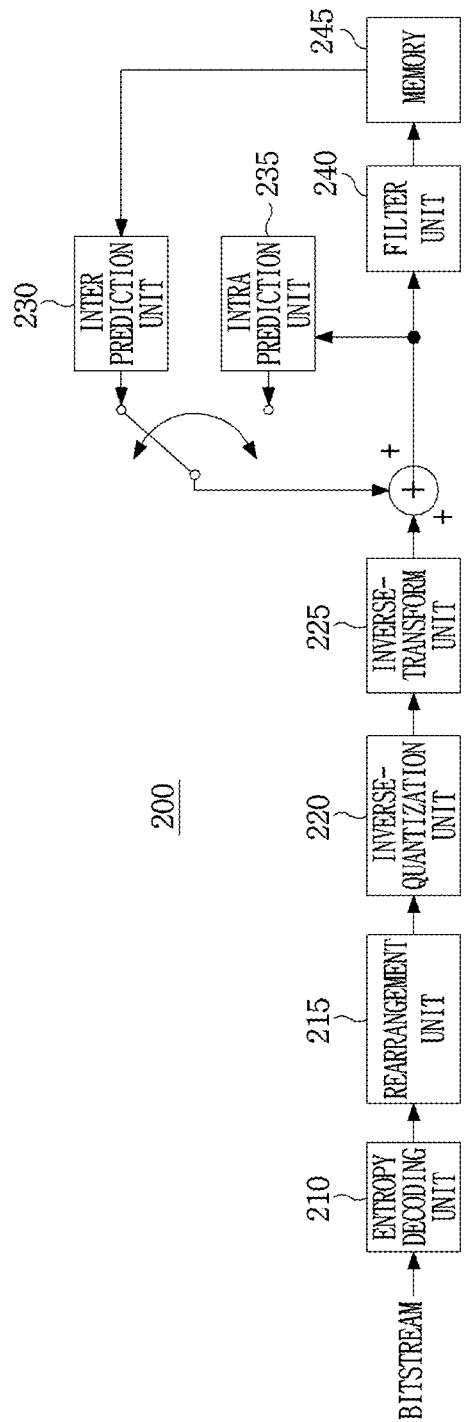
[FIG. 2]

[FIG. 3]
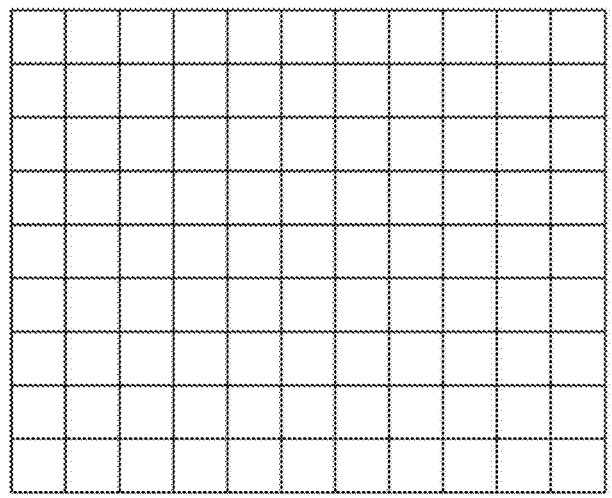

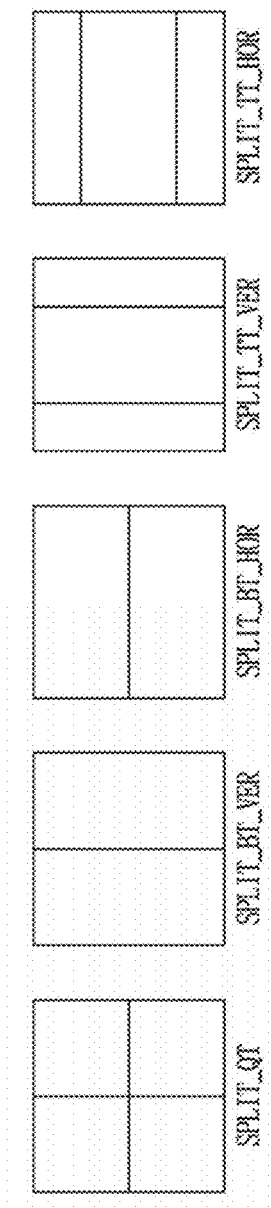
[FIG. 4]

[FIG. 5]
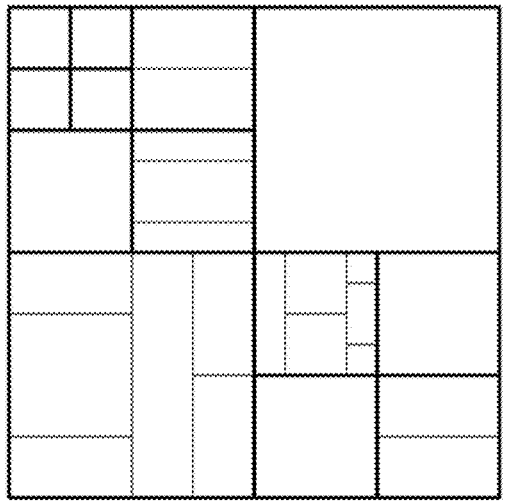
[FIG. 6]
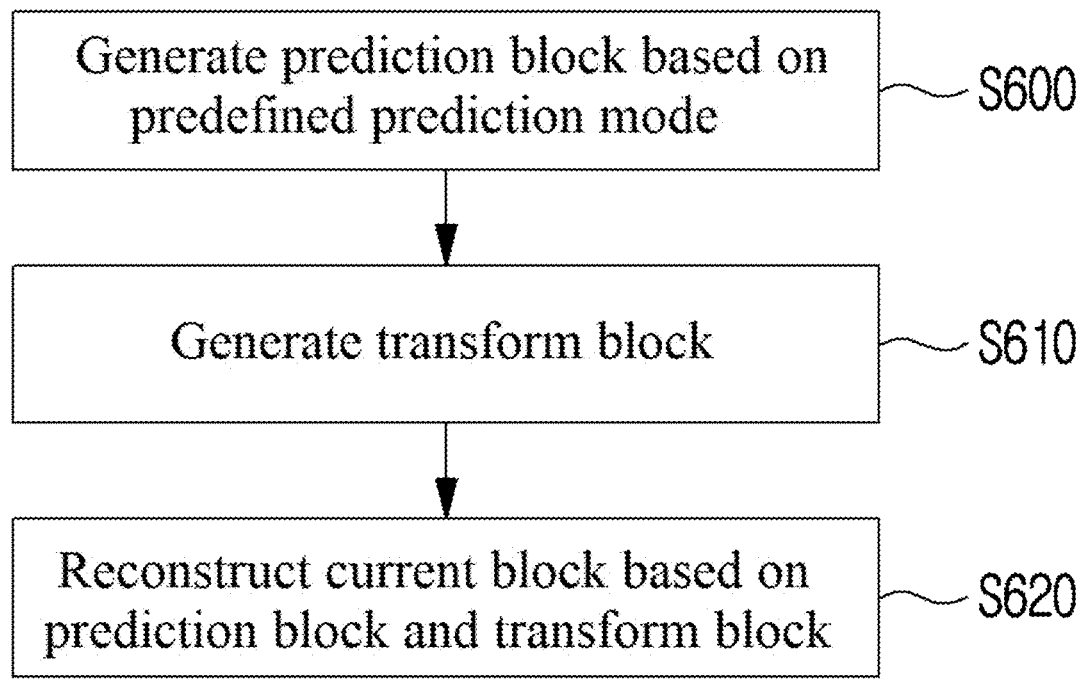

[FIG. 7]
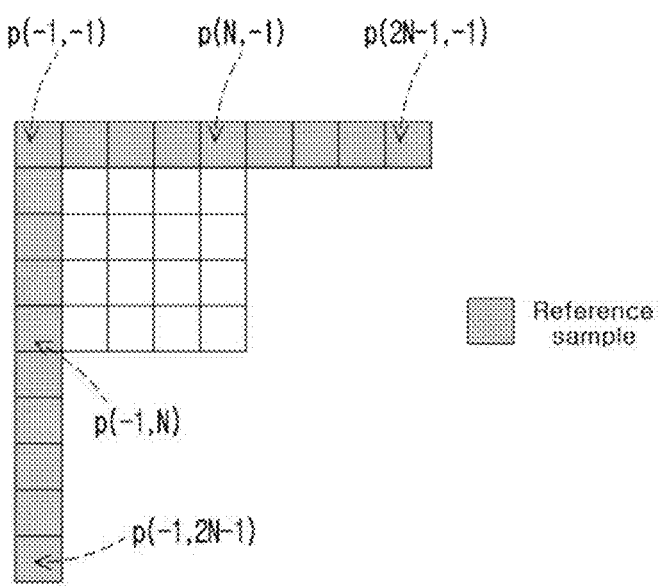

[FIG. 8]
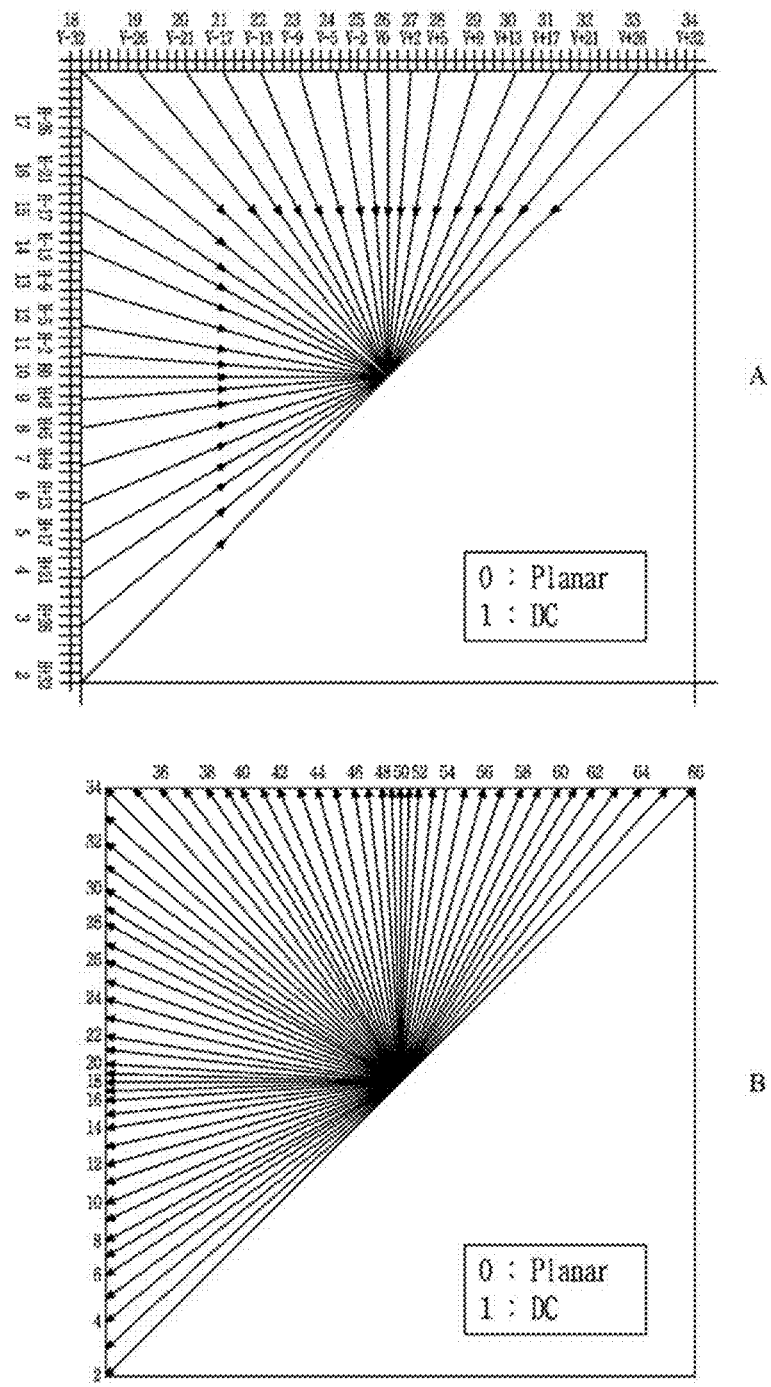
A
B

[FIG. 9]
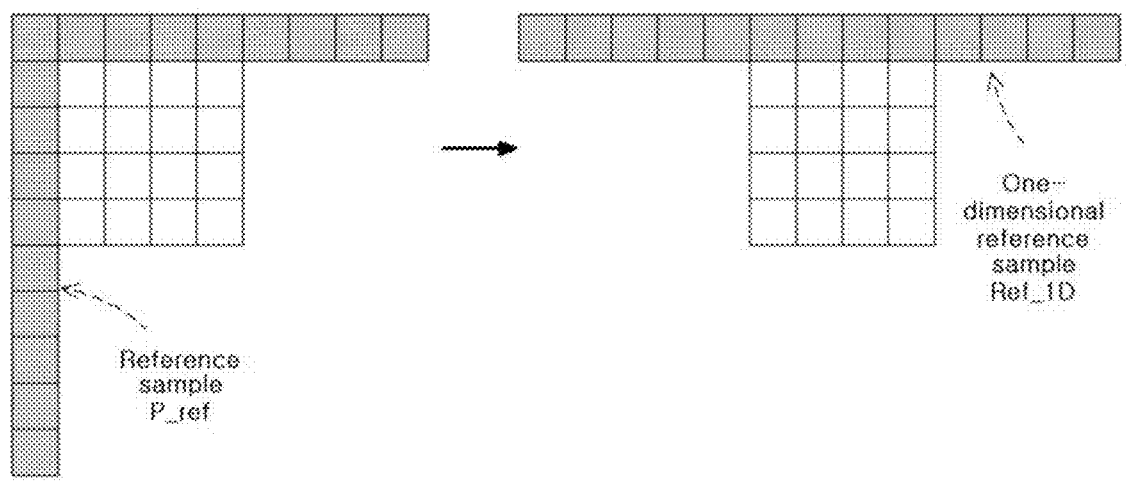

[FIG. 10]
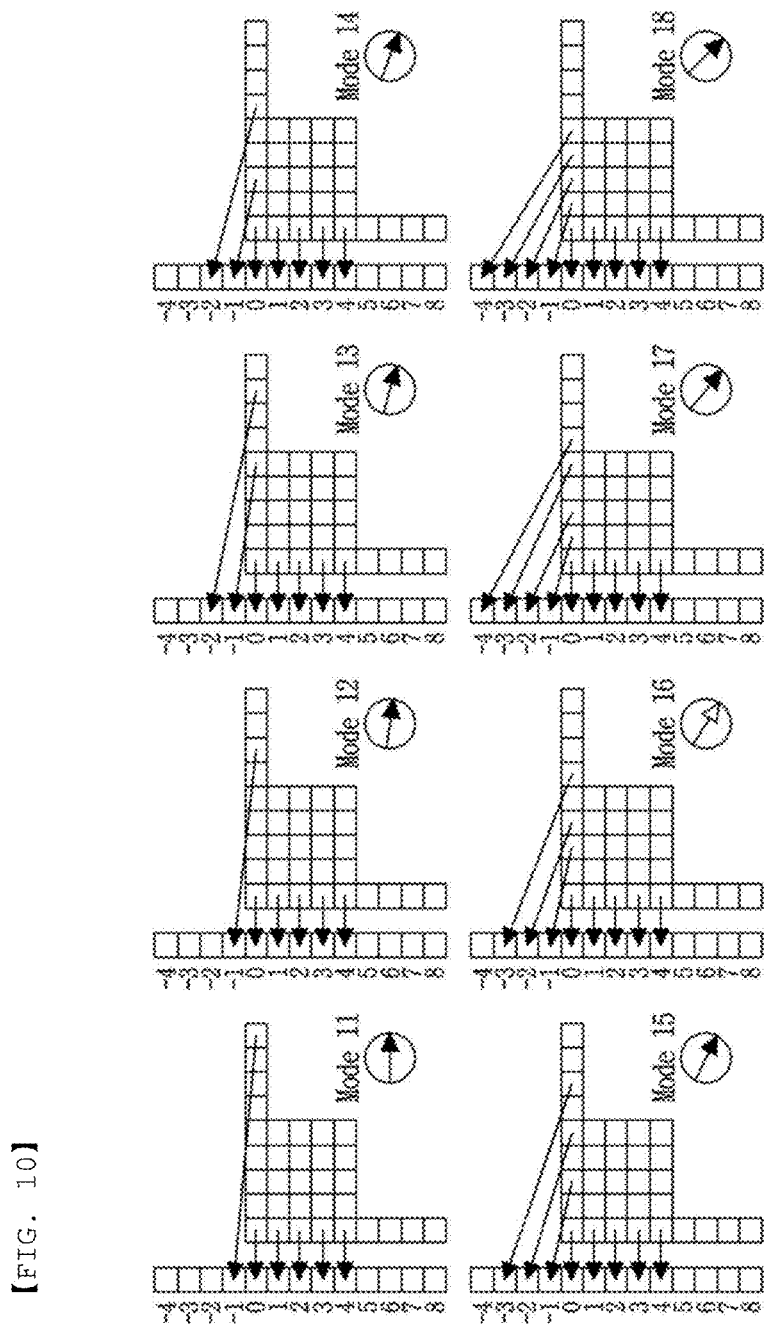

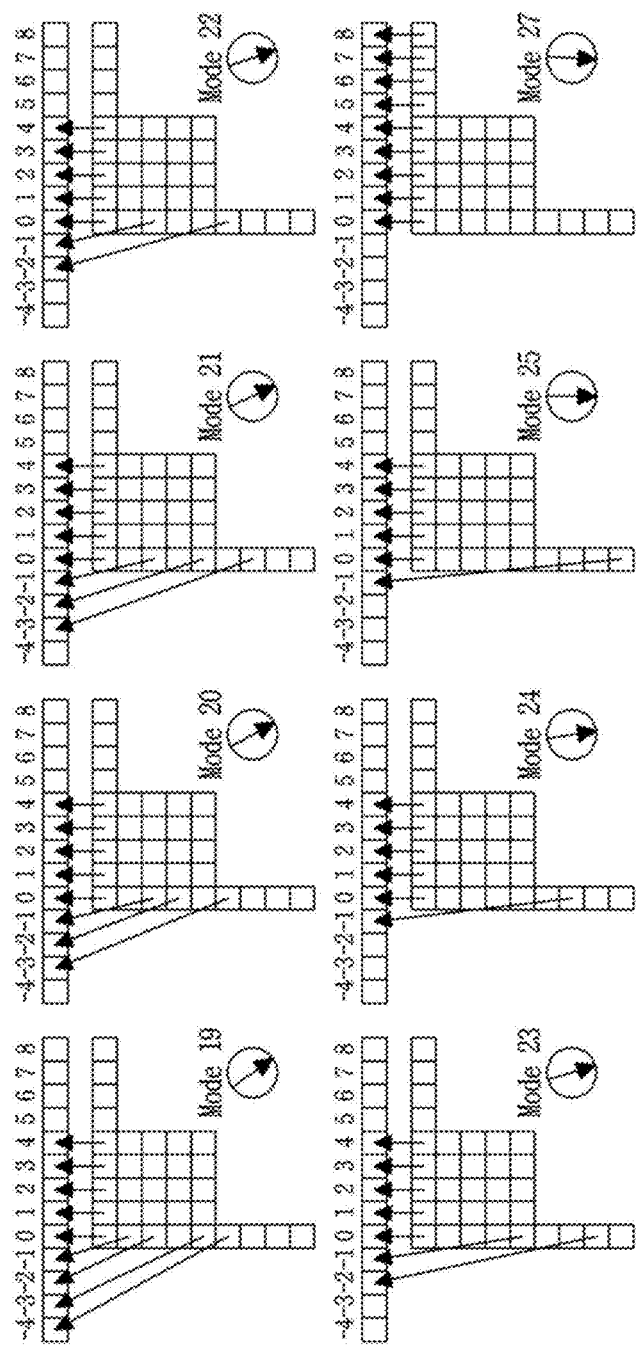
[FIG. 11]

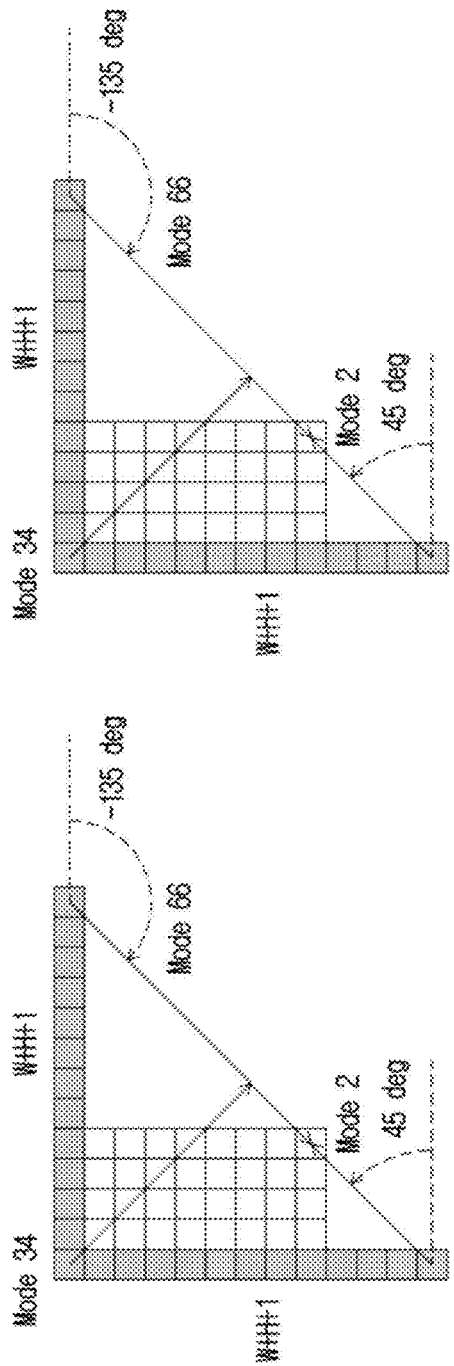
[FIG. 12]

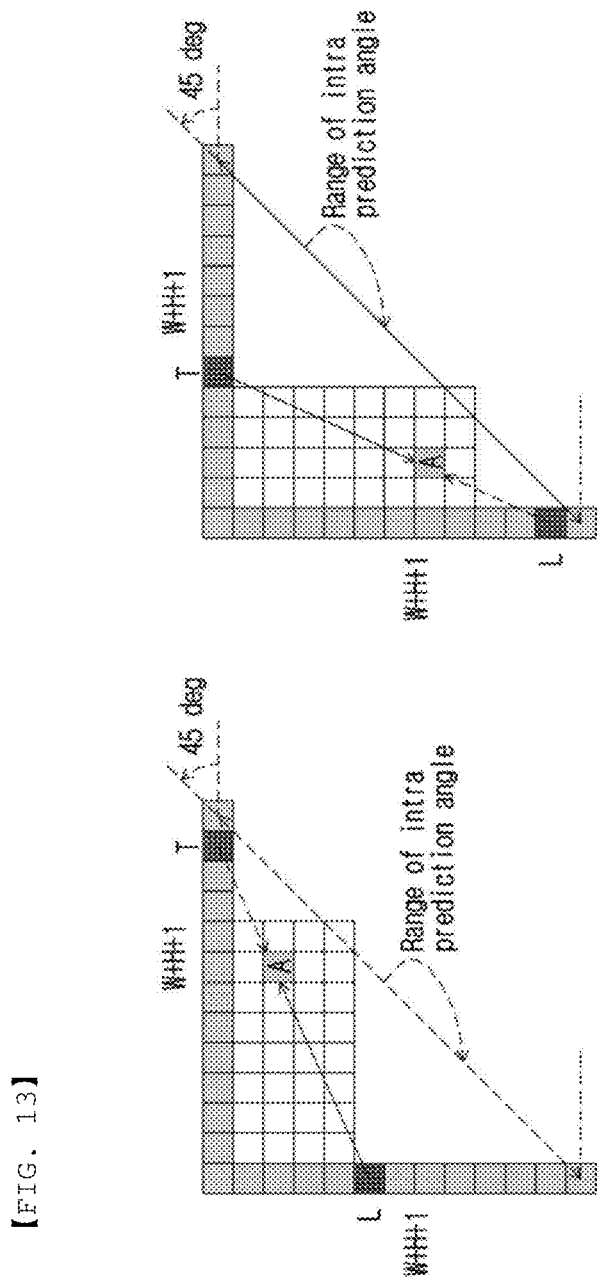
[FIG. 13]

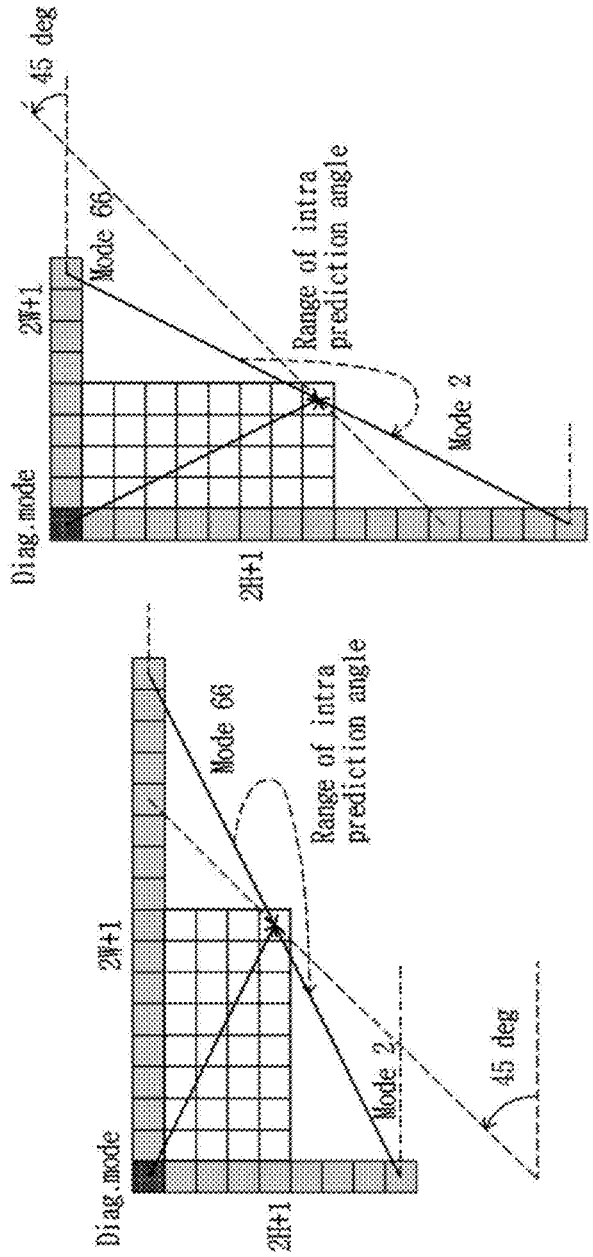
[FIG. 14]

[FIG. 15]
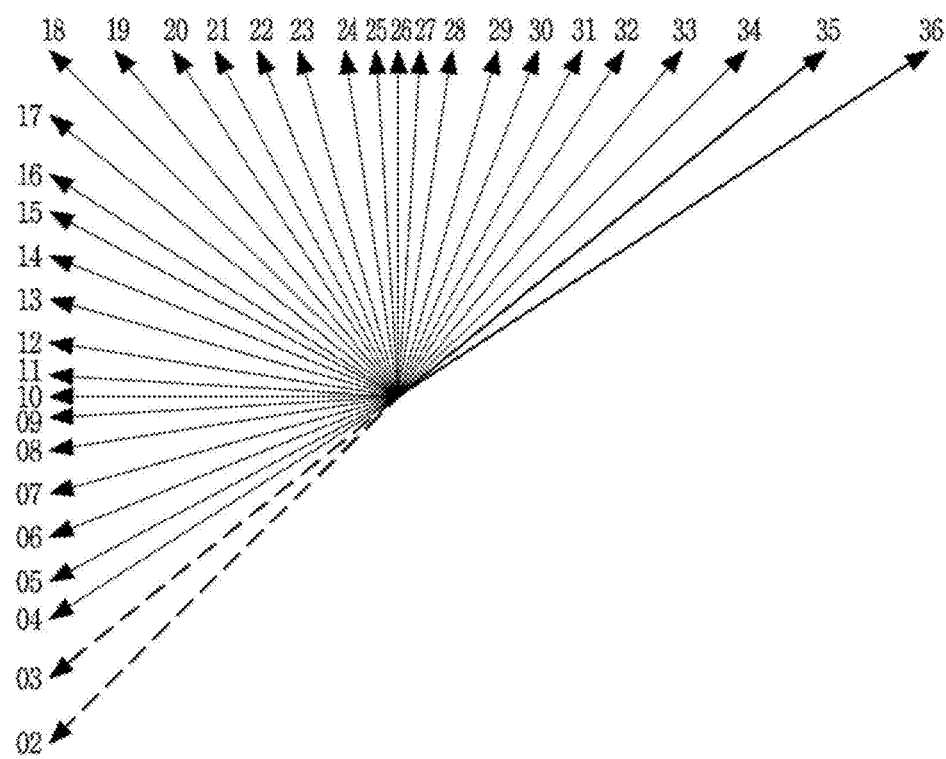

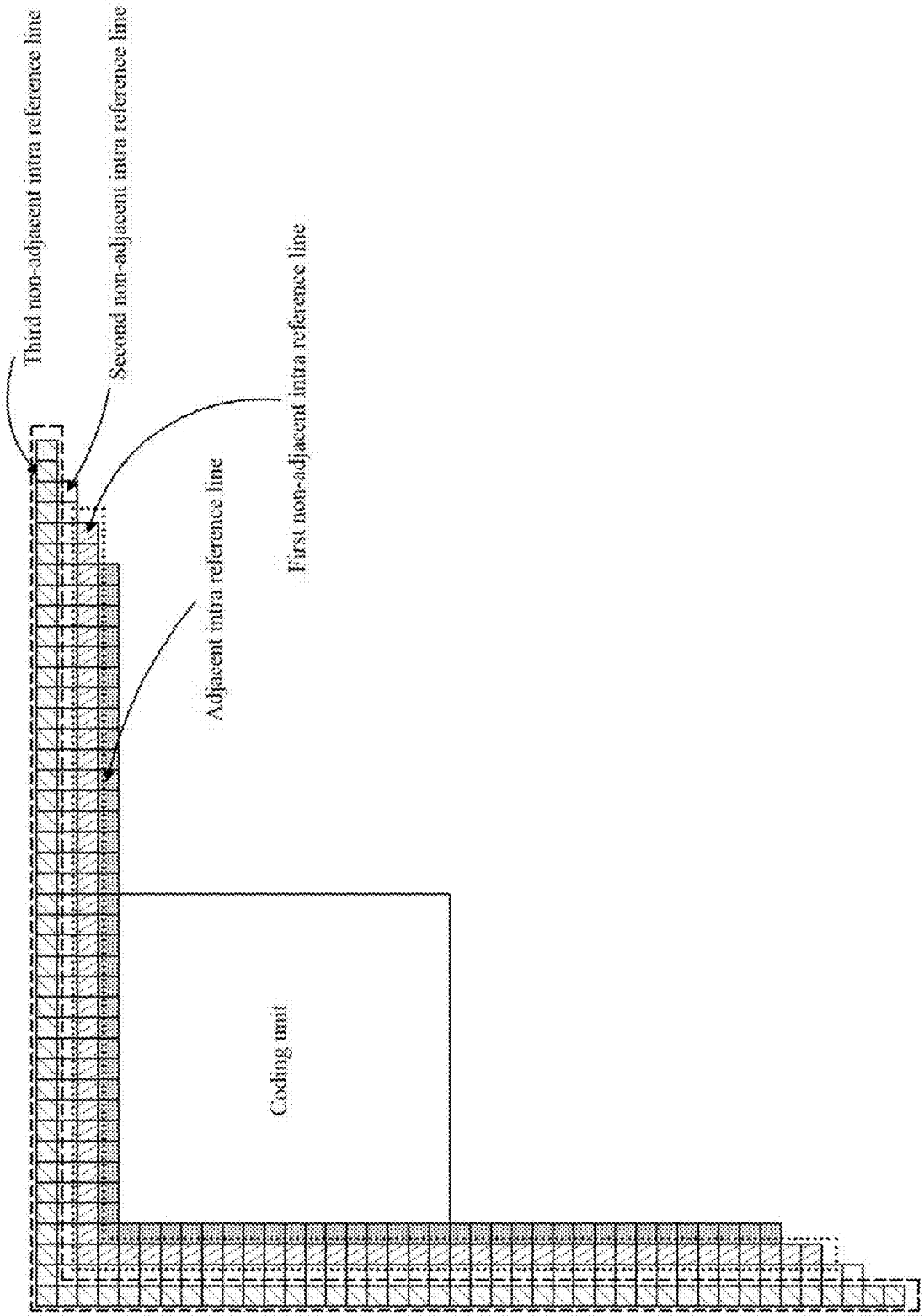
[FIG. 16]

[FIG. 17]
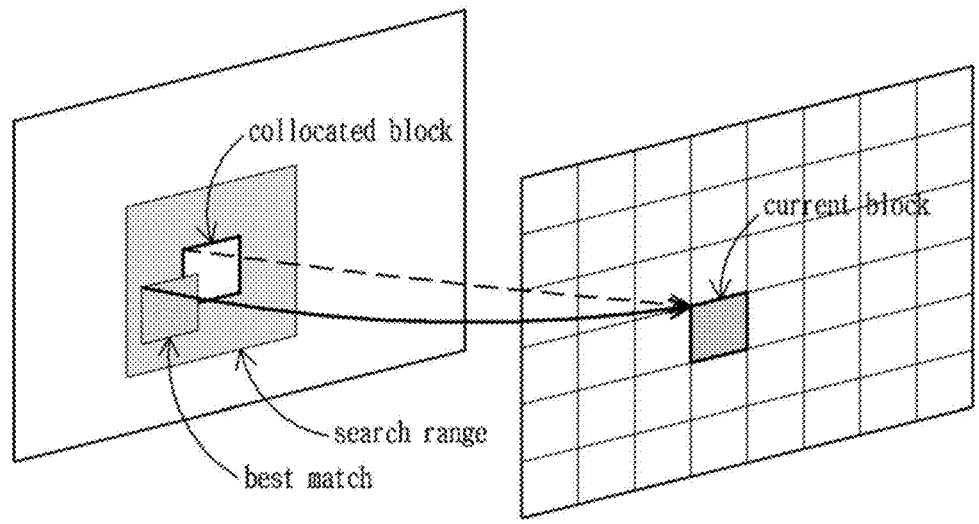
[FIG. 18]
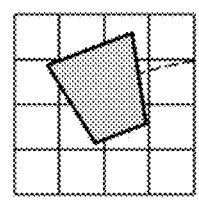 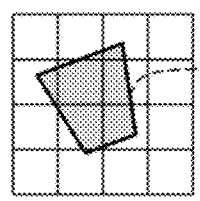
Rotation  Zoom-in
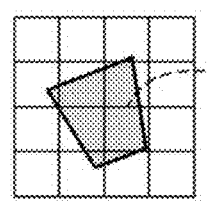 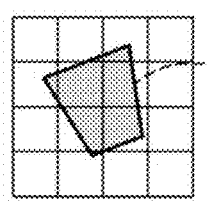
Zoom-out  Affine Tranform

[FIG. 19]
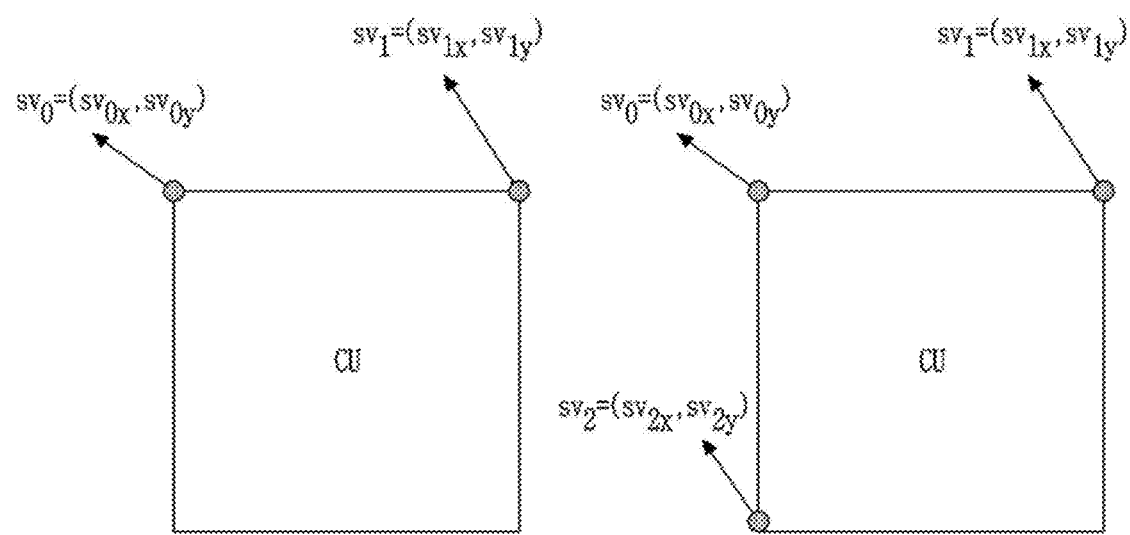
[FIG. 20]
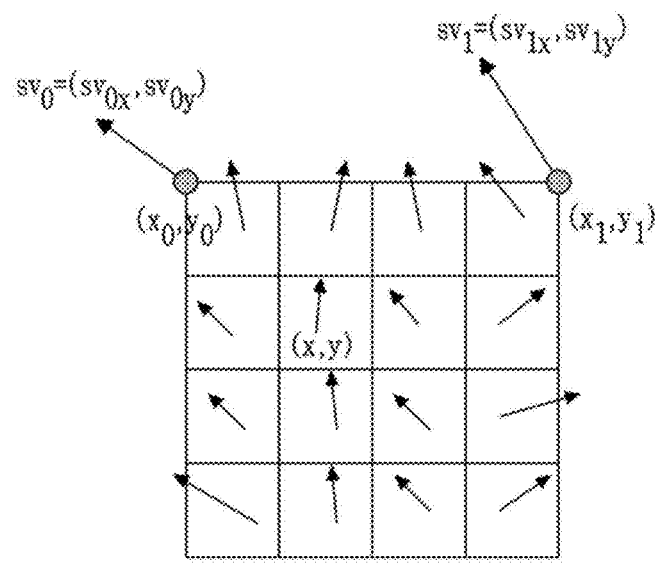

[FIG. 21]
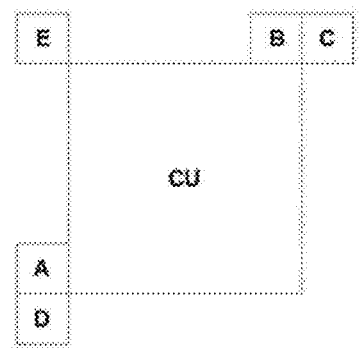
[FIG. 22]
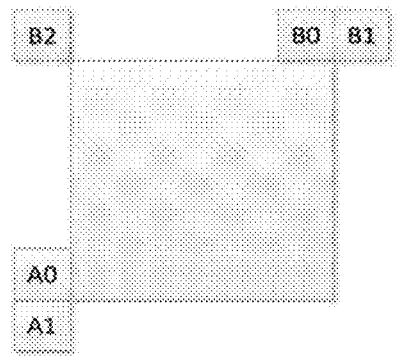
[FIG. 23]
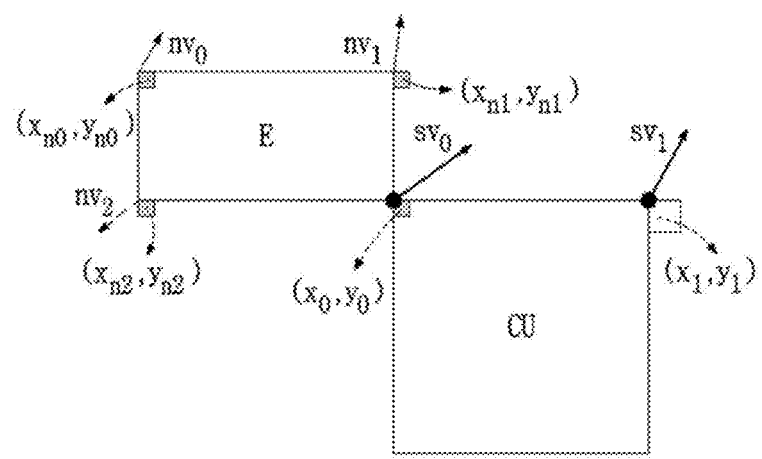

[FIG. 24]
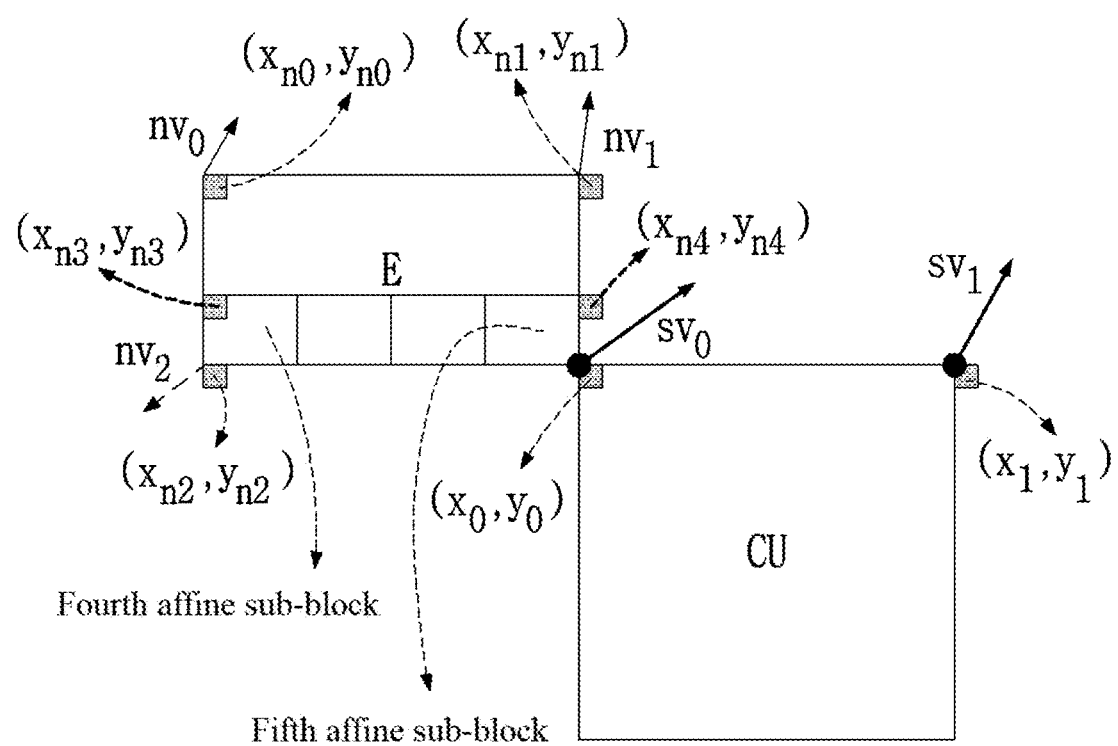

[FIG. 25]
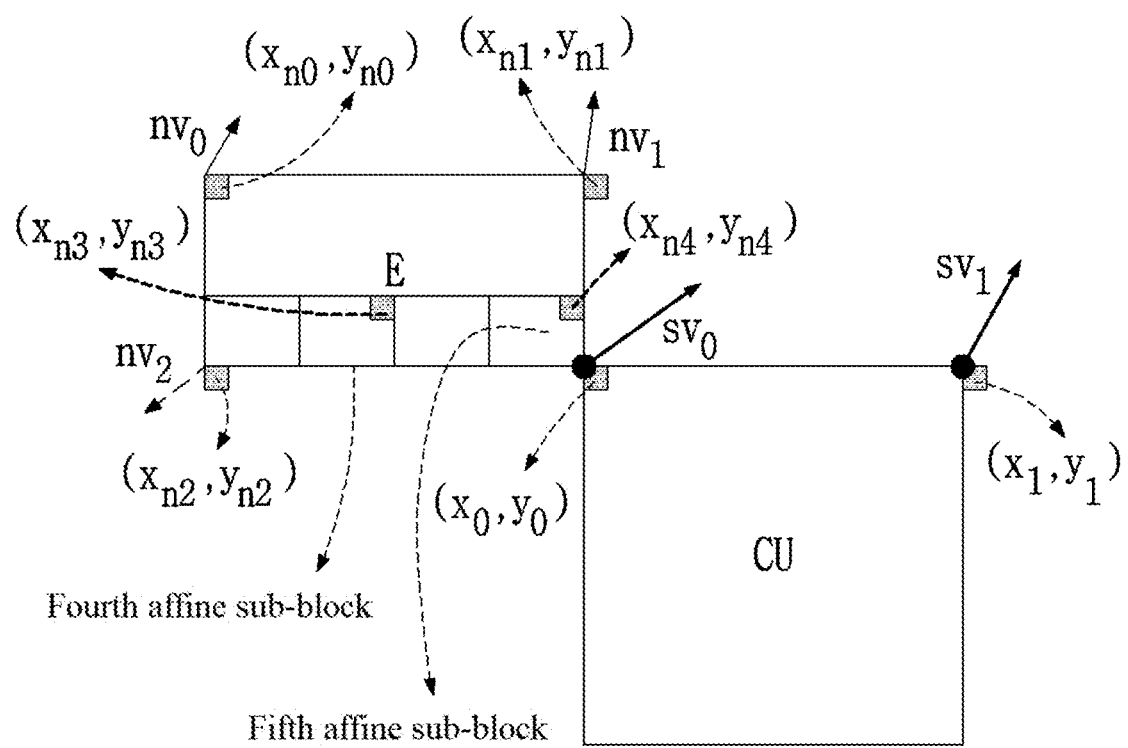

[FIG. 26]
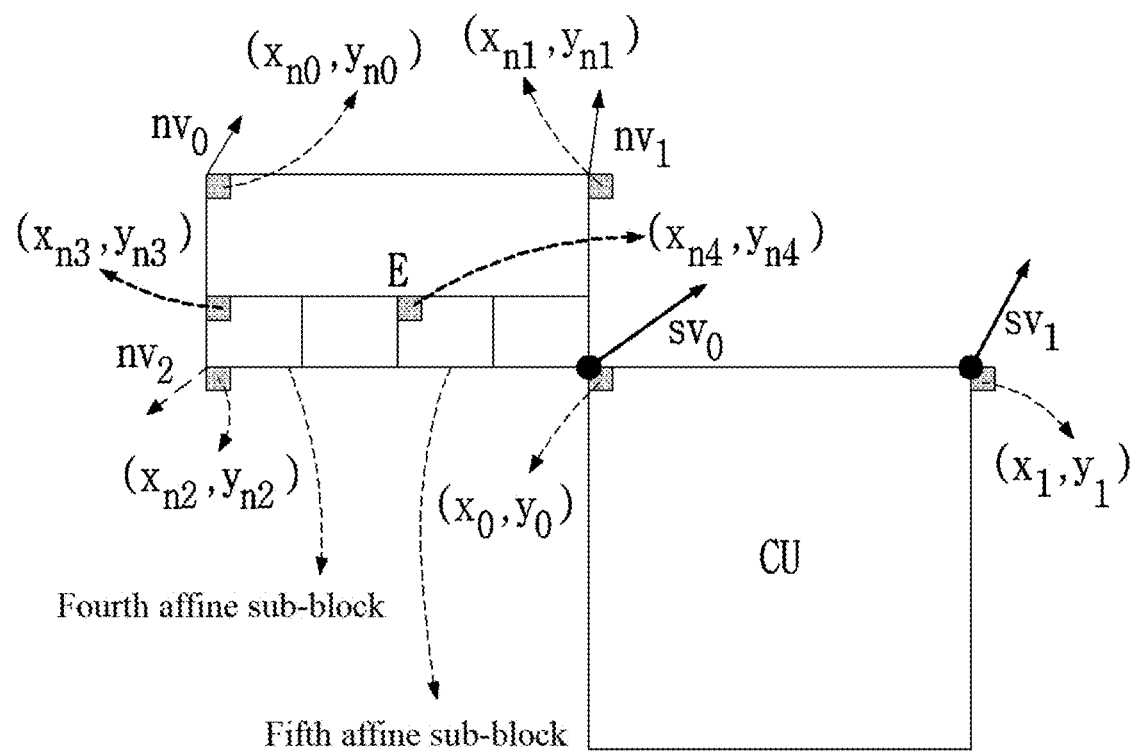

[FIG. 27]
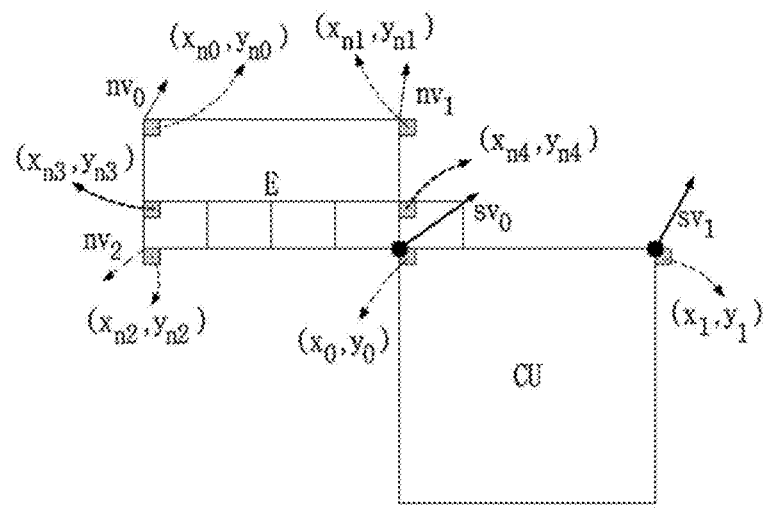
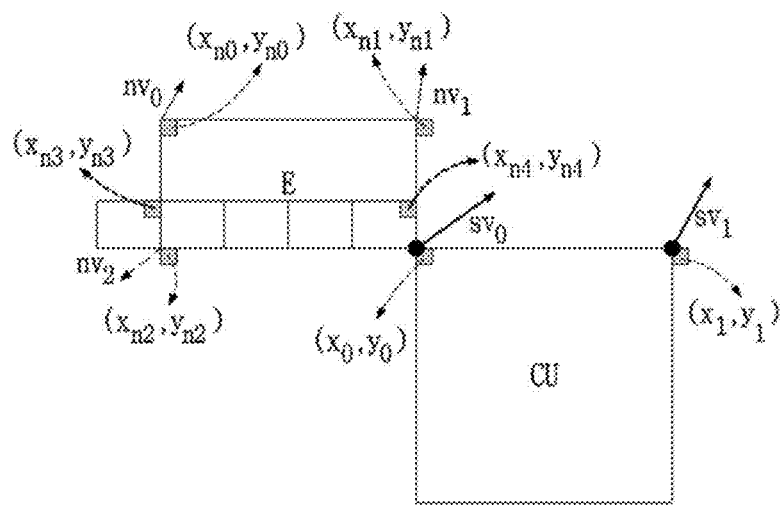

[FIG. 28]
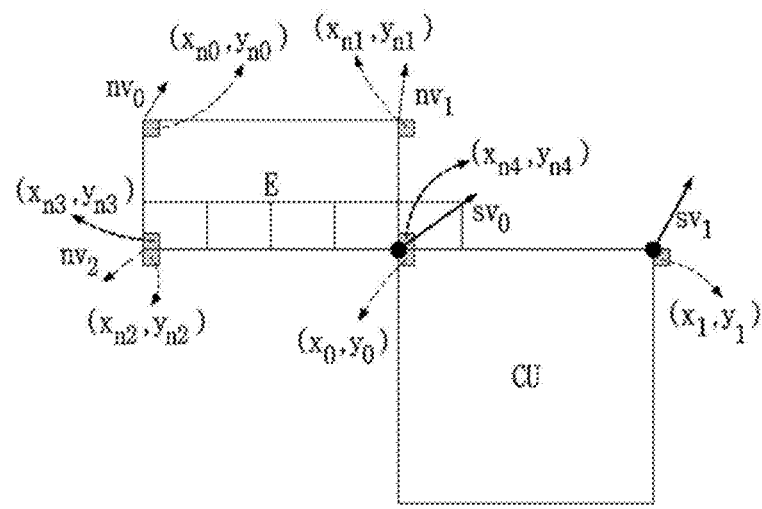
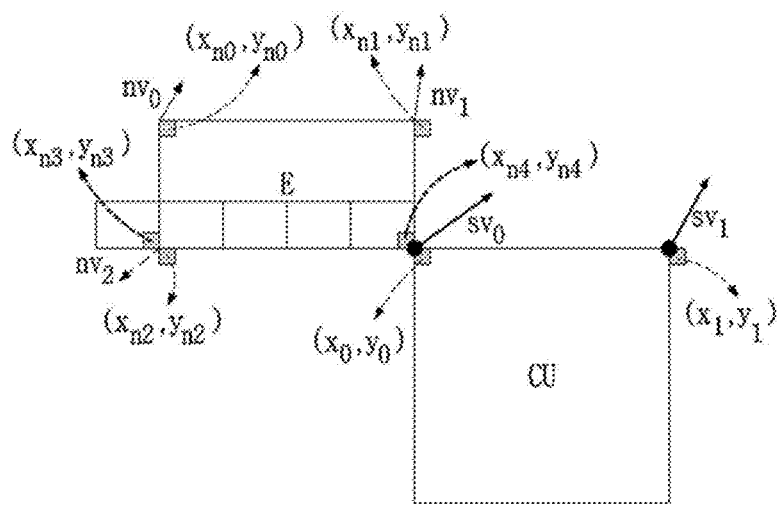

[FIG. 29]
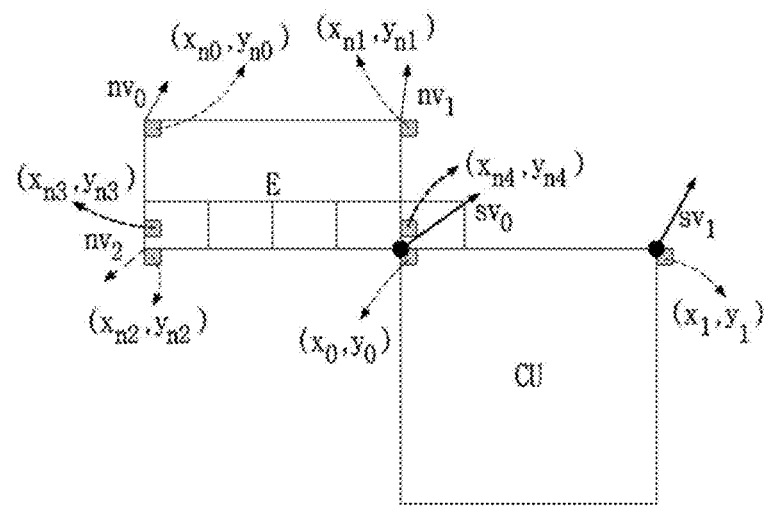
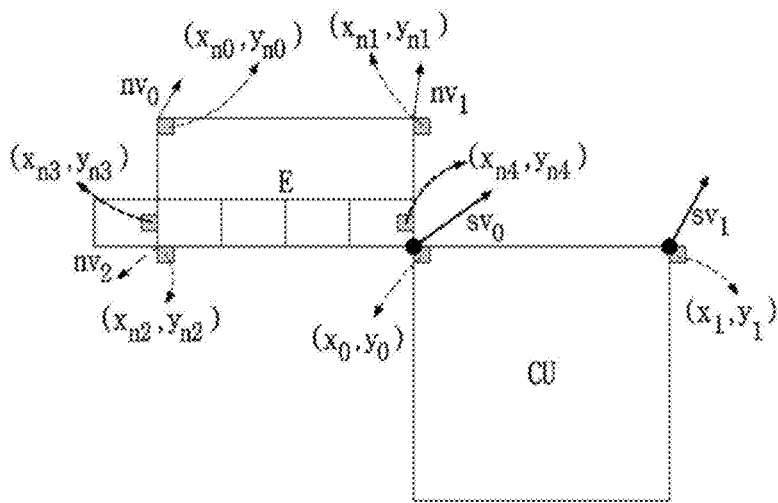

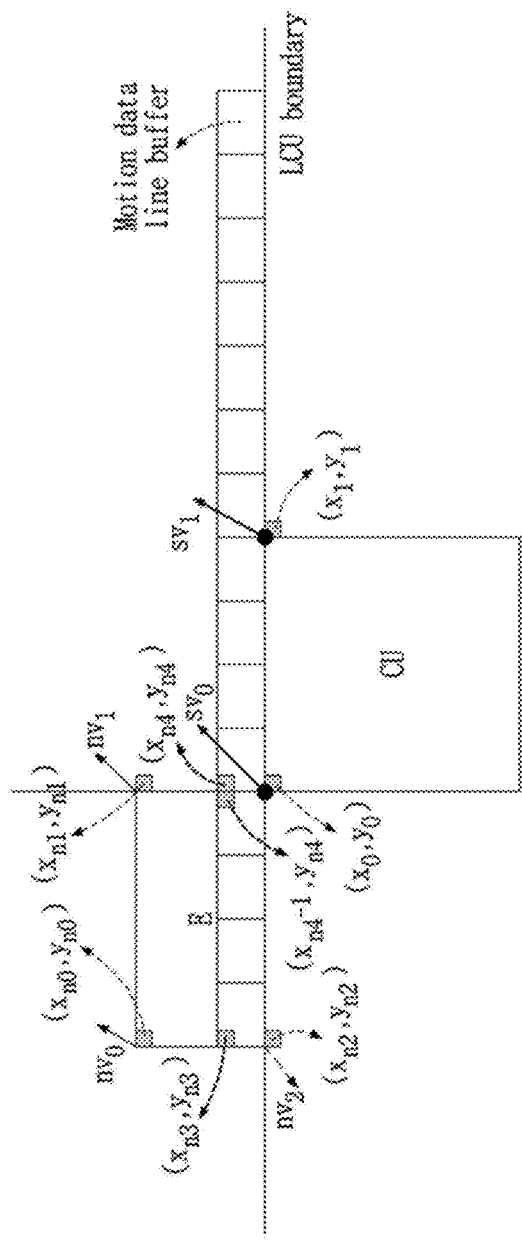
[FIG. 30]

[FIG. 31]
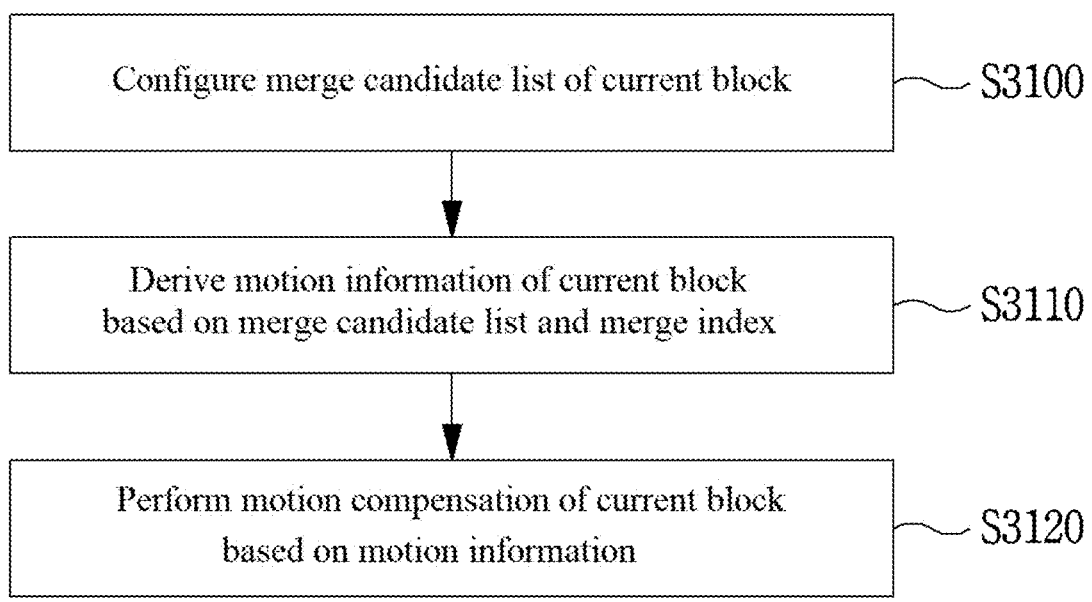

[FIG. 32]
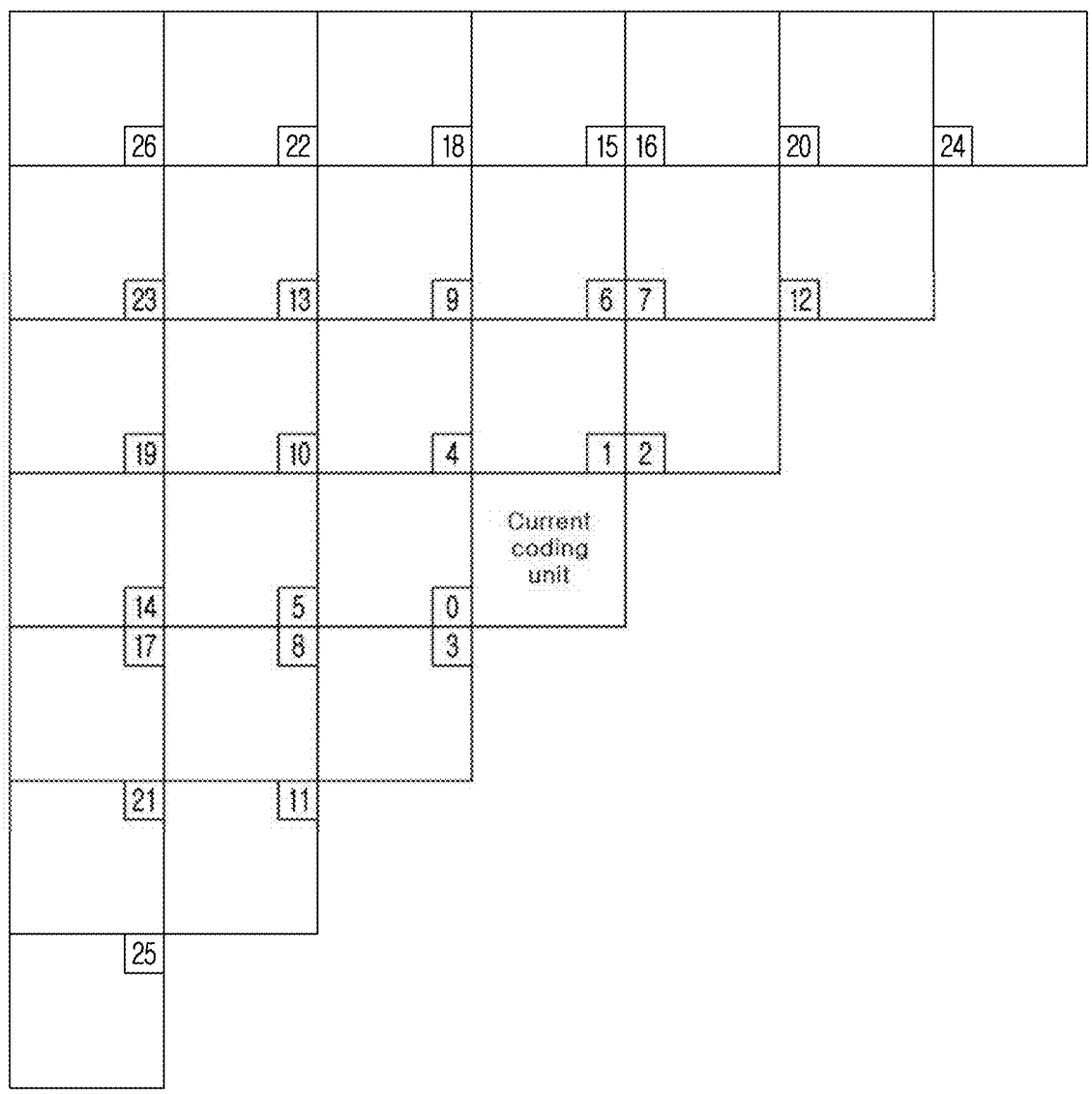

[FIG. 33]
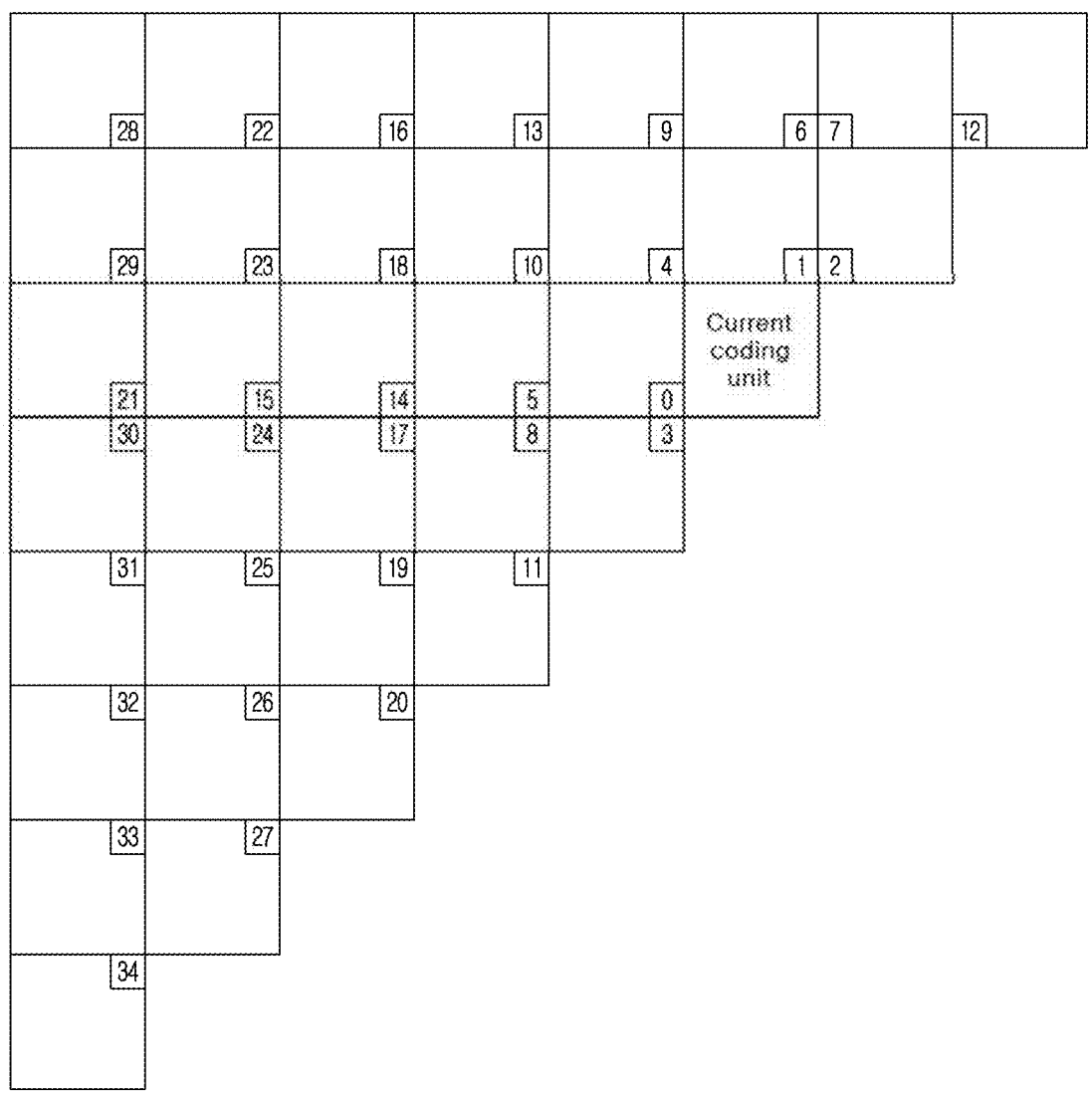

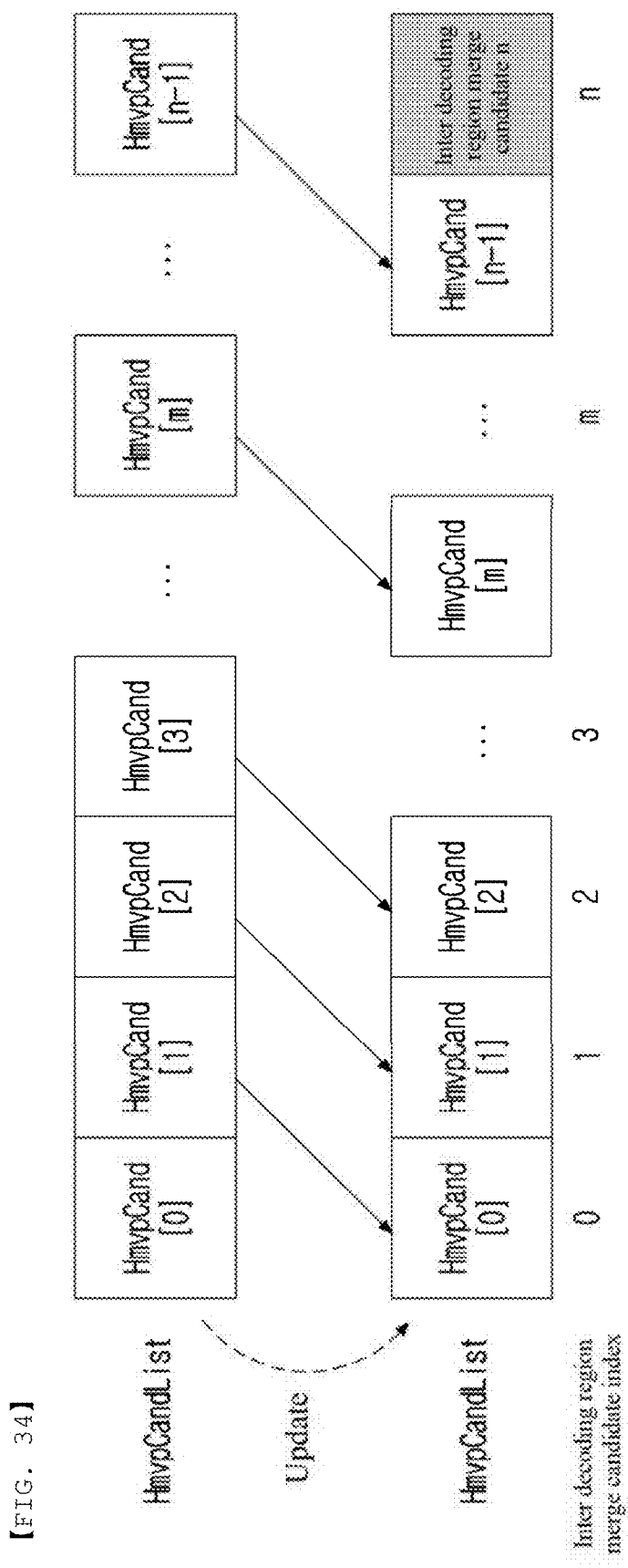
[FIG. 34]

[FIG. 35]
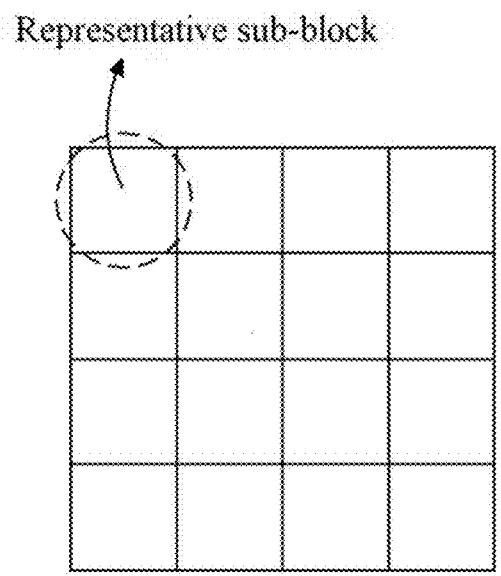
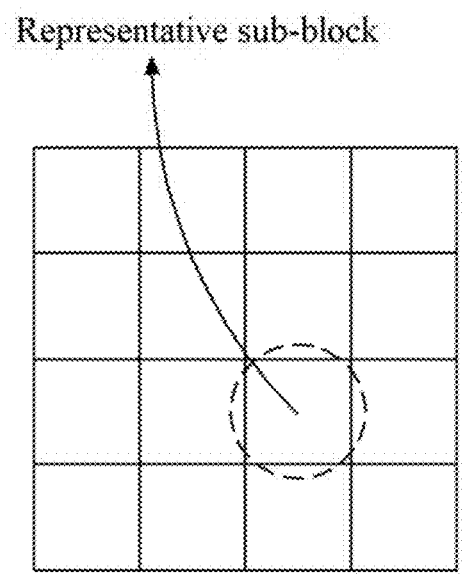
A
B

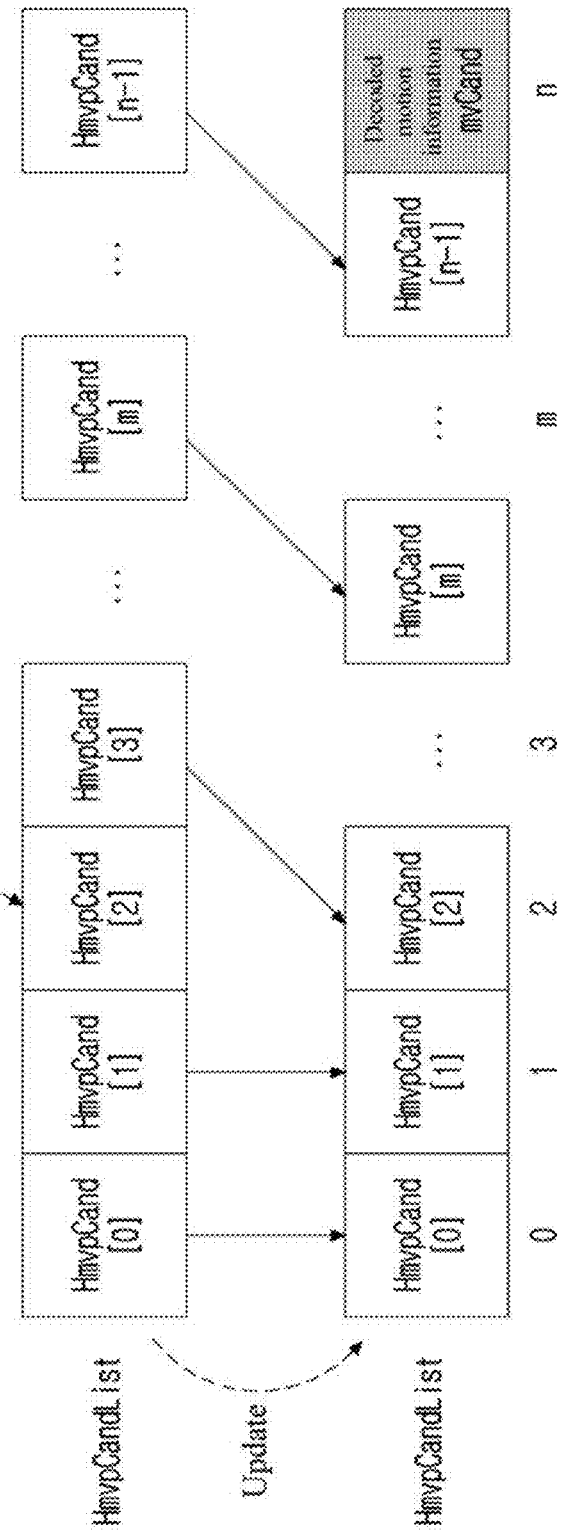
[FIG. 36]

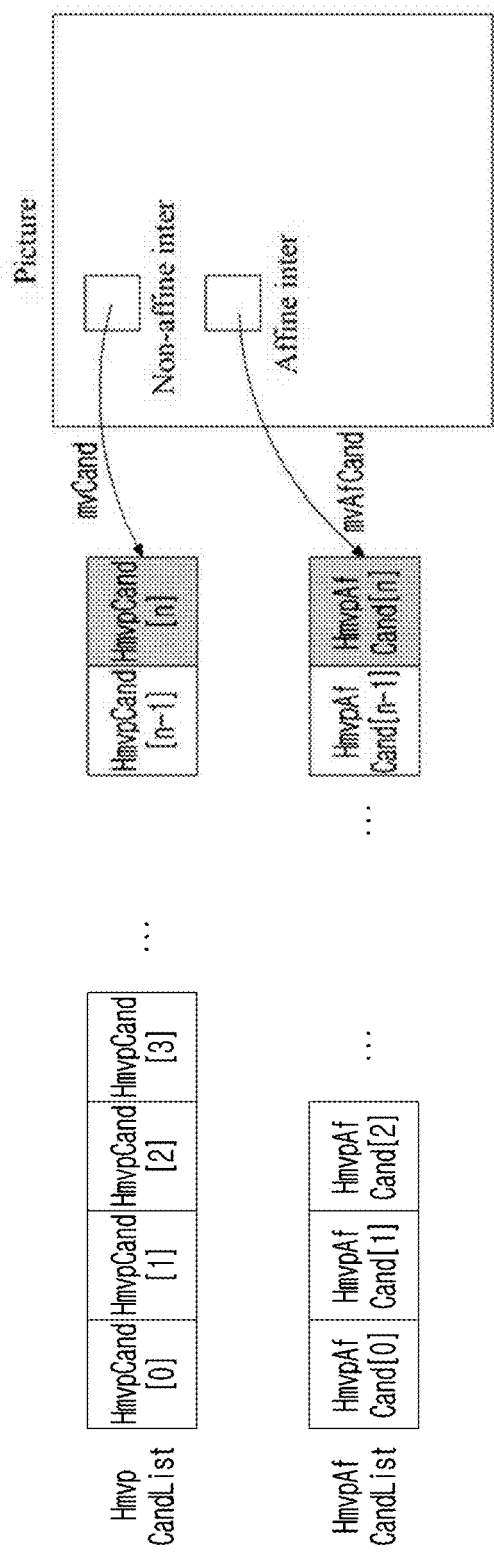
[FIG. 37]

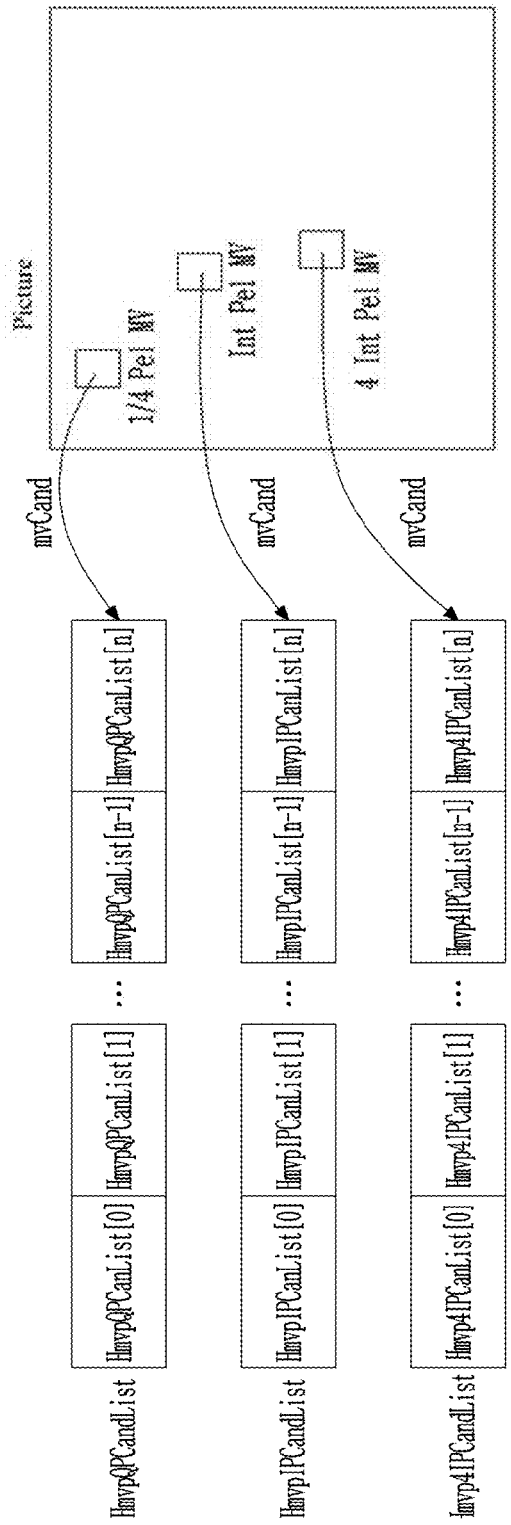
[FIG. 38]

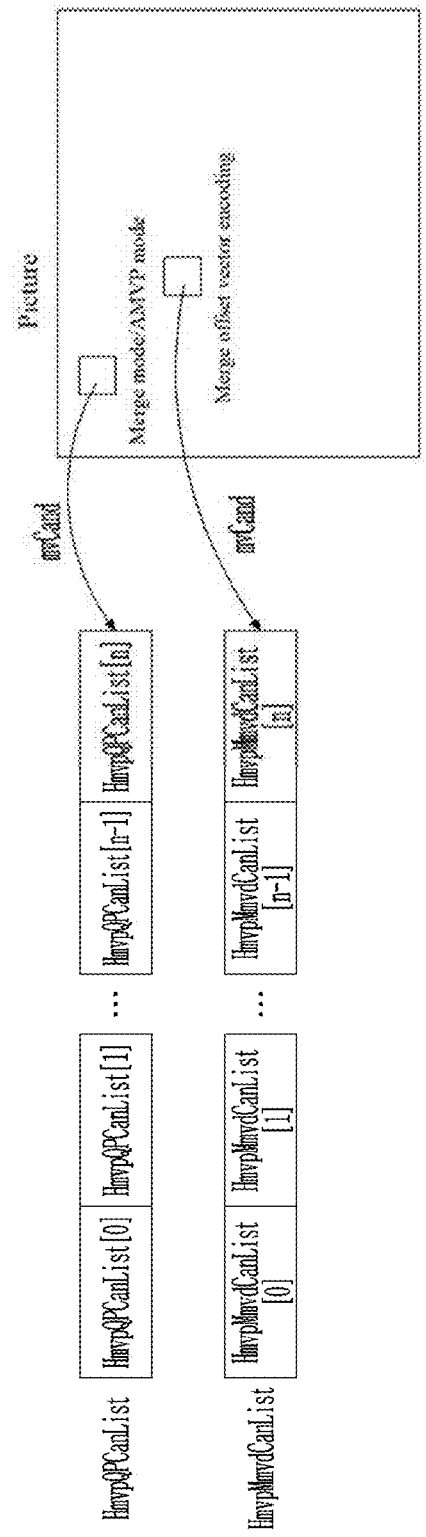
[FIG. 39]

[FIG. 40]
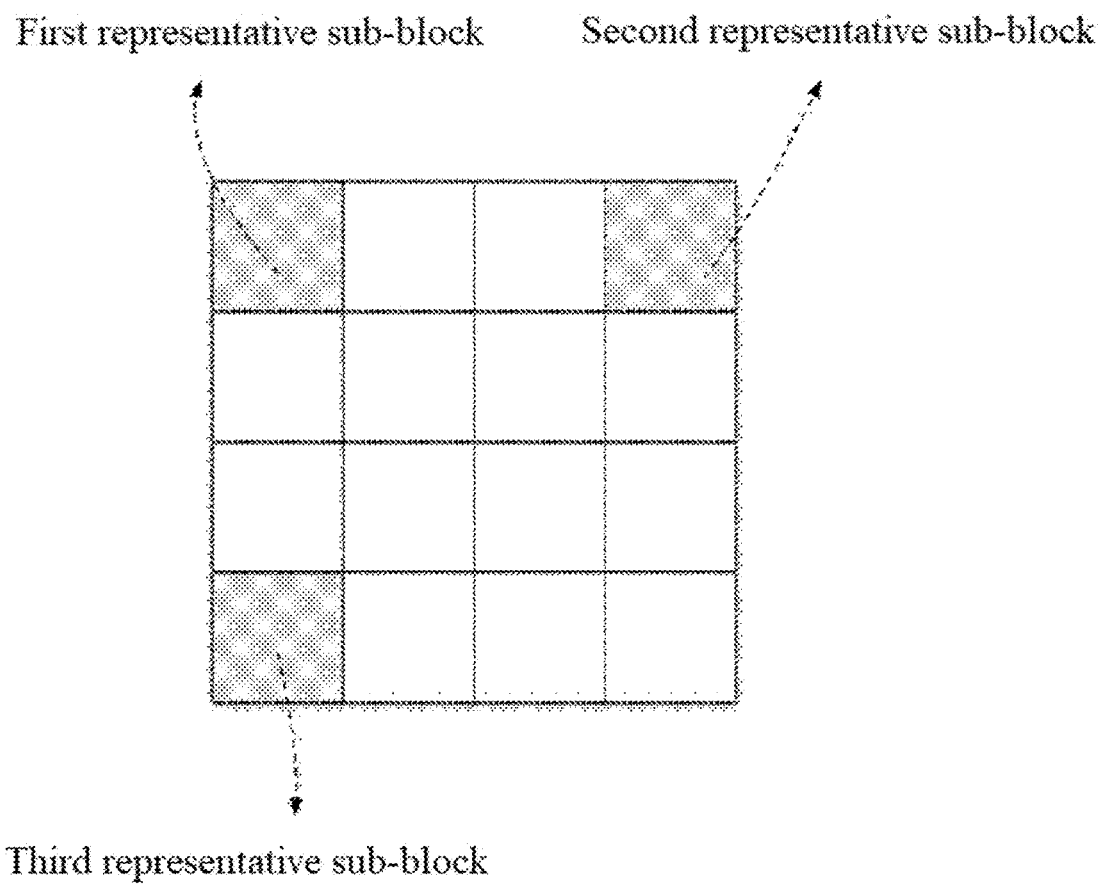

[FIG. 41]
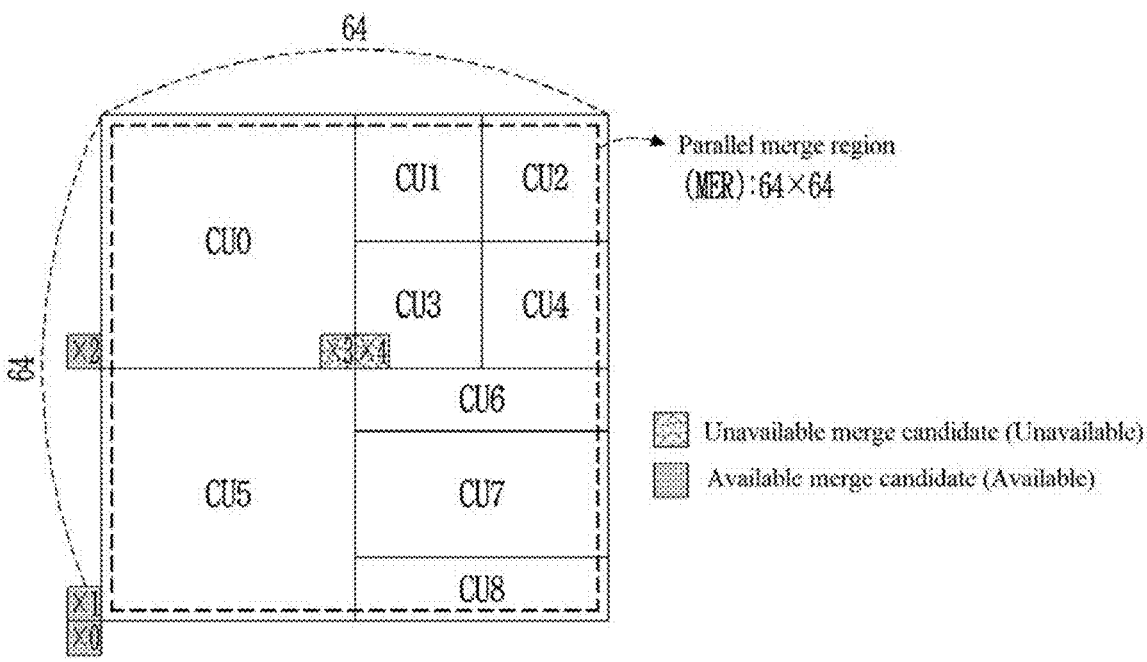
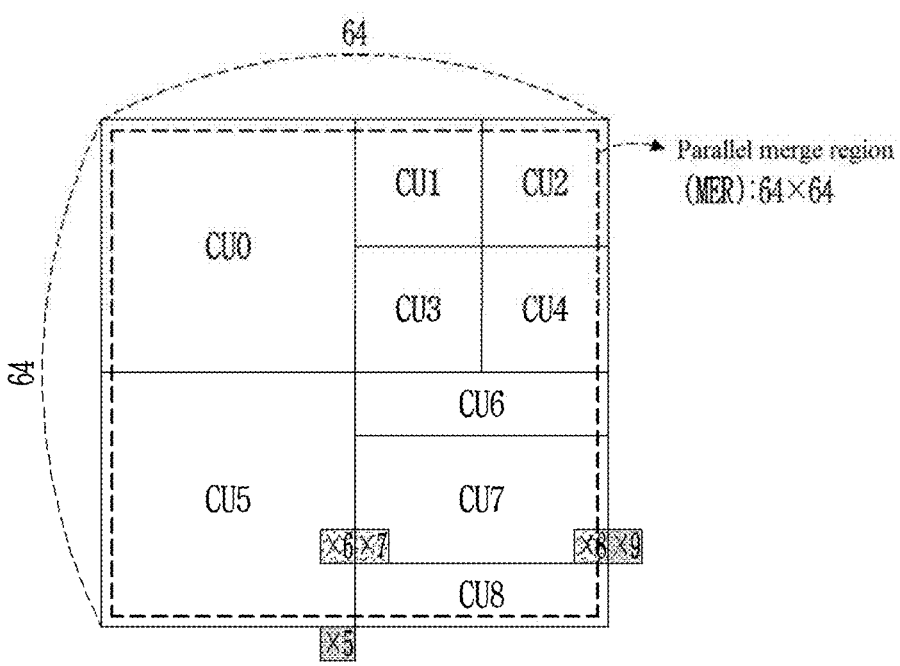

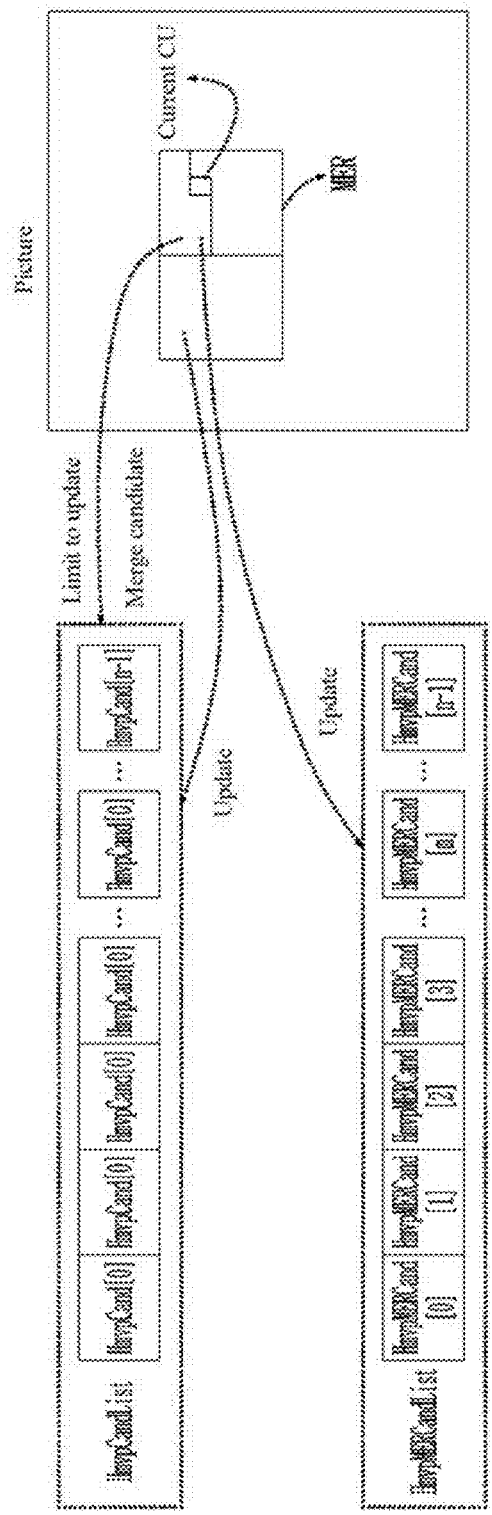
[FIG. 42]

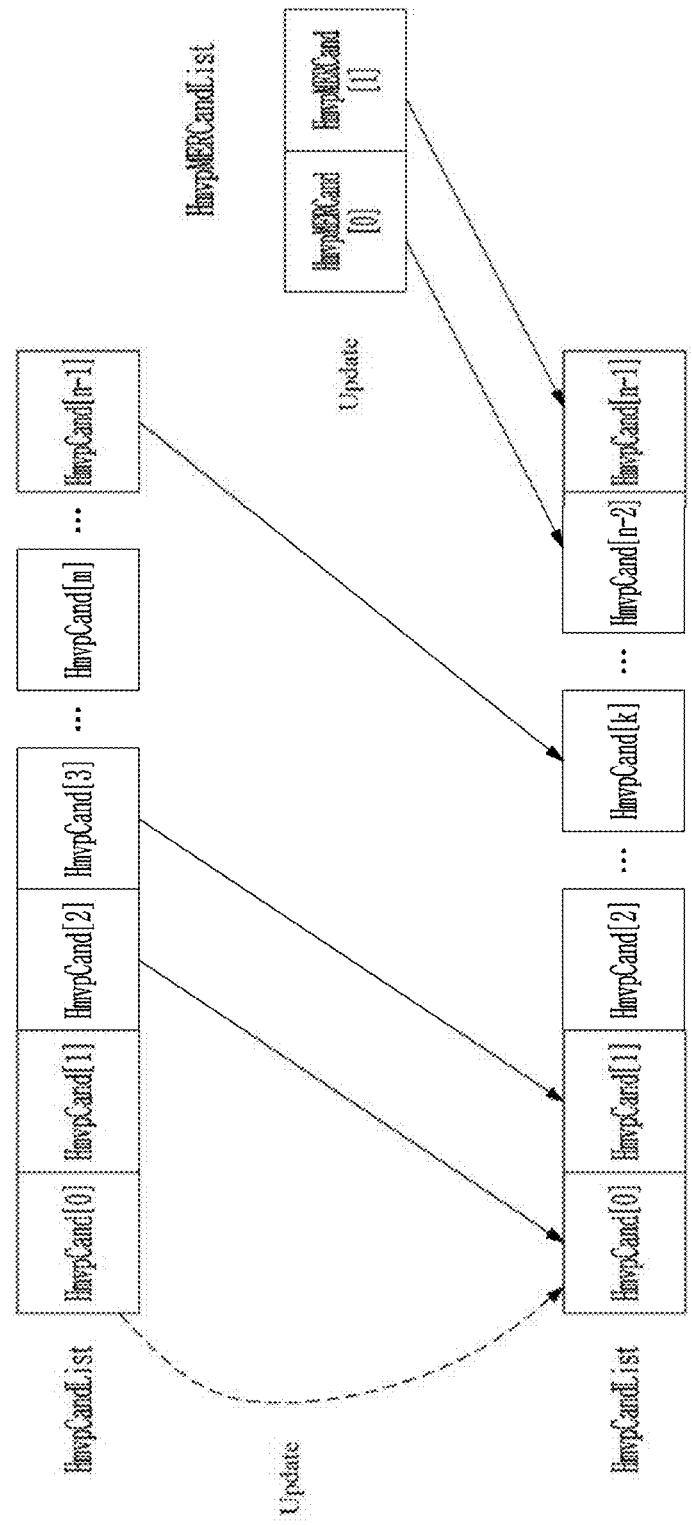
[FIG. 43]

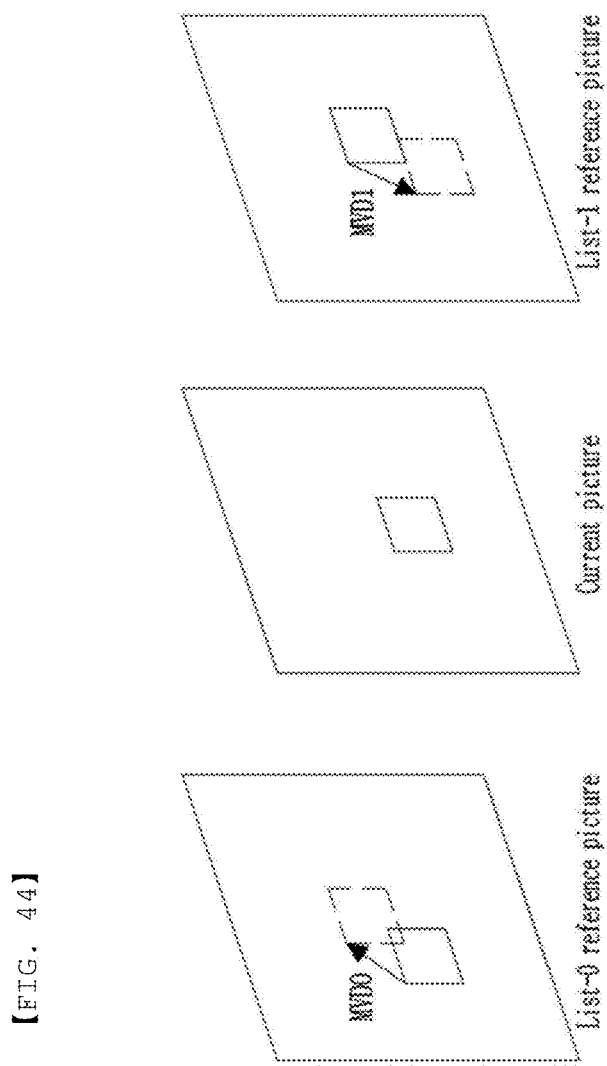
[FIG. 44]

[FIG. 45]
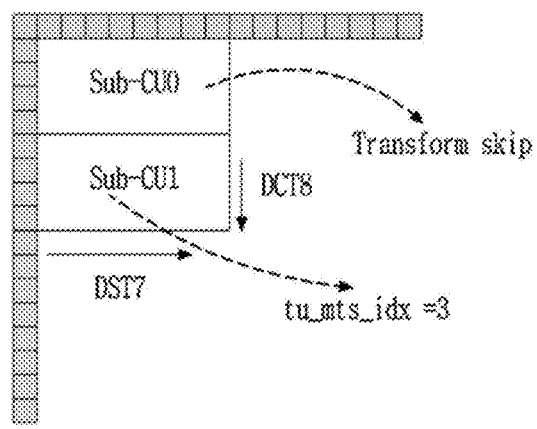

[FIG. 46]
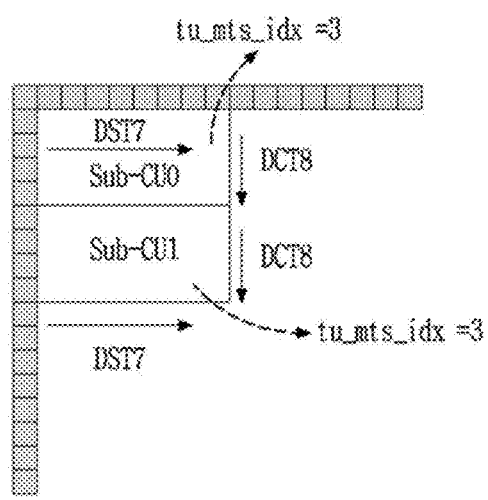
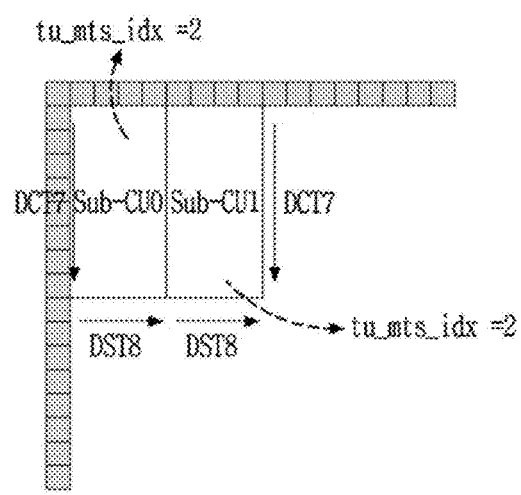

[FIG. 47]
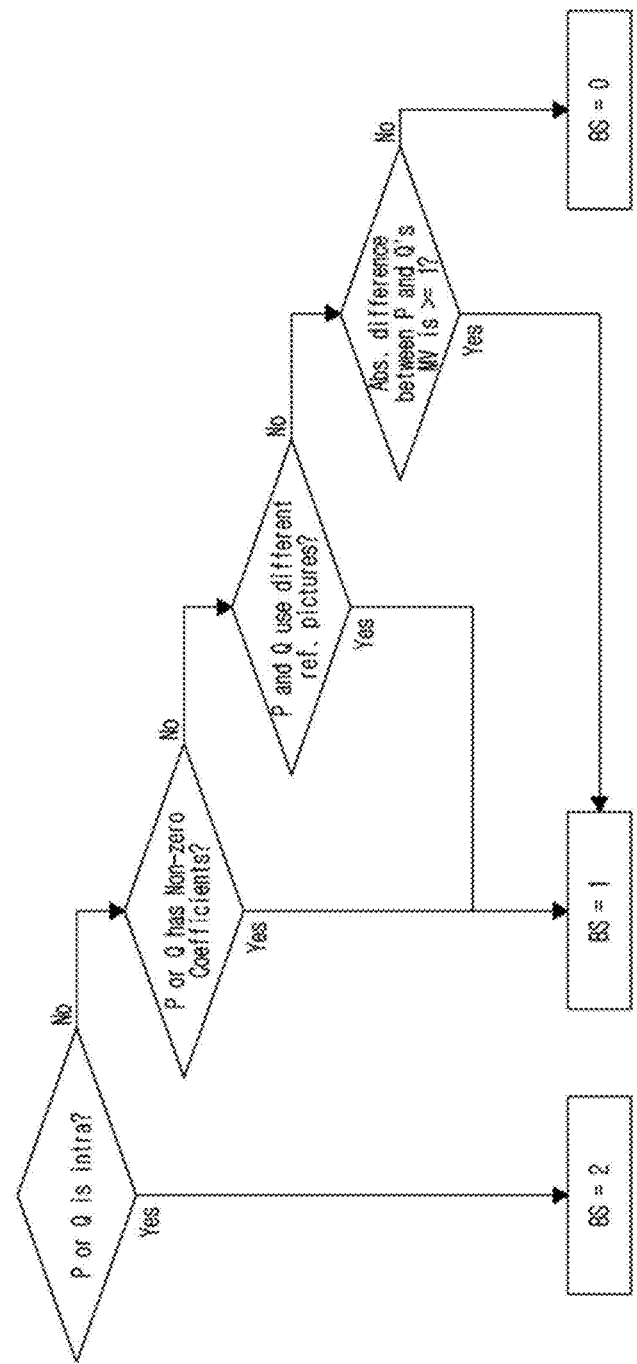

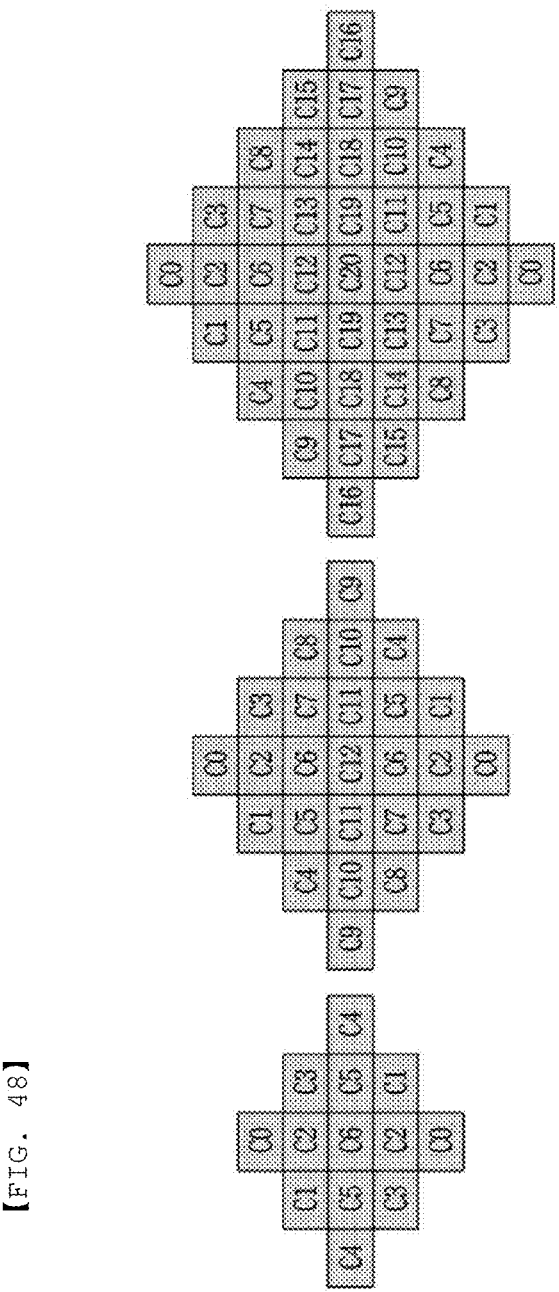
[FIG. 48]

[FIG. 49]
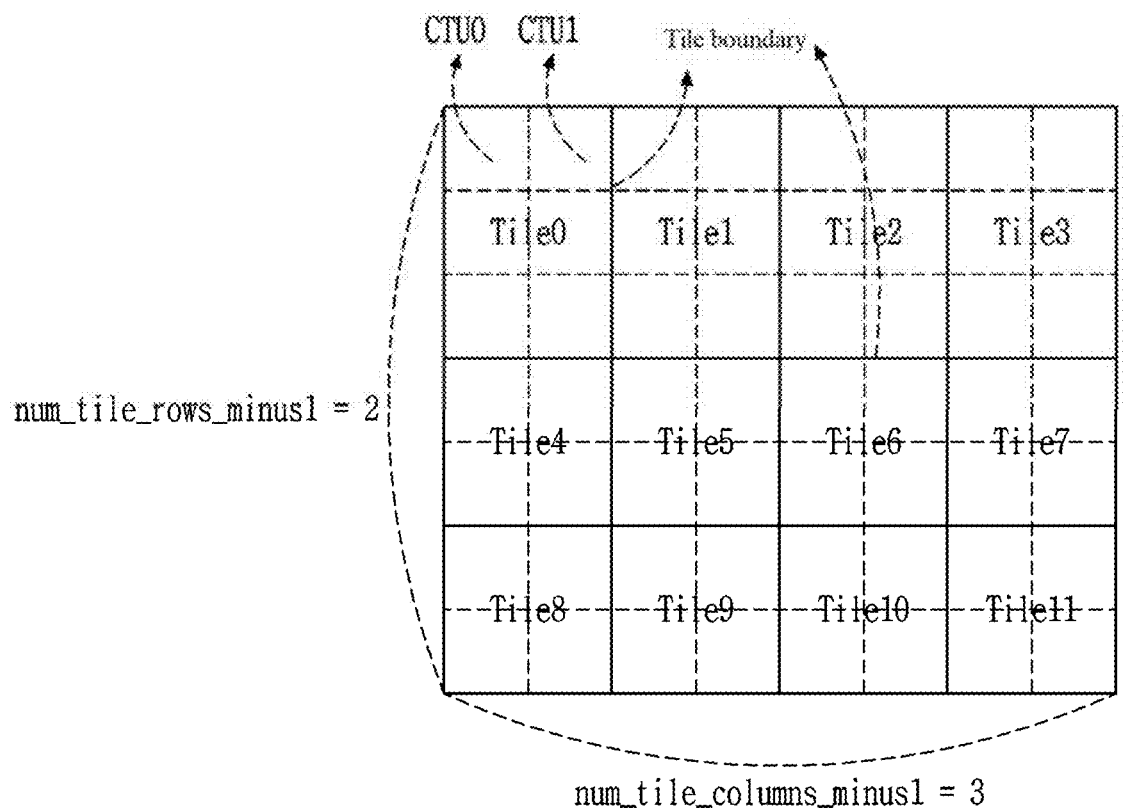
[FIG. 50]
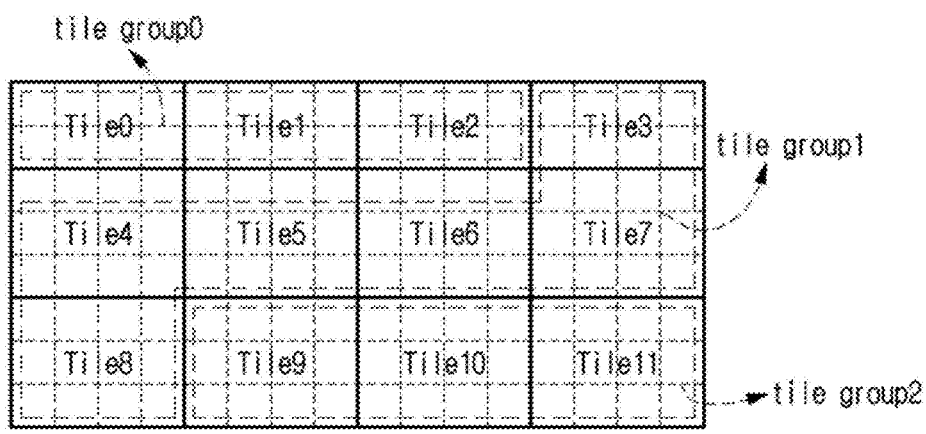

[FIG. 51]
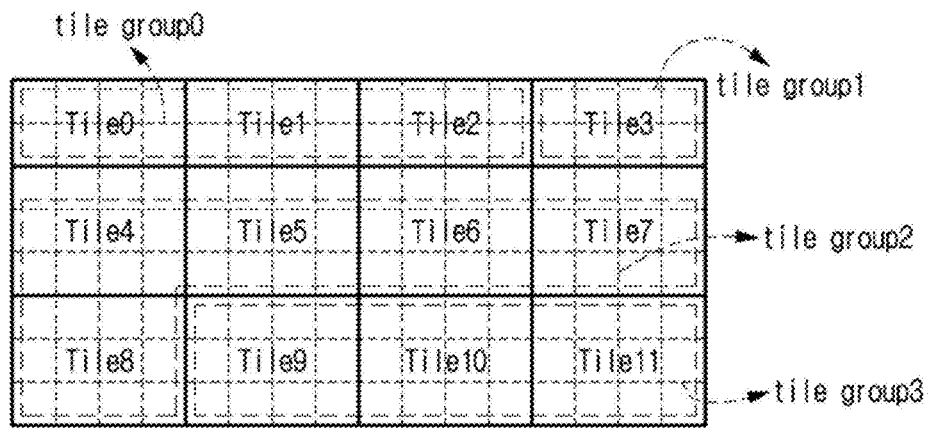
[FIG. 52]
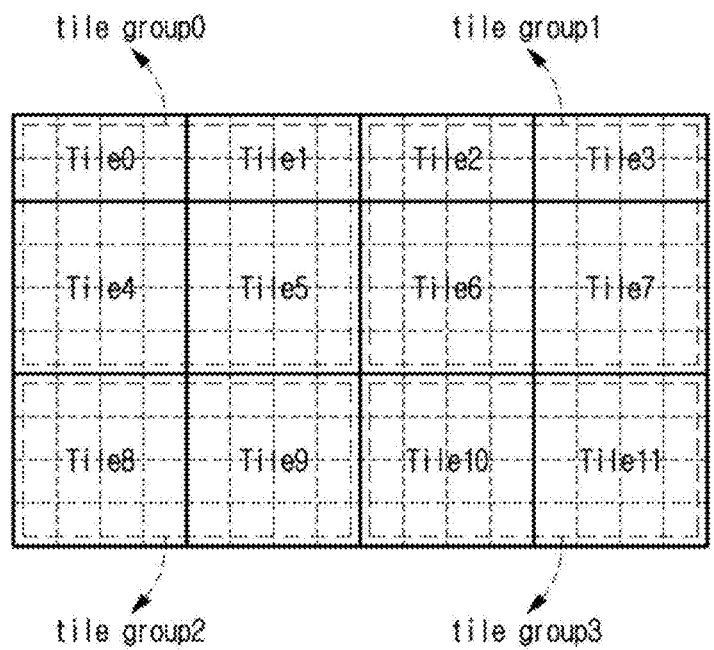

[FIG. 53]
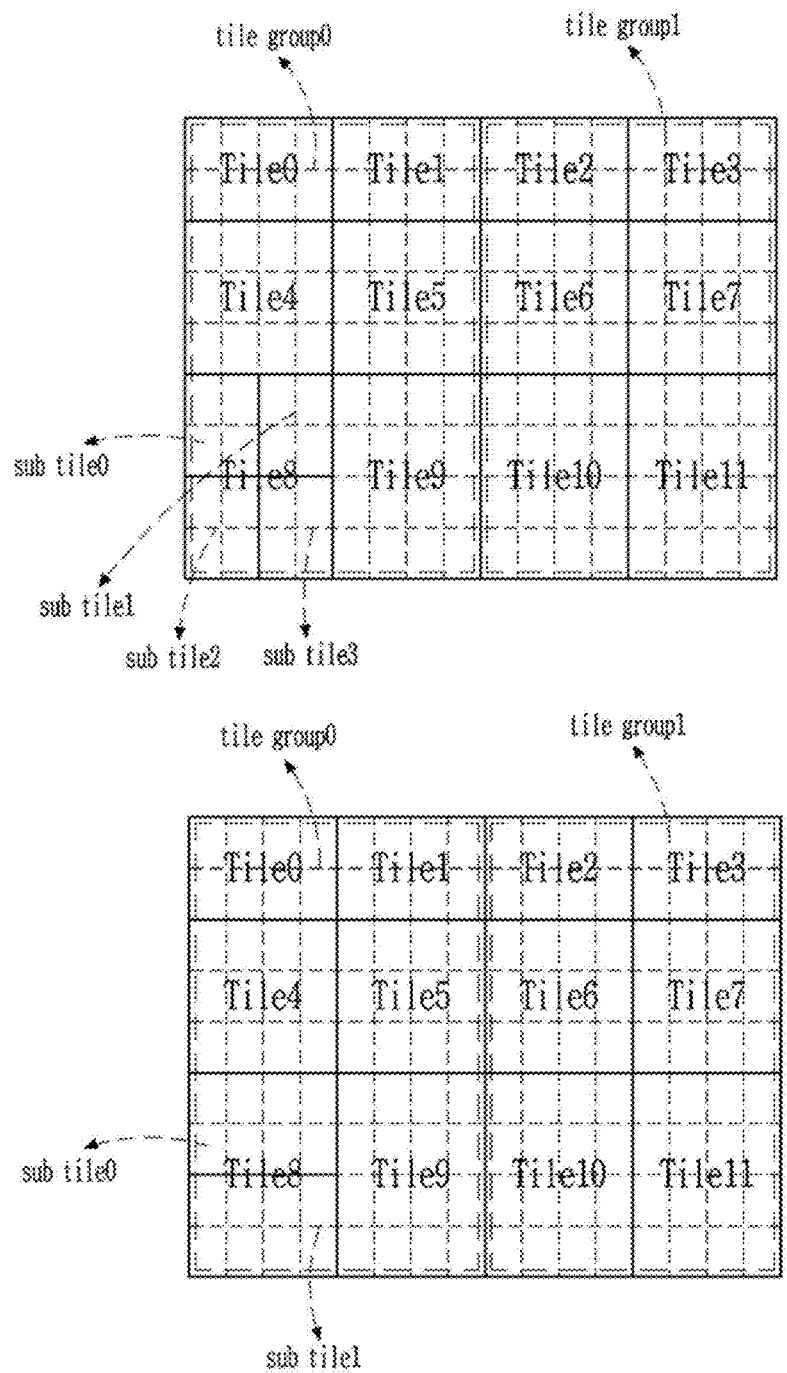

[FIG. 54]
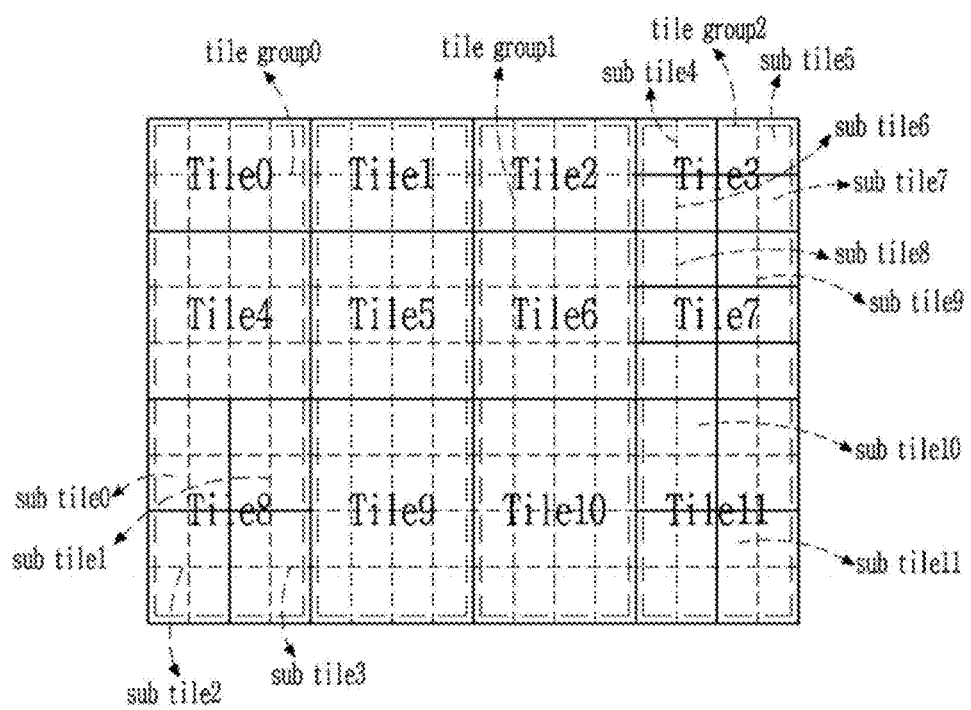

[FIG. 55]
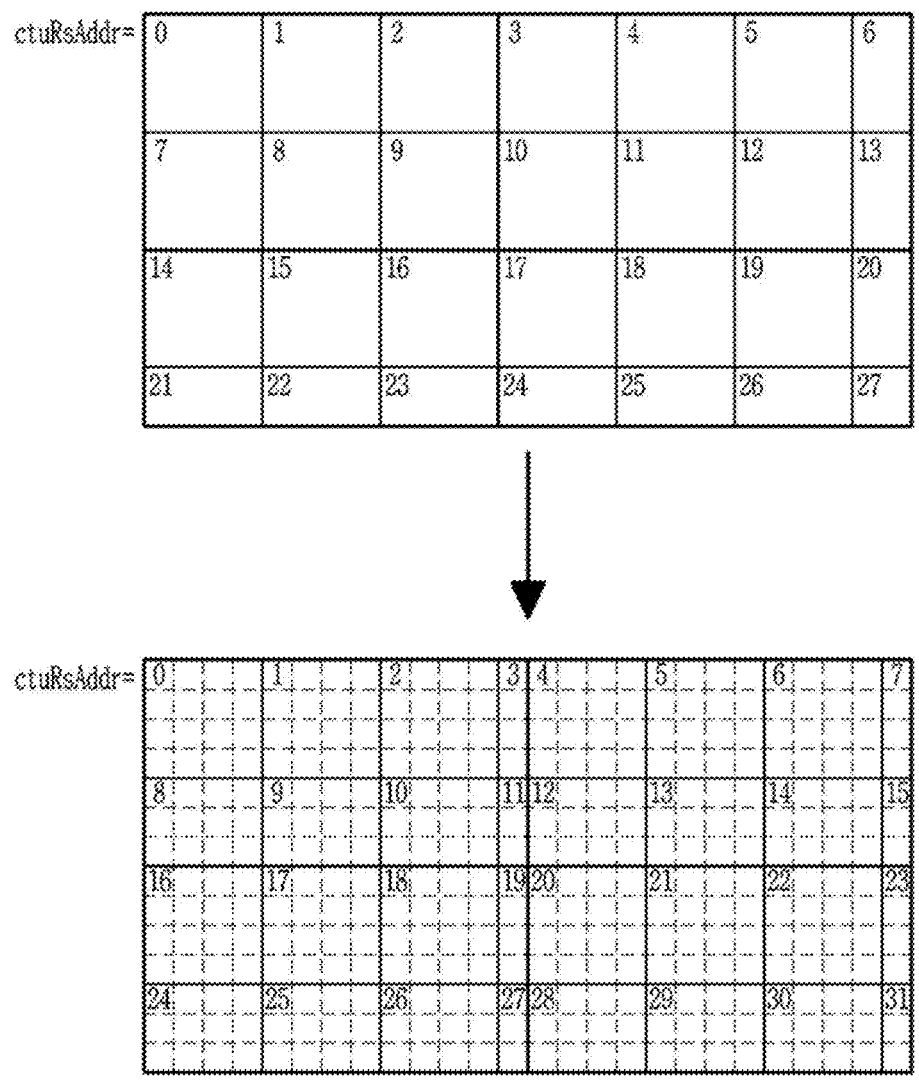

IMAGE ENCODING/DECODING METHOD AND APPARATUS

CROSS REFERENCE TO RELATED APPLICATIONS

This application is a National Stage of International Application No. PCT/KR2020/004136 filed Mar. 26, 2020, claiming priority based on Korean Patent Application No. 10-2019-0034020 filed Mar. 26, 2019.

TECHNICAL FIELD

The present disclosure relates to a method and a device for processing a video signal.

BACKGROUND ART

As a market demand for a high-resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding and in-loop filter. On the other hand, as a demand for a high resolution image has increased, a demand for stereoscopic image contents has increased as a new image service. A video compression technology for effectively providing high resolution and ultra-high resolution stereo-scopic image contents has been discussed.

DISCLOSURE

Technical Problem

A purpose of the present disclosure is to provide a method and a device for encoding/decoding an image that efficiency is improved.

A purpose of the present disclosure is to provide a prediction method and device per inter mode.

A purpose of the present disclosure is to provide a multi type-based transform method and device.

A purpose of the present disclosure is to provide a computer readable recording medium which stores a bitstream generated by an image encoding method and device.

Technical Solution

An image encoding/decoding method and device according to the present disclosure may generate a prediction block of a current block based on a pre-defined prediction mode, generate a residual block of the current block based on a predetermined transform type and reconstruct the current block based on the prediction block and the residual block.

In an image encoding/decoding method and device according to the present disclosure, when the prediction mode of the current block is an intra prediction mode, the prediction block of the current block may be generated by using a predetermined intra reference sample and the intra prediction mode.

In an image encoding/decoding method and device according to the present disclosure, the intra reference sample may be derived from any one of a plurality of intra reference lines, and the intra prediction mode may be determined by considering a shape of the current block.

In an image encoding/decoding method and device according to the present disclosure, when the prediction mode of the current block is a merge mode, generating the prediction block may include generating a merge candidate list of the current block, deriving motion information of the current block based on the merge candidate list and performing motion compensation of the current block based on the derived motion information.

In an image encoding/decoding method and device according to the present disclosure, the merge candidate list may include at least one of a spatial merge candidate, a temporal merge candidate or a merge candidate of a motion information list, and the motion information list may be configured with motion information of one or more previous blocks which are decoded before the current block.

In an image encoding/decoding method and device according to the present disclosure, the spatial merge candidate may be determined by considering a predetermined parallel merge region, and the parallel merge region may mean a region which is configured with a plurality of coding blocks which are encoded/decoded independently or in parallel each other.

In an image encoding/decoding method and device according to the present disclosure, the merge candidate of the motion information list may not be overlapped with a spatial merge candidate which is pre-added to the merge candidate list.

In an image encoding/decoding method and device according to the present disclosure, one or more coding blocks belonging to the parallel merge region may share one same motion information list.

In an image encoding/decoding method and device according to the present disclosure, based on the motion information of the current block, the method may further include updating the motion information list.

In an image encoding/decoding method and device according to the present disclosure, the update may be performed only when the current block is a block in a last decoding order in the parallel merge region.

In an image encoding/decoding method and device according to the present disclosure, the motion information of the current block may include at least one of a motion vector, a reference picture index or prediction direction information.

In an image encoding/decoding method and device according to the present disclosure, performing the motion compensation of the current block may include modifying a motion vector of the current block based on a predetermined difference motion vector (MVD) and the motion compensation may be performed by using a modified motion vector.

In an image encoding/decoding method and device according to the present disclosure, the difference motion vector may include a difference motion vector in a first direction ($MVD_{L0}$) and a difference motion vector in a second direction ($MVD_{L1}$), and the difference motion vector in a second direction may be set as a vector which has the same size as and a direction opposite to the difference motion vector in the first direction.

In an image encoding/decoding method and device according to the present disclosure, modifying the motion vector may be performed based on an encoding parameter of the current block, and the encoding parameter may include at least one of a prediction mode, motion information or a size of the current block.

An image encoding method and device according to the present disclosure may determine a transform type of a current block based on a table which is pre-defined in an encoding device and encode information representing the determined transform type.

An image decoding method and device according to the present disclosure may determine a transform type of a current block based on information which is explicitly signaled from an encoding device and a table which is pre-defined in a decoding device.

In an image encoding/decoding method and device according to the present disclosure, the pre-defined table may define at least one of a transform type in a horizontal direction or a transform type in a vertical direction available for each encoded information.

In an image encoding/decoding method and device according to the present disclosure, the transform type may be implicitly derived based on at least one of a size, a shape, an intra prediction mode or a component type of the current block.

A computer readable recoding medium according to the present disclosure may store a bitstream generated according to the above-described image encoding method/device or a bitstream decoded by the above-described image decoding method/device.

Technical Effects

The present disclosure may improve encoding efficiency of inter prediction by using various types of merge candidates.

The present disclosure may improve accuracy of inter prediction through modification of motion information.

The present disclosure may improve encoding efficiency of a residual sample by performing additional transform as well as multi type-based transform.

According to the present disclosure, a computer readable recoding medium storing a bitstream generated by an image encoding method/device according to the present disclosure may be provided.

DESCRIPTION OF DIAGRAMS

FIG. 1 is a block diagram showing an image encoding device according to the present disclosure.

FIG. 2 is a block diagram showing an image decoding device according to the present disclosure.

FIGS. 3 to 5 show a method in which a picture is partitioned into a plurality of blocks as an embodiment to which the present disclosure is applied.

FIG. 6 roughly shows a process in which a current block is reconstructed as an embodiment to which the present disclosure is applied.

FIGS. 7 to 16 show an intra prediction method as an embodiment to which the present disclosure is applied.

FIG. 17 shows an inter prediction method as an embodiment to which the present disclosure is applied.

FIGS. 18 to 30 show an affine inter prediction method as an embodiment to which the present disclosure is applied.

FIG. 31 shows a merge mode-based inter prediction method as an embodiment to which the present disclosure is applied.

FIGS. 32 to 33 show a neighboring block which may be used as a spatial merge candidate as an embodiment to which the present disclosure is applied.

FIGS. 34 to 40 show a method in which a motion information list is configured and updated as an embodiment to which the present disclosure is applied.

FIGS. 41 to 43 show a method in which a motion information list is configured and updated in a parallel merge region as an embodiment to which the present disclosure is applied.

FIG. 44 shows a method in which a motion vector is modified based on a difference motion vector as an embodiment to which the present disclosure is applied.

FIGS. 45 and 46 show a transform method in an encoding/decoding device as an embodiment to which the present disclosure is applied.

FIGS. 47 and 48 show a method in which an in-loop filter is applied to a reconstructed block as an embodiment to which the present disclosure is applied.

FIGS. 49 to 55 show a method in which one picture is partitioned into various types of partial regions as an embodiment to which the present disclosure is applied.

BEST MODE

An image encoding/decoding method and device according to the present disclosure may generate a prediction block of a current block based on a pre-defined prediction mode, generate a residual block of the current block based on a predetermined transform type and reconstruct the current block based on the prediction block and the residual block.

In an image encoding/decoding method and device according to the present disclosure, when a prediction mode of the current block is an intra prediction mode, the prediction block of the current block may be generated by using a predetermined intra reference sample and the intra prediction mode.

In an image encoding/decoding method and device according to the present disclosure, the intra reference sample may be derived from any one of a plurality of intra reference lines, and the intra prediction mode may be determined by considering a shape of the current block.

In an image encoding/decoding method and device according to the present disclosure, when the prediction mode of the current block is a merge mode, generating the prediction block may include generating a merge candidate list of the current block, deriving motion information of the current block based on the merge candidate list and performing motion compensation of the current block based on the derived motion information.

In an image encoding/decoding method and device according to the present disclosure, the merge candidate list may include at least one of a spatial merge candidate, a temporal merge candidate or a merge candidate of a motion information list, and the motion information list may be configured with motion information of one or more previous blocks which are decoded before the current block.

In an image encoding/decoding method and device according to the present disclosure, the spatial merge candidate may be determined by considering a predetermined parallel merge region, and the parallel merge region may mean a region which is configured with a plurality of coding blocks which are encoded/decoded independently or in parallel each other.

In an image encoding/decoding method and device according to the present disclosure, a merge candidate of the motion information list may not be overlapped with a spatial merge candidate which is pre-added to the merge candidate list.

In an image encoding/decoding method and device according to the present disclosure, one or more coding blocks belonging to the parallel merge region may share one same motion information list.

In an image encoding/decoding method and device according to the present disclosure, based on the motion information of the current block, the method may further include updating the motion information list.

In an image encoding/decoding method and device according to the present disclosure, the update may be performed only when the current block is a block in a last decoding order in the parallel merge region.

In an image encoding/decoding method and device according to the present disclosure, the motion information of the current block may include at least one of a motion vector, a reference picture index or prediction direction information.

In an image encoding/decoding method and device according to the present disclosure, performing the motion compensation of the current block may include modifying a motion vector of the current block based on a predetermined difference motion vector (MVD) and the motion compensation may be performed by using a modified motion vector.

In an image encoding/decoding method and device according to the present disclosure, the difference motion vector may include a difference motion vector in a first direction ($MVD_{L0}$) and a difference motion vector in a second direction ($MVD_{L1}$), and the difference motion vector in a second direction may be set as a vector which has the same size as and a direction opposite to the difference motion vector in the first direction.

In an image encoding/decoding method and device according to the present disclosure, modifying the motion vector may be performed based on an encoding parameter of the current block and the encoding parameter may include at least one of a prediction mode, motion information or a size of the current block.

An image encoding method and device according to the present disclosure may determine a transform type of a current block based on a table which is pre-defined in an encoding device and encode information representing the determined transform type.

An image decoding method and device according to the present disclosure may determine a transform type of a current block based on information which is explicitly signaled from an encoding device and a table which is pre-defined in a decoding device.

In an image encoding/decoding method and device according to the present disclosure, the pre-defined table may define at least one of a transform type in a horizontal direction or a transform type in a vertical direction available for each encoded information.

In an image encoding/decoding method and device according to the present disclosure, the transform type may be implicitly derived based on at least one of a size, a shape, an intra prediction mode or a component type of the current block.

A computer readable recoding medium according to the present disclosure may store a bitstream generated according to the above-described image encoding method/device or a bitstream decoded by the above-described image decoding method/device.

MODE FOR INVENTION

Referring to a diagram attached in this description, an embodiment of the present disclosure is described in detail so that a person with ordinary skill in the art to which the inventions pertain may easily carry it out. However, the present disclosure may be implemented in a variety of different shapes and is not limited to an embodiment which is described herein. In addition, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, an order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in a separate hardware or one software construction unit. In other words, each construction unit may be described by being enumerated as each construction unit for convenience of description, at least two construction units among each construction unit may be combined to configure one construction unit, or one construction unit may be divided into a plurality of construction units to perform a function. Such an integrated embodiment and separated embodiment in each construction unit are also included in a scope of a right on the present disclosure as long as they are not beyond the essence of the present disclosure.

In this description, a block may be variously represented as a unit, a region, a unit, a partition, etc., and a sample may be variously represented as a pixel, a pel, a pixel, etc.

Hereinafter, referring to the attached diagrams, an embodiment of the present disclosure will be described in more detail. In describing the present disclosure, overlapping description for the same component is omitted.

FIG. 1 is a block diagram showing an image encoding device according to the present disclosure.

In reference to FIG. 1, a traditional image encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

A picture partition unit 110 may partition an input picture into at least one processing unit. In this case, a processing unit may be a prediction unit (PU), a transform unit (TU) or a coding unit (CU). Hereinafter, in an embodiment of the present disclosure, a coding unit may be used as a unit performing encoding and may be used as a unit performing decoding, A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N, A prediction unit 120 and 125 may include an inter prediction unit 120 performing inter prediction and an intra prediction unit 125 performing intra prediction. Whether to perform inter prediction or intra prediction for a prediction unit may be determined, and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder.

An inter prediction unit 120 may predict a prediction unit based on information of at least one picture of a previous picture or a subsequent picture of a current picture and may predict a prediction unit based on information of some regions which have been encoded in a current picture in some cases. An inter prediction unit 120 may include a reference picture interpolation unit, a motion prediction unit and a motion compensation unit, In a reference picture interpolation unit, reference picture information may be provided from a memory 155, and pixel information of an integer pixel or less may be generated in a reference picture. For a luma pixel, a DCT-based 8-tap interpolation filter with different filter coefficients may be used to generate pixel information of an integer pixel or less in a ¼ pixel unit. For a chroma signal, a DCT-based 4-tap interpolation filter with different filter coefficients may be used to generate pixel information of an integer pixel or less in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS(New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip mode, a merge mode, a AMVP (Advanced Motion Vector Prediction) mode, an intra block copy mode, an affine mode, etc. may be used.

An intra prediction unit 125 may generate a prediction unit based on information of reference pixel around a current block, pixel information in a current picture. When a reference pixel is a pixel which performed inter prediction because a neighboring block in a current prediction unit is a block which performed inter prediction, a reference pixel included in a block which performed inter prediction may be used by being substituted with information of reference pixel of a neighboring block which performed intra prediction. In other words, when a reference pixel is unavailable, information of the unavailable reference pixel may be used by being substituted with at least one reference pixel of available reference pixels.

In addition, a residual block including residual value information, a difference value between a prediction unit which performed prediction based on a prediction unit generated in a prediction unit 120 and 125 and an original block in a prediction unit, may be generated. A generated residual block may be input into a transform unit 130.

In a transform unit 130, an original block and a residual block including residual value information in a prediction unit generated in a prediction unit 120 and 125 may be transformed by using a transform method such as DCT (Discrete Cosine Transform), DST (Discrete Sine Transform), and KLT. Whether to apply DCT, DST or KLT to transform a residual block may be determined based on intra prediction mode information in a prediction unit used to generate a residual block.

A quantization unit 135 may quantize values which are transformed into a frequency domain in a transform unit 130. According to a block or according to image importance, a quantized coefficient may be changed. Values calculated in a quantization unit 135 may be provided to a dequantization unit 140 and a rearrangement unit 160.

A rearrangement unit 160 may perform rearrangement of coefficient values for quantized residual values.

A rearrangement unit 160 may change two-dimensional block-shaped coefficients into a one-dimensional vector shape through a coefficient scanning method. For example, in a rearrangement unit 160, a DC coefficient to coefficients in a high frequency domain may be scanned by a zig-zag scanning method and may be changed into a one-dimensional vector shape. A vertical scan which scans two-dimensional block-shaped coefficients in a column direction or a horizontal scan which scans two-dimensional block-shaped coefficients in a row direction may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various encoding methods such as Exponential Golomb, CAVLC (Context-Adaptive Variable Length Coding), and CABAC (Context-Adaptive Binary Arithmetic Coding). Regarding it, an entropy encoding unit 165 may encode residual value coefficient information in a coding unit from a rearrangement unit 160 and a prediction unit 120, 125. In addition, according to the present disclosure, it is possible to signal and transmit information indicating that motion information is derived and used at a decoder side and information on a method used for deriving motion information.

In a dequantization unit 140 and an inverse transform unit 145, values quantized in a quantization unit 135 are dequantized and values transformed in a transform unit 130 are inversely transformed. Residual values generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125, A filter unit 150 may include at least one of a deblocking filter, an offset modification unit and ALF (Adaptive Loop Filter). A deblocking filter may remove block distortion generated by a boundary between blocks in a reconstructed picture. An offset modification unit may modify an offset with an original image in a pixel unit for an image performing deblocking. A method in which a pixel included in an image is divided into the certain number of regions, a region which will perform an offset is determined and an offset is applied to a corresponding region, or a method in which an offset is applied by considering edge information of each pixel may be used to perform offset modification for a specific picture. ALF (Adaptive Loop Filtering) may be performed based on a value comparing a filtered reconstructed image with an original image. A pixel included in an image may be divided into a predetermined group, one filter which will be applied to a corresponding group may be determined, and filtering may be performed discriminately per group.

A memory 155 may store a reconstructed block or picture calculated in a filter unit 150, and a stored reconstructed block or picture may be provided for a prediction unit 120 and 125 when inter prediction is performed.

FIG. 2 is a block diagram showing an image decoding device according to the present disclosure.

In reference to FIG. 2, an image decoder 200 may include an entropy decoding unit 210, a rearrangement unit 215, a dequantization unit 220, an inverse transform unit 225, a prediction unit 230 and 235, a filter unit 240 and a memory 245, When an image bitstream is input in an image encoder, an input bitstream may be decoded in a process opposite to that of an image encoder.

An entropy decoding unit 210 may perform entropy decoding in a process opposite to a process in which entropy encoding is performed in an entropy encoding unit of an image encoder. For example, corresponding to a method performed in an image encoder, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210 based on a rearrangement method of an encoding unit. Coefficients represented in a one-dimensional vector shape may be reconstructed into coefficients in a two-dimensional block shape and rearranged.

A dequantization unit 220 may perform dequantization based on a quantization parameter provided in an encoder and coefficient values of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as an operation in an image encoder, intra prediction for a prediction unit may be performed based on a pixel at a left position, a pixel at a top-left position and a pixel at a top position of a prediction unit, but when a size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction. On the other hand, if information indicating that motion information is derived and used at a decoder side and information on a method used for deriving motion information are transmitted from an encoder 100 without transmitting motion prediction-related information for the inter prediction, the prediction unit determination unit determines whether an inter prediction unit 230 performs prediction based on information transmitted from an encoder 100.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode, an intra block copy mode, or an affine mode may be determined.

An intra prediction unit 235 may generate a prediction block based on pixel information in a current picture. When a prediction unit is a prediction unit which performs intra prediction, intra prediction may be performed based on intra prediction mode information in a prediction unit provided by an image encoder.

An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode of a current prediction unit. AIS filtering may be performed for a reference pixel of a current block by using a prediction mode of a prediction unit and AIS filter information provided by an image encoder. When a prediction mode of a current block is a mode where AIS filtering is not performed, an AIS filter may not be applied.

When a prediction mode of a prediction unit is a prediction unit in which intra prediction is performed based on a pixel value interpolating a reference pixel, a reference pixel interpolation unit may interpolate a reference pixel to generate a reference pixel in a pixel unit which is equal to or smaller than an integer value. When a prediction mode of a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoder. A deblocking filter of an image decoder may receive information related to a deblocking filter provided by an image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

FIGS. 3 to 5 show a method in which a picture is partitioned into a plurality of blocks as an embodiment to which the present disclosure is applied.

In reference to FIG. 3, a picture is partitioned into a plurality of basic coding units (Coding Tree Unit, hereinafter, CTU).

A size of a CTU may be regulated in a unit of a picture or a video sequence, and each CTU is configured not to be overlapped with other CTU. For example, a CTU size may be set as 128×128 in the whole sequences and any one of 128×128 to 256×256 may be selected and used in a unit of a picture.

A coding block/a coding unit (hereinafter, CU) may be generated by hierarchically partitioning a CTU. Prediction and transform may be performed in a unit of a coding unit, and it becomes a basic unit which determines a prediction mode. A prediction mode may represent a method of generating a prediction image and consider intra prediction, inter prediction or combined prediction, etc. as an example. Concretely, for example, a prediction block may be generated by using a prediction mode of at least any one of intra prediction, inter prediction or combined prediction in a unit of a coding unit. When a reference picture indicates a current picture in an inter prediction mode, a prediction block may be generated based on a region in a current picture which has been already encoded. It may be included in inter prediction because a prediction block is generated by using a reference picture index and a motion vector. Intra prediction is a method in which a prediction block is generated by using information of a current picture, inter prediction is a method in which a prediction block is generated by using information of other picture which has been already decoded, and combined prediction is a method in which inter prediction and intra prediction are combined and used. Combined prediction may encode/decode some regions of a plurality of sub-regions configuring one coding block with inter prediction and may encode/decode other regions with intra prediction. Alternatively, combined prediction may primarily perform inter prediction for a plurality of sub-regions and secondarily perform intra prediction. In this case, a prediction value of a coding block may be derived by performing a weighted average for a prediction value according to inter prediction and a prediction value according to intra prediction. The number of sub-regions configuring one coding block may be 2, 3, 4, or more, and a shape of a sub-region may be a quadrangle, a triangle or other polygon.

In reference to FIG. 4, a CTU may be partitioned in a shape of quad tree, binary tree or triple tree. A partitioned block may be additionally partitioned in a shape of quad tree, binary tree or triple tree. A method in which a current block is partitioned into 4 square partitions is referred to as quad tree partitioning, a method in which a current block is partitioned into 2 square or non-square partitions is referred to as binary tree partitioning, and a method in which a current block is partitioned into 3 partitions is defined as binary tree partitioning.

Binary partitioning in a vertical direction (SPLIT_BT_VER in FIG. 4) is referred to as vertical binary tree partitioning, and binary tree partitioning in a horizontal direction (SPLIT_BT_HOR in FIG. 4) is defined as horizontal binary tree partitioning.

Triple partitioning in a vertical direction (SPLIT_TT_VER in FIG. 4) is referred to as vertical triple tree partitioning, and triple tree partitioning in a horizontal direction (SPLIT_TT_HOR in FIG. 4) is defined as horizontal triple tree partitioning.

The number of partitions may be referred to as a partitioning depth, the maximum value of a partitioning depth may be differently set per sequence, picture, sub-picture, slice or tile, it may be set to have a different partitioning depth according to a partitioning tree shape (quad tree/binary tree/triple tree), and a syntax representing it may be signaled.

With a method such as quad tree partitioning, binary tree partitioning or triple tree partitioning, a coding unit of a leaf node may be configured by additionally partitioning a partitioned coding unit or without additional partitioning.

In reference to FIG. 5, a coding unit may be set by hierarchically partitioning one CTU and a coding unit may be partitioned by using at least any one of binary tree partitioning, quad tree partitioning or triple tree partitioning. Such a method is defined as multi tree partitioning.

A coding unit generated by partitioning an arbitrary coding unit whose partitioning depth is k is referred to as a lower coding unit and a partitioning depth is (k+1). A coding unit with a partitioning depth of k which includes a lower coding unit whose partitioning depth is (k+1) is referred to as a higher coding unit.

A partitioning type of a current coding unit may be limited according to a partitioning type of a higher coding unit and/or a partitioning type of a coding unit around a current coding unit.

In this case, a partitioning type represents an indicator which indicates which partitioning of binary tree partitioning, quad tree partitioning/triple tree partitioning is used.

FIG. 6 roughly shows a process in which a current block is reconstructed as an embodiment to which the present disclosure is applied.

In reference to FIG. 6, a prediction block of a current block may be generated based on a prediction mode which is pre-defined in an encoding/decoding device S600.

A prediction image may be generated by a plurality of methods in encoding/decoding a video, and a method of generating a prediction image is referred to as a prediction mode. A prediction mode may be configured with an intra prediction mode, an inter prediction mode, a current picture reference encoding mode or a combined encoding mode (combined prediction), etc.

An inter prediction mode is referred to as a prediction mode which generates a prediction block (a prediction image) of a current block by using information of a previous picture, and an intra prediction mode is referred to as a prediction mode which generates a prediction block by using a sample neighboring a current block. A prediction block may be generated by using a pre-reconstructed image of a current picture, which is defined as a current picture reference mode or an intra block copy mode. A prediction block may be generated by using at least 2 or more prediction modes of an inter prediction mode, an intra prediction mode or a current picture reference mode, which is defined as a combined prediction mode.

An intra prediction mode will be described in detail by referring to FIGS. 13 to 24. An inter prediction mode will be described in detail by referring to FIGS. 7 to 12.

In reference to FIG. 6, a residual block of a current block may be generated S610.

An encoding device may generate a residual block through a difference between a prediction block and an original block of a current block. A residual coefficient may be generated by performing at least one of transform or quantization for residual data of a residual block, and a generated residual coefficient may be encoded. Conversely, a decoding device may decode an encoded residual coefficient from a bitstream and reconstruct a residual block by performing at least one of dequantization or inverse transform for a decoded residual coefficient.

In this case, transform or inverse transform may be performed based on at least one of n transform types which are pre-defined in an encoding/decoding device. n may be an integer such as 1, 2, 3, 4, or more. In an example, a transform type may include at least one of DCT-2, DCT-8, DST-7 or a transform skip mode. Only one same transform type may be applied in a vertical/horizontal direction of one block, or a different transform type may be applied in a vertical/horizontal direction, respectively. To this end, a flag representing whether one same transform type is applied may be used. The flag may be signaled from an encoding device.

A transform type of a current block may be determined by selectively using any one of a method determined based on information which is explicitly signaled from an encoding device or a method which is implicitly determined in a decoding device. In this case, selection may be performed based on a flag representing whether information specifying a transform type is explicitly signaled. In other words, when the flag is a first value, it may represent that information specifying a transform type is explicitly signaled and otherwise, it may represent that a transform type is implicitly determined. The flag may be signaled at a level of at least one of a sequence, a picture, a slice, a CTU, a CU or a TU. Alternatively, the flag may be derived based on a predetermined encoding parameter. In this case, an encoding parameter may mean at least one of a size, a shape, an intra prediction mode or a component type (e.g., luma, chroma) of a block. A size of a block may be represented as a width, a height, a ratio of a width and a height, a multiplication of a width and a height, a sum/a difference of a width and a height, etc. In an example, when a size of a current block is greater than a predetermined threshold size, the flag may be derived as a first value and otherwise, the flag may be derived as a second value. In this case, a current block may mean a transform block corresponding to a current block, and a size may mean the maximum value or the minimum value of a width and a height. In addition, as a threshold size is a value which is pre-promised in an encoding/decoding device, it may be 16, 32, 64 or more.

Concretely, when the flag is a first value, a transform type may be determined based on at least one of information which is explicitly signaled from an encoding device (mts_idx) or a table which is pre-defined in a decoding device. mts_idx may specify at least one of whether a transform type in a vertical/horizontal is the same each other or a transform type applied to a vertical/horizontal direction. The table may be defined as in the following Table 1.

TABLE 1

| mts_idx   | 0 | 1 | 2 | 3 | 4 |
|-----------|---|---|---|---|---|
| trTypeHor | 0 | 1 | 2 | 1 | 2 |
| trTypeVer | 0 | 1 | 1 | 2 | 2 |

In Table 1, trTypeHor may mean a transform type in a horizontal direction and trTypeVer may mean a transform type in a vertical direction, respectively. When trTypeHor is 0, it may mean that DCT-2 is used as a transform type in a horizontal direction, when trTypeHor is 1, it may mean that DSCT-7 is used as a transform type in a horizontal direction, and when trTypeHor is 3, it may mean that DCT-8 is used as a transform type in a horizontal direction. TrTypeVer may be also defined in the same manner as trTypeHor.

When the flag is a second value, a transform type may be determined based on the above-described encoding parameter. For example, when a size of a current block is greater than a predetermined threshold value, a transform type may be determined as a first transform type (e.g., DST-7) and otherwise, a transform type may be determined as a second transform type (e.g., DCT-2).

In this case, a transform type may be determined for a vertical direction and a horizontal direction, respectively. In other words, a transform type in a horizontal direction may be determined by comparing a width of a current block with the threshold value, and a transform type in a vertical direction may be determined by comparing a height of a current block with the threshold value. The threshold value may be an integer such as 0, 4, 8, 16, 32, or more. The above-described transform and inverse transform will be described by referring to FIGS. 45 and 46.

In reference to FIG. 6, a current block may be reconstructed based on a prediction block and a residual block S620.

A current block may be reconstructed by adding a pre-generated prediction block and a residual block. A predetermined in-loop filter may be applied to a reconstructed current block. An in-loop filter may include at least one of a deblocking filter, a SAO (sample adaptive offset) filter or an ALF (adaptive loop filter), which will be described by referring to FIGS. 47 and 48.

FIGS. 7 to 16 show an intra prediction method as an embodiment to which the present disclosure is applied.

In reference to FIG. 7, intra prediction uses a pre-encoded/decoded boundary sample around a current block, which is defined as an intra reference sample.

Intra prediction may be performed by setting an average value of an intra reference sample as a value of all samples of a prediction block (a DC mode) or generating a prediction sample by performing weighted prediction for a prediction sample in a horizontal direction generated by performing weighted prediction for a reference sample in a horizontal direction and a prediction sample in a vertical direction generated by performing weighted prediction for a reference sample in a vertical direction (a Planar mode) or using a directional intra prediction mode, etc.

In reference to FIG. 8A, intra prediction may be performed by using 33 directional modes and 2 nondirectional modes (i.e., a Planar mode and a DC mode) as in the left picture, and in reference to FIG. 8B, 65 directional modes and 2 nondirectional modes may be used. When directional intra prediction is used, an intra reference sample (a reference sample) may be generated by considering directionality of an intra prediction mode, and intra prediction may be performed by using the generated intra reference sample.

An intra reference sample at a left position of a coding unit is referred to as a left intra reference sample, and an intra reference sample at a top position of a coding unit is referred to as a top intra reference sample.

When directional intra prediction is performed, an intra directional parameter (intraPredAng), a parameter representing a prediction direction (or a prediction angle), may be set according to an intra prediction mode as in Table 2. Table 2 is just an example which is based on a directional mode having a value of 2 to 34 among 35 intra prediction modes. It is natural that as a prediction direction (or a prediction angle) of a directional mode is further subdivided, 33 or more directional modes may be used.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

When intraPredAng is a negative number (e.g., when an intra prediction mode index is between 11 and 25), a left intra reference sample and a top intra reference sample of a current block may be reconfigured as a one-dimensional reference sample (Ref_1D) configured with 1D according to an angle of an intra prediction mode as in FIG. 9.

When an intra prediction mode index is between 11 and 18, a one-dimensional reference sample may be generated counterclockwise from an intra reference sample at a top-right position of a current block to an intra reference sample at a bottom-left position as in FIG. 10. In other modes, a one-dimensional reference sample may be generated by using only a top intra reference sample or a left intra reference sample.

When an intra prediction mode index is between 19 and 25, a one-dimensional reference sample may be generated clockwise from an intra reference sample at a bottom-left position of a current block to an intra reference sample at a top-right position as in FIG. 11.

A reference sample determination index (iIdx) and a weight-related parameter (ifact) applied to at least one reference sample determined based on iIdx may be derived as in Equation 1. iIdx and ifact may be variably determined according to a slope of a directional intra prediction mode, and a reference sample specified by iIdx may correspond to an integer pel.

$$iIDx = (y+1)*Pang/32 \quad \text{[Equation 1]}$$
$$ifact = [(y+1)*Pang] \& 31$$

A prediction image may be derived by specifying at least one or more one-dimensional reference samples per prediction sample. For example, a position of a one-dimensional reference sample which may be used to generate a prediction sample may be specified by considering a slope value of a directional mode. Each prediction sample may have a different directional mode. A plurality of intra prediction modes may be used for one prediction block. A plurality of intra prediction modes may be represented as a combination of a plurality of nondirectional modes, may be represented as a combination of one nondirectional mode and at least one directional mode or may be represented as a combination of a plurality of directional modes. A different intra prediction mode may be applied per predetermined sample group in one prediction block. A predetermined sample group may be configured with at least one sample. The number of sample groups may be variably determined according to a size/the number of samples of a current prediction block or may be the fixed number which is pre-set in an encoder/a decoder independently from a size/the number of samples of a prediction block.

Concretely, for example, a position of a one-dimensional reference sample may be specified by using a reference sample determination index (iIdx).

When a slope of an intra prediction mode may not be represented by only one one-dimensional reference sample according to a slope of an intra prediction mode, a first prediction image may be generated by interpolating an adjacent one-dimensional reference sample as in Equation 2. When an angular line according to a slope/an angle of an intra prediction mode does not pass a reference sample positioned at an integer-pel, a first prediction image may be generated by interpolating a reference sample adjacent to the left/right or the top/bottom of a corresponding angular line. A filter coefficient of an interpolation filter used in this case may be determined based on ifact. For example, a filter coefficient of an interpolation filter may be derived based on a distance between a fractional-pel positioned on an angular line and a reference sample positioned at the integer-pel.

$$P(x, y) = ((32 - ifact)/32)*\text{Ref\_1D}(x+iIdx+1) + \quad \text{[Equation 2]}$$
$$(ifact/32)*\text{Ref\_1D}(x+iIdx+2)$$

When a slope of an intra prediction mode may be represented only by one one-dimensional reference sample (i.e., when a value of ifact is 0), a first prediction image may be generated as in Equation 3.

$$P(x, y) = \text{Ref\_1D}(x+iIdx+1) \quad \text{[Equation 3]}$$

A prediction angle of a directional mode may be set between 45 degrees and −135 degrees as in FIG. 12.

When an intra prediction mode is performed in a non-square coding unit, a disadvantage that a current sample is predicted in an intra reference sample distant from a current sample instead of an intra reference sample close to a current sample may occur due to a pre-defined prediction angle.

For example, as in the left picture of FIG. 13, for a coding unit that a width of a coding unit is greater than a height of a coding unit (hereinafter, a coding unit in a horizontal direction), intra prediction may be performed by using a distant sample L instead of a close sample T. For another example, as in the right picture of FIG. 13, for a coding unit that a height of a coding unit is greater than a width of a coding unit (hereinafter, a coding unit in a vertical direction), intra prediction may be performed by using a distant sample T instead of a close sample L.

In a non-square coding unit, intra prediction may be performed at a prediction angle wider than a pre-defined prediction angle, which is defined as a wide-angle intra prediction mode.

A wide-angle intra prediction mode may have a prediction angle of (45+α) to (−135−β), and a prediction angle out of an angle used in the existing intra prediction mode is defined as a wide-angle angle.

In the left picture of FIG. 13, sample A in a coding unit that a width is greater than a height may be predicted by using intra reference sample T with a wide-angle intra prediction mode.

In the right picture of FIG. 13, sample A in a coding unit that a width is smaller than a height may be predicted by using intra reference sample L with a wide-angle intra prediction mode.

(N+M) intra prediction modes may be defined by adding M wide-angle angles to N existing intra prediction modes. Concretely, for example, as in Table 3, a total of 95 intra prediction modes may be defined by adding 28 wide-angle angles to 67 intra modes.

An intra prediction mode which may be used by a current block may be determined according to a shape of a current block. In an example, 65 directional intra prediction modes of 95 directional intra prediction modes may be selected based on at least one of a size of a current block, an aspect ratio (e.g., a ratio of a width and a height), or a reference line index.

Concretely, for example, when 35 intra prediction modes are used as in FIG. 15, wide-angle intra prediction mode 35 may be encoded into intra prediction mode 2, a wide-angle replaced mode, and wide-angle intra prediction mode 36 may be encoded into intra prediction mode 3, a wide-angle replaced mode. Accordingly, in a decoding device, when a current block has a non-square shape, a pre-derived intra prediction mode may be replaced with a wide-angle replaced mode. To this end, a wide-angle replaced mode may be determined by subtracting or adding a predetermined offset from or to a pre-derived intra prediction mode, which may be used as a final intra prediction mode of a current block. According to at least one of a shape of a coding block or a ratio of a height and a width of a coding block, a type and the number of replaced modes may be differently set. Concretely, for example, Table 4 represents an intra prediction mode used according to a ratio of a width and a height of a coding block.

TABLE 4

| Aspect ratio | Replaced intra prediction modes |
| --- | --- |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |

TABLE 3

| predModeIntra | −14 | −13 | −12 | −11 | −10 | −9 | −8 | −7 | −6 | −5 | −4 | −3 | −2 | −1 | 2 | 3 | 4 |
| --- | --- | --- | --- | --- | --- | --- | --- | --- | --- | --- | --- | --- | --- | --- | --- | --- | --- |
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

An angle of an intra prediction mode shown in Table 3 may be adaptively determined based on at least one of a shape of a current block or a reference line index. In an example, intraPredAngle of Mode 15 may be set to have a greater value when a current block is square than when a current block is non-square. Alternatively, intraPredAngle of Mode 75 may be set to have a greater value when a non-adjacent reference line is selected than when an adjacent reference line is selected.

When a wide-angle intra prediction mode is used, a length of a top intra reference sample may be set as (2 W+1) and a length of a left intra reference sample may be set as (2H+1) as in FIG. 14.

When wide-angle intra prediction is used, the number of intra prediction modes increases when an intra prediction mode of a wide-angle intra prediction mode is encoded, so encoding efficiency may be reduced. A wide-angle intra prediction mode may be encoded by being replaced with the existing intra prediction mode which is not used in wide-angle intra, and a replaced prediction mode is referred to as a wide-angle replaced mode. A wide-angle replaced mode may be an intra prediction mode in a direction opposite to a wide-angle intra prediction mode.

TABLE 4-continued

| Aspect ratio | Replaced intra prediction modes |
| --- | --- |
| W/H == ⅛ | Modes 55, 56 |
| W/H == 1/16 | Modes 53, 54, 55, 56 |

After generating an intra prediction image, an intra prediction image may be updated per each sample based on a sample position, which is defined as a Position dependent prediction combination (PDPC).

In reference to FIG. 16, intra prediction may be performed by selectively using at least one of a plurality of intra reference lines, which is referred to as a multi-line intra prediction method.

Intra prediction may be performed by selecting any one of a plurality of intra reference lines configured with an adjacent intra reference line and a non-adjacent intra reference line. A non-adjacent intra reference line may be configured with at least one of a first non-adjacent intra reference line (non-adjacent reference line index 1), a second non-adjacent intra reference line (non-adjacent reference line index 2) or a third non-adjacent intra reference line (non-adjacent reference line index 3). Only part of the above-described non-adjacent intra reference lines may be used. In an example, a non-adjacent intra reference line may be configured only with a first non-adjacent intra reference line and a second non-adjacent intra reference line or may be configured only with a first non-adjacent intra reference line and a third non-adjacent intra reference line.

An intra reference line index (intra_luma_ref_idx), a syntax specifying a reference line used for intra prediction, may be signaled in a unit of a coding unit.

Concretely, when an adjacent intra reference line, a first non-adjacent intra reference line and a third non-adjacent intra reference line are used, intra_luma_ref_idx may be defined as in the following Table 5.

TABLE 5

| intra_luma_ref_idx[ x0 ][ y0 ] | Reference Line used for Intra Prediction |
|---|---|
| 0 | Adjacent Intra Reference Line |
| 1 | First Non-adjacent Reference Line |
| 2 | Third Non-adjacent Reference Line |

When a non-adjacent intra reference line is used, it may be set not to use a nondirectional intra prediction mode. In other words, when a non-adjacent intra reference line is used, there may be a limit that a DC mode or a planar mode is not used.

The number of samples belonging to a non-adjacent intra reference line may be set to be greater than the number of samples of an adjacent intra reference line. In addition, the number of samples of a (i+1)-th non-adjacent intra reference line may be set to be greater than the number of samples of a i-th non-adjacent intra reference line. A difference between the number of top samples of a i-th non-adjacent intra reference line and the number of top samples of a (i−1)-th non-adjacent intra reference line may be represented as offsetX[i], an offset for the number of reference samples.

offsetX[1] represents a difference value between the number of top samples of a first non-adjacent intra reference line and the number of top samples of an adjacent intra reference line. A difference between the number of left samples of a i-th non-adjacent intra reference line and the number of left samples of a (i−1)-th non-adjacent intra reference line may be represented as offsetY[i], an offset for the number of reference samples. offsetY[1] represents a difference value between the number of left samples of a first non-adjacent intra reference line and the number of left samples of an adjacent intra reference line.

A non-adjacent intra reference line that an intra reference line index is i may be configured with a top non-adjacent reference line (refW+offsetX[i]), a left non-adjacent reference line (refH+offsetY[i]), and one or more samples at a top-left position (k), and the number of samples belonging to a non-adjacent intra reference line may be (refW+refH+offsetX[i]+offsetY[i]+k). In this case, refW and refH may be defined as in the following Equation 4.

$$refW = 2 * nTbW \qquad \text{[Equation 4]}$$
$$refH = 2 * nTbH$$

In Equation 4, nTbW may represent a width of a coding unit, nTbH may represent a height of a coding unit, and whRatio may be defined as in the following Equation 5. In this case, a coding unit may be interpreted as a transform unit corresponding to a coding unit.

$$whRatio = \log 2(nTbW/nTbH) \qquad \text{[Equation 5]}$$

In a multi-line intra prediction encoding method, it may be set not to use a wide-angle intra mode when a non-adjacent intra reference line is used. Alternatively, when a MPM (most probable mode) of a current coding unit is a wide-angle intra mode, it may be set not to use a multi-line intra prediction encoding method.

In this case, a non-adjacent intra reference line that an intra reference line index is i may be configured with a top non-adjacent reference line (W+H+offsetX[i]), a left non-adjacent reference line (H+W+offsetY[i]) and one or more top-left samples (k), and the number of samples belonging to a non-adjacent intra reference line may be configured as (2 W+2H+offsetX[i]+offsetY[i]+k), and a value of offsetX[i] and offsetY[i] may vary according to a value of whRatio.

For example, when a value of whRatio is greater than 1, a value of offsetX[i] may be set to be 1 and a value of offsetY[i] may be set to be 0, and when a value of whRatio is smaller than 1, a value of offsetX[i] may be set to be 0 and a value of offsetY[i] may be set to be 1.

FIG. 17 shows an inter prediction method as an embodiment to which the present disclosure is applied.

A method in which a prediction block (a prediction image) of a block in a current picture is generated by using information of a previous picture is referred to as an inter prediction mode. A prediction block may be generated from a specific block in a previous picture of a current block. A block with the smallest reconstruction error among blocks in a previous picture may be selected by being searched based on a collocated block, and a x-axis difference and a y-axis difference between a top-left sample of a current block and a top-left sample of a selected block is defined as a motion vector, which may be transmitted to a bitstream and signaled. A block generated by interpolation, etc. in a specific block of a reference picture specified by a motion vector is referred to as a motion compensation prediction block.

A collocated block represents a block of a corresponding picture that a position and a size of a top-left sample are the same as a current block as in FIG. 17. A corresponding picture may be specified by the same syntax as a reference picture reference.

A prediction block may be generated by considering a motion of an object in an inter prediction mode. For example, if knowing in which direction and how much an object in a previous picture moves, a prediction block (a prediction image) may be generated by subtracting a block considering a motion from a current block, which is defined as a motion prediction block.

A residual block may be generated by subtracting a motion prediction block or a corresponding prediction block from a current block. When a motion is generated in an object, energy of a residual block decreases if a motion prediction block rather than a corresponding prediction block is used, so compression performance may be improved. As such, a method of using a motion prediction block is referred to as motion compensation prediction and motion compensation prediction is used for most inter prediction.

A value representing in which direction and how much an object in a previous picture moves is referred to as a motion vector. A motion vector may use a motion vector having different pixel precision in a unit of a sequence, a tile group or a block. For example, pixel precision of a motion vector in a specific block may be at least any one of an octor-pel, a Quarter-Pel, a Half-Pel, an Integer pel, or a 4-Integer pel.

For an inter prediction mode, an inter prediction method using a translation motion and an affine inter prediction method using an affine motion may be selectively used.

FIGS. 18 to 30 show an affine inter prediction method as an embodiment to which the present disclosure is applied.

In a video, a lot of cases occur in which a motion of a specific object does not appear linearly. For example, as in FIG. 18, when only a translation motion vector is used for a motion of an object in an image that an affine motion such as zoom-in, zoom-out, rotation, affine transform which allows transform in an arbitrary shape, etc. is used, a motion of an object may not be effectively represented and encoding performance may be reduced.

An affine motion may be represented as in the following Equation 6.

$$v_x = ax - by + e \quad \text{[Equation 6]}$$
$$v_y = cx + dy + f$$

When an affine motion is represented by using a total of 6 parameters, it is effective for an image with a complex motion, but a lot of bits are used to encode an affine motion parameter, so encoding efficiency may be reduced.

Therefore, an affine motion may be simplified and represented with 4 parameters, which is defined as a 4-parameter affine motion model. Equation 7 represents an affine motion with 4 parameters.

$$v_x = ax - by + e \quad \text{[Equation 7]}$$
$$v_y = bx + ay + f$$

A 4-parameter affine motion model may include a motion vector at 2 control points of a current block. A control point may include at least one of a top-left corner, a top-right corner or a bottom-left corner of a current block. In an example, a 4-parameter affine motion model may be determined by a motion vector sv0 at a top-left sample (x0, y0) of a coding unit and a motion vector sv1 at a top-right sample (x1, y1) of a coding unit as in the left picture of FIG. 19, and sv0 and sv1 are defined as an affine seed vector. Hereinafter, it is assumed that an affine seed vector sv0 at a top-left position is a first affine seed vector and an affine seed vector sv1 at a top-right position is a second affine seed vector. It is possible to replace one of a first and second affine seed vector with an affine seed vector at a bottom-left position and use it in a 4-parameter affine motion model.

A 6-parameter affine motion model is an affine motion model that a motion vector sv2 at a residual control point (e.g., a sample at a bottom-left position (x2, y2)) is added to a 4-parameter affine motion model as in the right picture of FIG. 19. Hereinafter, it is assumed that an affine seed vector sv0 at a top-left position is a first affine seed vector, an affine seed vector sv1 at a top-right position is a second affine seed vector and an affine seed vector sv2 at a bottom-left position is a third affine seed vector.

Information on the number of parameters for representing an affine motion may be signaled in a bitstream. For example, a flag representing whether a 6-parameter is used or a flag representing whether a 4-parameter is used may be encoded in a unit of at least one of a video sequence, a picture, a slice, a tile group, a tile, a coding unit or a CTU. Accordingly, any one of a 4-parameter affine motion model or a 6-parameter affine motion model may be selectively used in a unit of a video sequence, a picture, a slice, a tile group, a coding unit or a CTU.

A motion vector may be derived per sub-block of a coding unit by using an affine seed vector as in FIG. 20, which is defined as an affine sub-block vector.

An affine sub-block vector may be derived as in the following Equation 8. In this case, a basic sample position of a sub-block (x, y) may be a sample positioned at a corner of a block (e.g., a top-left sample) or may be a sample that at least one of a x-axis or a y-axis is at the center (e.g., a central sample).

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x} \quad \text{[Equation 8]}$$
$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

Motion compensation may be performed in a unit of a coding unit or in a unit of a sub-block in a coding unit by using an affine sub-block vector, which is defined as an affine inter prediction mode. In Equation 8, $(x_1-x_0)$ may be equal to a value of a width w of coding unit or may be set to w/2 or w/4.

A reference picture list and an affine seed vector of a current coding unit may be derived by using an affine motion vector of a neighboring block of a current coding unit (an affine sub-block vector or an affine seed vector), which is referred to as an affine merge mode.

An affine merge mode may derive an affine seed vector of a current block from an affine motion vector of a neighboring block when at least any one of neighboring blocks of a current coding unit (e.g., A, B, C, D, E in FIG. 21) is encoded by an affine mode (an affine inter prediction mode or an affine merge mode). Among neighboring blocks, a block encoded by an affine mode is referred to as an affine neighboring block.

A search order of neighboring blocks follows a predefined order such as A->B->C->D->E, and an affine seed vector of a current block may be derived from a first affine neighboring block in a search order. Alternatively, any one neighboring block among neighboring blocks may be selected, and an index of a selected neighboring block may be encoded.

Alternatively, up to 2 affine seed vectors may be derived from neighboring block A0, A1, B0, B1, B2 of a current coding unit. In an example, an affine seed vector may be derived from any one neighboring block of neighboring blocks {A0, A1} in FIG. 22 and another affine seed vector may be derived from {B0, B1, B2}, which is referred to as an affine merge mode.

As in FIG. 23, a third seed vector nv2=(nv2x, nv2y) may be derived from nv0=(nv0x, nv0y) and nv1=(nv1x, nv1y), seed vectors of affine neighboring blocks.

As in the following Equation 9, a third seed vector of an affine neighboring block may be derived.

$$nv_{2x} = \quad \text{[Equation 9]}$$
$$\frac{(nv_{1x} - nv_{0x})}{(x_{n1} - x_{n0})}(x_{n2} - x_{n0}) - \frac{(nv_{1y} - nv_{0y})}{(x_{n1} - x_{n0})}(y_{n2} - y_{n0}) + nv_{0x}$$

$$nv_{2y} = \frac{(nv_{1y} - nv_{0y})}{(x_{n1} - x_{n0})}(x_{n2} - x_{n0}) -$$

$$\frac{(nv_{1x} - nv_{0x})}{(x_{n1} - x_{n0})}(y_{n2} - y_{n0}) + nv_{0y}$$

As in the following Equations 10 and 11, a seed vector of a current block may be derived by using a first affine seed vector, a second affine seed vector and a third seed vector of a neighboring block.

$$v_{0x} = \frac{(nv_{1x} - nv_{0x})}{(x_{n1} - x_{n0})}(x_0 - x_{n0}) - \frac{(nv_{2x} - nv_{0x})}{(y_{n2} - x_{n0})}(y_0 - y_{n0}) + nv_{0x} \quad \text{[Equation 10]}$$

$$v_{0y} = \frac{(nv_{1y} - nv_{0y})}{(x_{n1} - x_{n0})}(x_0 - x_{n0}) - \frac{(nv_{2y} - nv_{0y})}{(y_{n2} - x_{n0})}(y_0 - y_{n0}) + nv_{0y}$$

$$v_{1x} = \frac{(nv_{1x} - nv_{0x})}{(x_{n1} - x_{n0})}(x_1 - x_{n0}) - \frac{(nv_{2x} - nv_{0x})}{(y_{n2} - x_{n0})}(y_1 - y_{n0}) + nv_{0x} \quad \text{[Equation 11]}$$

$$v_{1y} = \frac{(nv_{1y} - nv_{0y})}{(x_{n1} - x_{n0})}(x_1 - x_{n0}) - \frac{(nv_{2y} - nv_{0y})}{(y_{n2} - x_{n0})}(y_1 - y_{n0}) + nv_{0y}$$

Alternatively, a seed vector of a current block may be derived by using two of a first affine seed vector, a second affine seed vector and a third seed vector of neighboring blocks.

At least one of a first seed vector, a second seed vector or a third seed vector of neighboring blocks may be replaced with a motion vector of a sub-block at the lowest position among sub-blocks of an affine neighboring block. In an example, as in FIG. 24, a specific sample position may be specified based on a bottom-left sub-block or a bottom center sub-block of affine neighboring blocks (hereinafter, a fourth affine sub-block) and a bottom-right sub-block or a bottom center sub-block of affine neighboring blocks (hereinafter, a fifth affine sub-block), and an affine seed vector may be derived by using a specific sample position. This specific sample position is referred to as a position of an affine basic sample.

A position of a fourth affine sub-block and a fifth affine sub-block may be differently set according to whether a target block exists in a top CTU of a current block. For example, when a target block exists in a top CTU of a current block (a top CTU of a CTU to which a current block belongs), as in FIG. 25, a fourth affine sub-block may be set as a bottom center sub-block and a fifth affine sub-block may be set as a bottom-right sub-block. In this case, a difference between a fourth affine basic sample (a basic sample of a fourth affine sub-block) and a fifth affine basic sample (a basic sample of a fifth affine sub-block) may be set to be power series ($2^n$). For example, it may be set to be nbW/2. In this case, nbW may be set as a width of a neighboring block.

At least one of a first seed vector, a second seed vector or a third seed vector of neighboring blocks may be replaced with a motion vector of a sub-block at the lowest position among sub-blocks of an affine neighboring block. In an example, as in FIG. 24, a specific sample position may be specified based on a bottom-left sub-block or a bottom center sub-block of affine neighboring blocks (hereinafter, a fourth affine sub-block) and a bottom-right sub-block or a bottom center sub-block of affine neighboring blocks (hereinafter, a fifth affine sub-block) and an affine seed vector may be derived by using a specific sample position. This specific sample position is referred to as a position of an affine basic sample.

A position of a fourth affine sub-block and a fifth affine sub-block may be differently set according to whether a target block exists in a top CTU of a current block. For example, when a target block exists in a top CTU of a current block (a top CTU of a CTU to which a current block belongs), as in FIG. 25, a fourth affine sub-block may be set as a bottom center sub-block and a fifth affine sub-block may be set as a bottom-right sub-block. In this case, a difference between a fourth affine basic sample (a basic sample of a fourth affine sub-block) and a fifth affine basic sample (a basic sample of a fifth affine sub-block) may be set to be power series ($2^n$). For example, it may be set to be nbW/2. In this case, nbW may be set as a width of a neighboring block.

When a target block exists in a left CTU of a current block (a left CTU of a CTU to which a current block belongs), a fourth affine sub-block may be set as a bottom-left sub-block and a fifth affine sub-block may be set as a bottom-right sub-block.

For another example, when a target block exists in a higher CTU of a current block (a top CTU of a CTU to which a current block belongs), as in FIG. 26, a fourth affine sub-block may be set as a bottom-left sub-block and a fifth affine sub-block may be set as a bottom center sub-block. In this case, a difference between a fourth affine basic sample (a basic sample of a fourth affine sub-block) and a fifth affine basic sample (a basic sample of a fifth affine sub-block) may be set to be power series ($2^n$). For example, it may be set to be nbW/2. In this case, nbW may be set as a width of a neighboring block.

An affine basic sample position may be set as a top-left block or a bottom-right block of a sub-block or a central sample. Alternatively, a fourth affine sub-block and a fifth affine sub-block may be set to have a different affine basic sample position. Concretely, for example, as in the left picture of FIG. 27, an affine basic sample position of a fourth affine sub-block (hereinafter, a fourth affine basic sample position) may be set as a top-left sample in a sub-block and an affine basic sample position of a fifth affine sub-block (hereinafter, a fifth affine basic sample position) may be set as a right sample ($x_i+1$, $y_i$) of a top-right sample ($x_i$, $y_i$) in a sub-block.

In this case, for a base position of a fifth affine sub-block, a right sample of a top-right sample is used, but a motion vector of a fifth affine sub-block may be set as a motion vector of a top-right sample. Alternatively, a motion vector of a right sample of a top-right sample may be set as a motion vector of a fifth affine sub-block.

For another example, as in the right picture of FIG. 27, a fourth affine basic sample position may be set as a left sample ($x_i-1$, $y_i$) of a top-right sample ($x_i$, $y_i$) in a fourth affine sub-block. In this case, for a base position of a fourth affine sub-block, a left sample of a top-left sample is used, but a motion vector of a fourth affine sub-block may be set as a motion vector of a top-left sample. Alternatively, a motion vector of a left sample of a top-left sample may be set as a motion vector of a fourth affine sub-block.

For another example, as in the left picture of FIG. 28, a fourth affine basic sample position may be set as a bottom-left sample in a sub-block and a fifth affine basic sample position may be set as a right sample ($x_j+1$, $y_j$) of a bottom-right sample ($x_j$, $y_j$) in a sub-block. In this case, for a base position of a fifth affine sub-block, a right sample of a bottom-right sample is used, but a motion vector of a fifth affine sub-block may be set as a motion vector of a bottom-right sample. Alternatively, a motion vector of a right sample of a bottom-right sample may be set as a motion vector of a fifth affine sub-block.

For another example, as in the left picture of FIG. 28, a fourth affine basic sample position may be set as a left sample ($x_j$–1, $y_j$) of a bottom-left sample ($x_j$, $y_j$) in a sub-block, and a fifth affine basic sample position may be set as a bottom-right sample in a sub-block.

In this case, for a base position of a fifth affine sub-block, a left sample of a bottom-left sample is used, but a motion vector of a fifth affine sub-block may be set as a motion vector of a bottom-left sample. Alternatively, a motion vector of a left sample of a bottom-left sample may be set as a motion vector of a fifth affine sub-block.

For another example, as in the left picture of FIG. 29, a fourth affine basic sample position may be set as a sample between a top-left sample and a bottom-left sample in a sub-block (hereinafter, a left center sample), and a fifth affine basic sample position may be set as a right sample ($x_k$+1, $y_k$) of a sample ($x_k$, $y_k$) between a top-right sample and a bottom-right sample in a sub-block (hereinafter, a right center sample). In this case, for a base position of a fifth affine sub-block, a right sample of a right center sample is used, but a motion vector of a fifth affine sub-block may be set as a motion vector of a right center sample. Alternatively, a motion vector of a right sample of a right center sample may be set as a motion vector of a fifth affine sub-block.

For another example, as in the right picture of FIG. 29, a fourth affine basic sample position may be set as a left sample ($x_k$–1, $y_k$) of a left center sample ($x_k$, $y_k$), and a fifth affine basic sample position may be set as a right center sample.

Alternatively, as in Equations 12 and 13, an affine motion vector of at least one of a fourth affine sub-block or a fifth affine sub-block may be derived from a first seed vector and a second seed vector of an affine neighboring block, which is referred to as a fourth affine seed vector $nv_3=(nv_{3x}, nv_{3y})$ and a fifth affine seed vector $nv_4=(nv_{4x}, nv_{4y})$, respectively.

$$nv_{3x} = \frac{(nv_{1x} - nv_{0x})}{(x_{n1} - x_{n0})}(x_{n3} - x_{n0}) - \frac{(nv_{1y} - nv_{0y})}{(x_{n1} - x_{n0})}(y_{n3} - y_{n0}) + nv_{0x}$$

$$nv_{3y} = \frac{(nv_{1y} - nv_{0y})}{(x_{n1} - x_{n0})}(x_{n3} - x_{n0}) - \frac{(nv_{1x} - nv_{0x})}{(x_{n1} - x_{n0})}(y_{n3} - y_{n0}) + nv_{0y}$$

[Equation 12]

$$nv_{4x} = \frac{(nv_{1x} - nv_{0x})}{(x_{n1} - x_{n0})}(x_{n4} - x_{n0}) - \frac{(nv_{1y} - nv_{0y})}{(x_{n1} - x_{n0})}(y_{n4} - y_{n0}) + nv_{0x}$$

$$nv_{4y} = \frac{(nv_{1y} - nv_{0y})}{(x_{n1} - x_{n0})}(x_{n4} - x_{n0}) - \frac{(nv_{1x} - nv_{0x})}{(x_{n1} - x_{n0})}(y_{n4} - y_{n0}) + nv_{0y}$$

[Equation 13]

A first affine seed vector and a second affine seed vector of a current block may be derived by using a fourth affine seed vector and a fifth affine seed vector as in Equations 14 and 15.

$$v_{0x} = \frac{(nv_{4x} - nv_{3x})}{(x_{n4} - x_{n3})}(x_0 - x_{n3}) - \frac{(nv_{4y} - nv_{3y})}{(x_{n4} - x_{n3})}(y_0 - y_{n3}) + nv_{3x}$$

$$v_{0y} = \frac{(nv_{4y} - nv_{3y})}{(x_{n4} - x_{n3})}(x_0 - x_{n3}) - \frac{(nv_{4x} - nv_{3x})}{(x_{n4} - x_{n3})}(y_0 - y_{n3}) + nv_{3y}$$

[Equation 14]

$$v_{1x} = \frac{(nv_{4x} - nv_{3x})}{(x_{n4} - x_{n3})}(x_1 - x_{n3}) - \frac{(nv_{4y} - nv_{3y})}{(x_{n4} - x_{n3})}(y_1 - y_{n3}) + nv_{3x}$$

$$v_{1y} = \frac{(nv_{4y} - nv_{3y})}{(x_{n4} - x_{n3})}(x_1 - x_{n3}) - \frac{(nv_{4x} - nv_{3x})}{(x_{n4} - x_{n3})}(y_1 - y_{n3}) + nv_{3y}$$

[Equation 15]

In Equations 14 and 15, $X_{n4}$–$X_{n3}$ may be set as $W_{seed}$. $W_{seed}$ is referred to as a sub seed vector width. A sub seed vector width $W_{seed}$ may be set to be power series of 2 ($2^n$).

When a sub seed vector width $W_{seed}$ is not a power series of 2 ($2^n$), Equations 14 and 15 may be applied after adding a specific offset so that $W_{seed}$ will be power series of 2, and it may be replaced with a bit shift operation instead of a division operation.

When it exists on a LCU boundary, without deriving an affine seed vector as in Equations 12 and 13, translation motion vector information at a fourth affine basic sample position may be set as a fourth affine seed vector and translation motion vector information at a fifth affine basic sample position may be set as a fifth affine seed vector.

Regardless of whether it exists on a LCU boundary, translation motion vector information at a i-th affine basic sample position may be set as a i-th affine seed vector. In this case, a scope of i may be set as 1 to 5.

Alternatively, translation motion vector information at a fourth affine basic sample position may be set as a first affine seed vector, and translation motion vector information at a fifth affine basic sample position may be set as a second affine seed vector.

Alternatively, when an affine basic sample does not belong to an affine neighboring block, motion vector information may be derived from a sample of an affine neighboring block which is closest to an affine basic sample, which is referred to as a modified affine merge vector derivation method.

Concretely, for example, as in FIG. 30, when a fifth affine basic sample ($X_{n4}$, $y_{n4}$) does not belong to an affine neighboring block, translation motion vector information of a block including a left boundary sample of a fifth affine basic sample (i.e., ($X_{n4}$–1, $y_{n4}$)) may be set as a fifth affine seed vector.

FIG. 31 shows a merge mode based inter prediction method as an embodiment to which the present disclosure is applied.

Motion information of a current coding unit (a motion vector, a reference picture index, etc.) may be derived by motion information of a neighboring block without being encoded. Motion information of any one of neighboring blocks may be set as motion information of a current coding unit, which is defined as a merge mode.

In reference to FIG. 31, a merge candidate list of a current block may be configured 53100.

A merge candidate list may include one or a plurality of merge candidates which may be used to derive motion information of a current block. A size of a merge candidate list may be variably determined based on information indicating the maximum number of merge candidates configuring a merge candidate list (hereinafter, size information). The size information may be encoded and signaled from an encoding device or may be a fixed value (e.g., an integer such as 2, 3, 4, 5, 6 or more) which is pre-promised in a decoding device.

A plurality of merge candidates belonging to a merge candidate list may include at least one of a spatial merge candidate or a temporal merge candidate.

A spatial merge candidate may mean a neighboring block which is spatially adjacent to a current block or motion information of the neighboring block. In this case, a neighboring block may include at least one of a bottom-left block (A0), a left block (A1), a top-right block (B0), a top block (B1) or a top-left block (B2). According to a predetermined priority, available neighboring blocks among the neighboring blocks may be sequentially added to a merge candidate list. For example, a priority may be defined as B1->A1->B0->A1->B2, A1->B1->A0->B1->B2, A1->B1->B0->A0->B2, etc., but it is not limited thereto.

However, a neighboring block belonging to the same parallel merge region as a current block may be excluded from a spatial merge candidate of a current block. In an example, a neighboring block belonging to the same parallel merge region as a current block may be determined to be unavailable as a spatial merge candidate of a current block. A parallel merge region may include one or more coding blocks and a plurality of coding blocks belonging to one parallel merge region may be encoded/decoded independently or in parallel. A parallel merge region may mean a region that a spatial merge candidate of each coding block is derived without dependence between a plurality of coding blocks belonging to a parallel merge region. In this case, an independent or parallel encoding/decoding process may include at least one of intra prediction, inter prediction, transform (inverse transform), quantization (dequantization) or in-loop filtering. Information representing a size of a parallel merge region may be signaled from an encoding device and a size of a parallel merge region may be variably determined based on signaled information. In this case, information may be signaled at a level of at least one of a video sequence, a picture or a slice.

On the other hand, a spatial merge candidate may further include a neighboring block which is not adjacent to a current block, which will be described by referring to FIG. 32 and FIG. 33.

A temporal merge candidate may mean one or more co-located blocks belonging to a co-located picture or motion information of the co-located block. In this case, a co-located picture is any one of a plurality of reference pictures belonging to a reference picture list, which may be a picture different from a picture to which a current block belongs. A co-located picture may be a picture which is positioned first or last in a reference picture list. Alternatively, a co-located picture may be specified based on an index encoded to indicate a co-located picture. A co-located block may include at least one of a block (C1) including a central position of a current block or a neighboring block (C0) adjacent to a bottom-right corner of a current block. According to a predetermined priority, an available block of the C0 and C1 may be sequentially added to a merge candidate list. For example, C0 may have a higher priority over C1. However, it is not limited thereto and C1 may have a higher priority over C0.

An encoding/decoding device may include a buffer which stores motion information of one or more blocks which is encoded/decoded before a current block (hereinafter, a previous block). In other words, a buffer may store a list configured with motion information of a previous block (hereinafter, a motion information list).

The motion information list may be initialized in a unit of any one of a picture, a slice, a tile, a CTU row or a CTU. Initialization may mean a state that a motion information list is empty. Motion information of a corresponding previous block may be sequentially added to a motion information list in an encoding/decoding order of a previous block, and a motion information list may be updated by a method of FIFO (first-in first-out) by considering a size of a motion information list. For example, when motion information which is most recently encoded/decoded (hereinafter, recent motion information) is the same as motion information which is pre-added to a motion information list, recent motion information may not be added to a motion information list. Alternatively, the same motion information as recent motion information may be removed from a motion information list and recent motion information may be added to a motion information list. In this case, recent motion information may be added to the last position of a motion information list or may be added to a position of removed motion information. A method of configuring and updating a motion information list will be described by referring to FIG. 34 to FIG. 40.

A previous block may include at least one of one or more neighboring blocks which are spatially adjacent to a current block or one or more neighboring blocks which are not spatially adjacent to a current block.

A merge candidate list may further include a previous block belonging to a buffer or a motion information list or motion information of a previous block as a merge candidate.

To this end, a redundance check between a motion information list and a merge candidate list may be performed. A redundance check may be performed for all or part of merge candidates belonging to a merge candidate list and all or part of previous blocks in a motion information list. However, for convenience of description, it is assumed that a redundance check in the present disclosure is performed for part of merge candidates belonging to a merge candidate list and part of previous blocks in a motion information list. In this case, part of merge candidates in a merge candidate list may include at least one of a left block or a top block of spatial merge candidates. However, it is not limited thereto, and it may be limited to a block of any one of spatial merge candidates. For example, the part of merge candidates may further include at least one of a bottom-left block, a top-right block, a top-left block or a temporal merge candidate. Part of previous blocks in a motion information list may mean k previous blocks which are recently added to a motion information list. In this case, K may be 1, 2, 3 or more and may be a fixed value which is pre-promised in an encoding/decoding device.

For example, it is assumed that 5 previous blocks (or motion information of a previous block) are stored in a motion information list and an index of 1 to 5 is assigned to each previous block. As an index is greater, it means a previous block which is recently stored. In this case, a redundance check of motion information between previous blocks having index 5, 4, and 3 and part of merge candidates in a merge candidate list may be performed.

Alternatively, a redundance check between previous blocks having index 5 and 4 and part of merge candidates in a merge candidate list may be performed. Alternatively, excluding a previous block of index 5 which is most recently added, a redundance check between previous blocks having index 4 and 3 and part of merge candidates in a merge candidate list may be performed.

As a result of a redundance check, when there is at least one previous block having different motion information, a corresponding previous block may be added to a merge candidate list. Alternatively, when there is at least one previous block having the same motion information, a previous block of a motion information list may not be added to a merge candidate list. On the other hand, when there is no previous block having the same motion information, all or part of previous blocks of a motion information list may be added to the last position of a merge candidate list. In this case, it may be added to a merge candidate list in an order of previous blocks which are recently added to a motion information list (i.e., in an order from a larger index to a smaller index). However, there may be a limit that a previous block which is most recently added to a motion information list (i.e., a previous block having the largest index) is not added to a merge candidate list. The previous block may be added by considering a size of a merge candidate list. For example, according to size information of the above-described merge candidate list, it is assumed that a merge candidate list has up to T merge candidates. In this case, there may be a limit that a previous block is added until the number of merge candidates belonging to a merge candidate list becomes (T-n). In this case, n may be an integer such as 1, 2, or more. Alternatively, a previous block may be repeatedly added until the number of merge candidates belonging to a merge candidate list becomes T.

In reference to FIG. 31, motion information of a current block may be derived based on a merge candidate list and a merge index (merge_idx) S3110.

A merge index may specify any one of a plurality of merge candidates belonging to a merge candidate list. Motion information of a current block may be set as motion information of a merge candidate specified by a merge index.

In reference to FIG. 31, motion compensation of a current block may be performed based on derived motion information S3120.

Pre-derived motion information (especially, a motion vector) may be modified based on a predetermined difference motion vector (MVD). Motion compensation may be performed by using a modified motion vector. A method in which a motion vector is modified based on a MVD will be described by referring to FIG. 44.

On the other hand, based on motion information which is pre-derived for a current block, the motion information list may be updated. However, when a current block has a last encoding/decoding order in a parallel merge region, the motion information list may be updated and otherwise, the motion information list may not be updated. A block with a last encoding/decoding order may mean a block at a bottom-right position in a parallel merge region. A motion vector added to a motion information list may be a motion vector after modification or may be limited to a motion vector before modification. All blocks belonging to the same parallel merge region may share the same motion information list. The updated motion information list may be used to generate a merge candidate list of a coding block in a parallel merge region which is encoded/decoded after a current parallel merge region. It will be described in detail by referring to FIGS. 41 to 43.

FIGS. 32 to 33 show a neighboring block which may be used as a spatial merge candidate as an embodiment to which the present disclosure is applied.

A neighboring block used for a merge mode may be a block adjacent to a current coding unit as in merge candidate indexes 0 to 4 of FIG. 32 (a block touching a boundary of a current coding unit) or may be a block which is not adjacent as in merge candidate indexes 5 to 26 of FIG. 32. When a distance between a merge candidate and a current block is over a pre-defined threshold value, it may be set to be unavailable.

For example, a pre-defined threshold value may be set as a height of a CTU (ctu_height) or (ctu_height+N), which is defined as a merge candidate available threshold value. In other words, when a difference (i.e., yi−y0) between a y-axis coordinate (yi) of a merge candidate and a y-axis coordinate (y0) of a top-left sample of a current coding unit (hereinafter, a basic sample of a current coding unit) is greater than a merge candidate available threshold value, a merge candidate may be set to be unavailable. In this case, N is a pre-defined offset value. Concretely, for example, N may be set to be 16 or may be set to be ctu_height.

When there are a lot of merge candidates passing a CTU boundary, since a lot of unavailable merge candidates occur, encoding efficiency may be lowered. A merge candidate on the top of a coding unit (hereinafter, a top merge candidate) may be set as little as possible, and a merge candidate on the left and bottom of a coding unit (hereinafter, a bottom-left merge candidate) may be set as many as possible.

As in FIG. 33, a difference between a y-axis coordinate of a current coding unit basic sample and a y-axis coordinate of a top merge candidate may be set not to exceed 2 times a height of a coding unit. A difference between a x-axis coordinate of a current coding unit basic sample and a x-axis coordinate of a bottom-left merge candidate may be set not to exceed 2 times a width of a coding unit.

A merge candidate which is adjacent to a current coding unit is referred to as an adjacent merge candidate and a merge candidate which is not adjacent to a current coding unit is defined as a non-adjacent merge candidate. A flag (isAdjacentMergeflag) representing whether a merge candidate of a current coding unit is an adjacent merge candidate may be signaled. When a value of IsAdjacentMergeflag is 1, motion information of a current coding unit may be derived from an adjacent merge candidate, and when a value of IsAdjacentMergeflag is 0, motion information of a current coding unit may be derived from a non-adjacent merge candidate.

FIGS. 34 to 40 show a method in which a motion information list is configured and updated as an embodiment to which the present disclosure is applied.

Motion information of a coding unit which is already encoded by inter prediction in a current picture (including at least one of a motion vector, a reference picture index or prediction direction information) may be stored in a list in a pre-defined size, which is defined as an inter region motion information list or a motion information list. Motion information in an inter region motion information list is referred to as an inter region merge candidate. An inter region merge candidate may be used as a merge candidate of a current coding unit, which is defined as an inter region merge method.

When a tile group is initialized, an inter region motion information list is empty, and when some regions of a picture is encoded/decoded, it may be added to an inter region motion information list. An initial inter region merge candidate of an inter region motion information list may be signaled through a tile group header.

When a coding unit is encoded/decoded by inter prediction, motion information of the coding unit may be updated in an inter region motion information list as in FIG. 34. When the number of inter region motion candidates in an inter region motion information list reaches the predetermined maximum number, a value with the smallest index (motion information which is first added to an inter region motion information list) may be removed in an inter region motion information list and motion information of an inter region which is most recently encoded/decoded may be added to an inter region motion information list.

mvCand, a motion vector of a decoded coding unit, may be updated in HmvpCandList, an inter region motion information list. In this case, when motion information of a decoded coding unit is the same as any one of motion information in an inter region motion information list (when both a motion vector and a reference index are the same), an inter region motion information list may not be updated or mvCand, a motion vector of a decoded coding unit, may be stored in the last of an inter region motion information list as in FIG. 36. In this case, when an index of HmvpCandList having the same motion information as mvCand is hIdx, HMVPCandList[i] may be set as HVMPCandList[i−1] for every i greater than hIdx as in FIG. 36. When a sub-block merge candidate is used in a currently decoded coding unit, motion information of a representative sub-block in a coding unit may be stored in an inter region motion information list. A sub-block merge candidate may mean a method in which one coding block is partitioned into a plurality of sub-blocks and motion information is derived in a unit of a sub-block.

In an example, a representative sub-block in a coding unit may be set as a top-left sub-block in a coding unit or may be set as an intermediate sub-block in a coding unit as in FIG. 35.

Total NumHmvp motion information may be stored in an inter region motion information list, and NumHmvp is defined as a size of an inter region motion information list.

A size of an inter region motion information list may use a pre-defined value. A size of an inter region motion information list may be signaled in a tile group header. In an example, a size of an inter region motion information list may be defined as 16 or may be defined as 6 or 5.

There may be a limit that a coding unit which is inter prediction and has an affine motion vector does not have an inter region motion information list. Alternatively, when it is inter prediction and has an affine motion vector, an affine sub-block vector may be added to an inter region motion information list. In this case, a position of a sub-block may be set as a top-left, top-right, or central sub-block, etc. Alternatively, an average value of motion vectors of control points may be added to an inter region merge candidate list.

When a motion vector MVO derived by encoding/decoding a specific coding unit is the same as any one of inter region merge candidates, MVO may not be added to an inter region motion information list. Alternatively, the existing inter region merge candidate having the same motion vector as MVO may be deleted and MVO may be newly included in an inter region motion information list to update an index assigned to MVO.

Except for an inter region motion information list, HmvpLTList, an inter region motion information long-term list, may be configured. A size of an inter region motion information long-term list may be set as a value which is the same as or different from a size of an inter region motion information list.

An inter region motion information long-term list may be configured with an inter region merge candidate which is added first to a start position of a tile group. After an inter region motion information long-term list is configured with all available values, an inter region motion information list may be configured or motion information in an inter region motion information list may be set as motion information of an inter region motion information long-term list.

In this case, an inter region motion information long-term list which was configured once may not be updated, may be re-updated when decoded regions of a tile group are equal to or greater than half the whole tile group, or may be set to be updated per m CTU lines. An inter region motion information list may be updated whenever it is decoded into an inter region or may be set to be updated in a unit of a CTU line.

Motion information and partition information or a shape of a coding unit may be stored in an inter region motion information list. An inter region merge method may be performed by using only an inter region merge candidate whose partition information and shape are similar to a current coding unit.

Alternatively, an inter region merge candidate list may be separately configured according to a block shape. In this case, one of a plurality of inter region merge candidate lists may be selected and used according to a shape of a current block.

As in FIG. 37, it may be configured with an inter region affine motion information list and an inter region motion information list. When a decoded coding unit is an affine inter or affine merge mode, a first affine seed vector and a second affine seed vector may be stored in HmvpAfCandList, an inter region affine motion information list. Motion information in an inter region affine merge candidate list is referred to as an inter region affine merge candidate.

A merge candidate which may be used in a current coding unit may be configured as follows and certainly, some merge candidates of them may be omitted. It may have a search order such as the following configuration order.

1. Spatial Merge Candidate (Merge Candidate which is adjacent to a coding block and Merge Candidate which is not adjacent to a coding block)
2. Temporal merge candidate (a merge candidate derived from a previous reference picture)
3. Inter region merge candidate
4. Inter region affine merge candidate
5. Zero motion merge candidate It may be stored in a different inter region motion information list according to resolution of a decoded motion vector. For example, as in FIG. 38, when a decoded motion vector, mvCand, has ¼ pel resolution, mvCand may be stored in HmvpQPCandList, an inter region quarter-pel motion information list, and when a decoded motion vector, mvCand, has integer-pel resolution, mvCand may be stored in HmvpIPCandList, an inter region half-pel motion information list, and when a decoded motion vector, mvCand, has 4-integer pel resolution, mvCand may be stored in Hmvp4IPCandList, an inter region integer-pel motion information list.

As in FIG. 39, when a coding unit uses a method of encoding a merge offset vector, mvCand, motion information of a coding unit, may be stored in HmvpMMVDCandList, an inter region merge offset motion information list, without being stored in HmvpCandList.

First, mergeCandList, a merge candidate list, may be configured with a spatial merge candidate and a temporal merge candidate. The number of available spatial merge candidates and temporal merge candidates is defined as the number of available merge candidates (NumMergeCand). When the number of available merge candidates is smaller than the maximum allowable number of merges, an inter region merge candidate may be added to a merge candidate list, mergeCandList.

When an inter region motion information list, HmvpCandList, is added to a merge candidate list, mergeCandList, whether motion information of an inter region merge candidate in an inter region motion information list is the same as motion information of the existing merge list, mergeCandList, may be checked. When motion information is the same, an inter region merge candidate may not be added to a merge list, mergeCandList, and when motion information is not the same, an inter region merge candidate may be added to a merge list, mergeCandList.

Among inter region merge candidates, it may be added to a merge candidate list, mergeCandList, in descending order of an index or it may be added to a merge candidate list, mergeCandList, in ascending order of an index.

A merge candidate in a unit of a sub-block may be derived as in the following process.
1. An initial shift vector (shVector) may be derived from a motion vector of a neighboring merge candidate block of a current block.
2. As in Equation 16, a shift sub-block that a position of a top-left sample is (xColSb, yColSb) may be derived by adding an initial shift vector to (xSb, ySb), a top-left sample of a sub-block in a coding unit.

$$(xColSb, yColSb) = \qquad\qquad\qquad \text{[Equation 16]}$$
$$(xSb + shVector[0] \gg 4, ySb + shVector[1] \gg 4)$$

3. A motion vector of a collocated block corresponding to a center position of a sub-block including (xColSb, yColSb) may be derived as a motion vector of a sub-block including a top-left sample (xSb, ySb).

Alternatively, when a sub-block merge candidate is used in a currently decoded coding unit, motion information of a plurality of representative sub-blocks in a coding unit may be stored in HSubMVPCandList, an inter region sub-block motion information list. For example, a plurality of representative sub-blocks may be configured with a top-left sub-block of a coding unit (hereinafter, a first representative sub-block), a top-right sub-block (hereinafter, a second representative sub-block) and a bottom-left sub-block (hereinafter, a third representative sub-block) as in FIG. 40. The number of inter region sub-block motion information lists may be set as a pre-defined value and may be set to be smaller than the general number of inter region motion information lists. A motion vector of a first representative sub-block is referred to as a first representative sub-block motion vector, a motion vector of a second representative sub-block is referred to as a second representative sub-block motion vector, and a motion vector of a third representative sub-block is referred to as a third representative sub-block motion vector.

A sub-block motion vector in HSubMVPList, an inter region sub-block motion information list, may be used as an affine seed vector. Concretely, for example, a first representative sub-block motion vector of a sub-block motion candidate in HSubMVPList, an inter region sub-block motion information list, may be set as a first affine seed vector, a second representative sub-block motion vector may be set as a second affine seed vector, and a third representative sub-block motion vector may be set as a third affine seed vector. In another example, a first representative sub-block motion vector in HSubMVPList, an inter region sub-block motion information list, may be used as a fourth affine seed vector, and a second representative sub-block motion vector may be used as a fifth affine seed vector.

A motion vector in HMvpCandList, an inter region motion information list, may be used as any one of affine seed vectors. For example, a motion vector in HMvpCandList may be used as a value of any one of a first affine seed vector to a fifth affine seed vector.

An inter region motion candidate may be used as a motion vector predictor (MVP) candidate of a current coding unit, and such a method is defined as an inter region motion information prediction method.

An inter region affine motion candidate may be used as a motion vector predictor (MVP) candidate of a current coding unit and such a method is defined as an inter region motion information affine prediction method.

A motion vector predictor candidate usable in a current coding unit may be configured as follows and may have a search order such as a configuration order.
1. Spatial motion predictor candidate (the same as a merge candidate which is adjacent to a coding block and a merge candidate which is not adjacent to a coding block)
2. Temporal predictor candidate (a motion predictor candidate derived from a previous reference picture)
3. Inter region predictor candidate
4. Inter region affine predictor candidate
5. Zero motion motion predictor candidate FIGS. 41 to 43 show a method in which a motion information list is configured and updated in a parallel merge region as an embodiment to which the present disclosure is applied.

A merge candidate may be derived in a unit of a coding unit, but as in FIG. 41, a neighboring block in a base region greater than a unit of a coding unit (hereinafter, a parallel merge region, MER) may be set as an unavailable merge candidate for parallel encoding/decoding. Concretely, for example, as in the left picture of FIG. 41, for a spatial merge candidate in a coding unit CUS, spatial merge candidates x3 and x4 in a parallel merge region may be set as an unavailable merge candidate and spatial merge candidates x0 to x3 out of a parallel merge region may be set as an available merge candidate.

In another example, as in the right picture of FIG. 41, for a spatial merge candidate in a coding unit CU9, spatial merge candidates x6, x7, x8 in a parallel merge region may be set as an unavailable merge candidate and spatial merge candidates x5 and x9 out of a parallel merge region may be set as an available merge candidate.

A parallel merge region may be square or non-square. Information representing a shape of a parallel merge region may be signaled in a bitstream. When a parallel merge region has a non-square shape, at least one of the number of samples of a parallel merge region or information representing a width/a height of a parallel merge region may be signaled. A size of a parallel merge region may be determined based on at least one of information signaled in a bitstream, picture resolution or a slice or a tile size.

When a plurality of CUs existing in a parallel merge region have been encoded/decoded, all or part of motion information of encoded/decoded CUs may be added to a motion information list. In this case, some CUs may be a block having the last encoding/decoding order in a parallel merge region (e.g., a bottom-right block).

However, a plurality of CUs in a parallel merge region perform prediction simultaneously (in parallel), so there is a problem that it is difficult to determine an order of encoding/decoding. Accordingly, motion information of CUs in a parallel merge region may be added to HmvpcandList, a motion information list, in a pre-defined order. In this case, a pre-defined order may be determined based on at least one of a scan order of CUs in a current CTU or MER, motion information of each CU or the number of CUs having the same motion information. In an example, according to a raster scan, a vertical scan, a horizontal scan or a zigzag scan order in a current CTU or MER, motion information of each CU may be added to HmvpcandList, a motion information list. Alternatively, motion information of a CU, unidirectional prediction, may be added to a motion information list before (or after) motion information of a CU, bidirectional prediction. Alternatively, motion information may be added to a motion information list in an order (or an inverse order) of frequency of use in a current CTU or MER.

When an inter region merge candidate exists in a parallel merge region and is used as a merge candidate of a current coding unit, parallel encoding and decoding may not be performed in a parallel merge region. When a parallel merge region is used, there may be a limit that an inter region merge candidate is not used.

A motion information list may be configured in a unit of a MER or a CTU. For example, as in FIG. 42, HmvpMERCandList, an inter region MER merge list, may be configured in a unit of a CTU or MER region. An inter region merge candidate added to an inter region MER merge list may not be updated in a motion information list (HmvpCandList). mvCand, motion information in a current CTU or MER region, may be added to HmvpMERCandList. A size of an inter region MER merge list may be set the same as a size of a motion information list. Alternatively, according to a size of a current CTU or MER, a size of an inter region MER merge list may be determined.

There may be a limit that a CU in a current CTU or MER region does not use an inter region MER merge candidate included in an inter region MER merge list for a current CTU or MER region. Thereby, there may be a limit that motion information of a CU belonging to the same CTU or MER region as a current CU is used as a merge candidate. When only HmvpcandList is used and HmvpMERCandList is not used, a merge candidate of a current coding unit does not use motion information in a current CTU or MER, so parallel encoding and decoding may be performed in a parallel merge region.

After all CUs included in a CTU or a MER are encoded/decoded, a motion information list and an inter region MER merge list may be merged. Concretely, as in FIG. 43, HmvpcandList may be updated in HmvpMerCandList and previous HmvpcandList. Inter region MER merge candidates included by an inter region MER merge list may be added to a motion information list according to an order that they are inserted in an inter region MER merge list.

In another example, an inter region MER merge candidate included in HmvpMerCandList, an inter region MER merge list, may be added to HmvpcandList, a motion information list, in a pre-defined order. In this case, a pre-defined order may be determined based on at least one of a scan order of CUs in a current CTU or MER, motion information of each CU or the number of CUs having the same motion information. In an example, according to a raster scan order in a current CTU or MER, inter region MER merge candidates may be added to HmvpcandList, a motion information list.

Alternatively, inter region MER merge candidates, unidirectional prediction, may be added to a motion information list before (or after) inter region MER merge candidates, bidirectional prediction. Alternatively, inter region MER merge candidates may be added to a motion information list in an order (or an inverse order) of frequency of use in a current CTU or MER.

An inter region MER merge candidate in an inter region MER merge list may add HmvpMERCand as an inter region merge candidate in HmvpCandList. In this case, when HmvpMERCand is the same as any one of HmvpCand, it may be set not to be added to HmvpCandList. Alternatively, when HmvpMERCand is the same as HmvpCand having an index equal to or greater than a pre-defined value, HmvpMERCand may not be added to HmvpCandList.

FIG. 44 shows a method in which a motion vector is modified based on a difference motion vector as an embodiment to which the present disclosure is applied.

In reference to FIG. 44, a symmetric MVD (a MVD in the same vector size and in an opposite direction) of a MVD (Motion vector difference) of a motion vector used in L0 may be set as a MVD of L1, which is referred to as a symmetric MVD encoding/decoding method. When a Symmetric MVD is used, MV may be derived as in the following Equation 17.

$$(mvx0, mvy0) = (mvp\_x0 + mvd\_x0, mvpy0 + mvdy0) \quad \text{[Equation 17]}$$
$$(mvx0, mvy0) = (mvp\_x0 - mvd\_x0, mvpy0 - mvdy0)$$

A flag (sym_mvd_flag) representing whether a symmetric MVD is used in a unit of a coding unit may be signaled in a bitstream. When a value of sym_mvd_flag is 1, a symmetric MVD may be used in a coding unit and otherwise, a symmetric MVD may not be used in a coding unit. Alternatively, the flag may be implicitly derived based on an encoding parameter of a current block. In this case, an encoding parameter may include at least one of a prediction mode, motion information, a size or a shape of a current block. For example, only when a current block is encoded by a merge mode, a symmetric MVD may be used. Only when a current block is not encoded by a combined prediction mode, symmetric MVD may be used. Only when a current block performs bidirectional prediction (i.e., when both first prediction direction information (predFlagL0) and second prediction direction information (predFlagL1) are 1), a symmetric MVD may be used. Only when a temporal distance between a current picture and a first reference picture is the same as a temporal distance between a current picture and a second reference picture, a symmetric MVD may be used. In this case, a current picture may mean a picture to which a current block belongs and a first and second reference picture may mean a picture which is respectively selected by a reference picture index of a current block (refIdxL0, refIdxL1). Only when a picture type of the first reference picture is the same as that of a second reference picture, a symmetric MVD may be used. In this case, a picture type may mean a short-term reference picture or a long-term reference picture. Alternatively, only when a picture type of a first reference picture and a second reference picture is a short-term reference picture, a symmetric MVD may be used. Only when a size of a current block is greater than or the same as a predetermined threshold size, a symmetric MVD may be used. In this case, a size of a current block may be represented as at least one of a width or a height, the maximum value or the minimum value of a width and a height, a sum of a width and a height, a multiplication of a width and a height, etc. A current block may mean a coding block, a sub-block configuring a coding block or a transform block. An encoding parameter of a neighboring block adjacent to a current block may be used to determine whether a symmetric MVD is used. As a threshold size is a value which is pre-promised in an encoding/decoding device, it may be 8, 16, 32, 64, 128 or more.

When a Symmetric MVD is used, a first unidirectional reference picture may be set as a picture which has a POC (Picture order count, Picture output order) smaller than a current picture and is closest to a current picture (hereinafter, a left minimum distance picture) in a first unidirectional reference picture list (RefPicList0), and a first unidirectional reference picture index (refIdxL0) may be set as a reference picture index of a left minimum distance picture. In this case, a closest picture means a reference picture with the smallest difference between a POC of a current picture and a POC of a reference picture. Alternatively, a first unidirectional reference picture may be set as RefPicList0[0]. Conversely, only when a temporal distance between a first unidirectional reference picture of a current picture and a current picture is close (e.g., when a reference picture is a short-term reference picture), a symmetric MVD may be used.

When a Symmetric MVD is used, a second unidirectional reference picture may be set as a picture which has a POC larger than a current picture and is closest to a current picture (hereinafter, a right minimum distance picture) in a second unidirectional reference picture list (RefPicList1), and a second unidirectional reference picture index (refIdxL1) may be set as a reference picture index of a right minimum distance picture. Alternatively, a second unidirectional reference picture may be set as RefPicList1[1]. Conversely, only when a temporal distance between a second unidirectional reference picture of a current picture and a current picture is close, a symmetric MVD may be used.

When there is no picture whose POC is smaller than a current picture in a first unidirectional reference picture list, a picture which has a POC greater than a current picture and is closest to a current picture in a first unidirectional reference picture list may be set as a first unidirectional reference picture.

When there is no picture whose POC is greater than a current picture in a second unidirectional reference picture list, a picture which has a POC smaller than a current picture and is closest to a current picture in a second unidirectional reference picture list may be set as a second unidirectional reference picture.

When a POC of a first unidirectional reference picture and a POC of a second unidirectional reference picture are smaller than a POC of a current picture and a POC of a first unidirectional reference picture is the same as a POC of a second unidirectional reference picture, it may be set not to use a symmetric MVD. Concretely, a syntax table such as Table 6 may be used.

TABLE 6

| coding_unit( x0, y0, cbWidth, cbHeight, treeType ) { | Descriptor |
|---|---|
| ... | |
| if ( CuPredMode[ x0 ][ y0 ] = = MODE_INTRA ) { | |
| ... | ae(v) |
| } | |
| } else if( treeType != DUAL_TREE_CHROMA ) { /* | |

TABLE 6-continued

| coding_unit( x0, y0, cbWidth, cbHeight, treeType ) { | Descriptor |
|---|---|
| MODE_INTER or MODE_IBC */ | |
| if( cu_skip_flag[ x0 ][ y0 ] = = 0 ) | |
| merge_flag[ x0 ][ y0 ] | ae(v) |
| if( merge_flag[ x0 ][ y0 ] ) { | |
| merge_data ( x0, y0, cbWidth, cbHeight ) | |
| } else if ( CuPredMode [ x0 ][ y0 ] = = MODE_IBC ) | |
| { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| | |
| MvdL0[ x0 ][ y0 ][ 1 ] != 0 ) ) { | |
| amvr_precision_flag[ x0 ][ y0 ] | ae(v) |
| } | |
| } else { | |
| if( tile_group_type = = B ) | |
| inter_pred_idc[ x0 ][ y0 ] | ae(v) |
| if( sps_affine_enabled_flag && cbWidth >= 16 | |
| && cbHeight >= 16 ) { | |
| inter_affine_flag[ x0 ][ y0 ] | ae(v) |
| if( sps_affine_type_flag && | |
| inter_affine_flag[ x0 ][ y0 ] ) | |
| cu_affine_type_flag[ x0 ][ y0 ] | ae(v) |
| } | |
| if( inter_pred_idc[ x0 ][ y0 ] = = PRED_BI | |
| && !inter_affine_flag[ x0 ][ y0 ] && | |
| RefIdxSymL0 > −1 && RefIdxSymL1 > −1&& | |
| POC_L0 ! =POC_L1 ) | |
| sym_mvd_flag[ x0 ][ y0 ] | ae(v) |
| if( inter_pred_idc[ x0 ][ y0 ] != PRED_L1 ) { | |
| MvdL0[ x0 ][ y0 ][ 1 ] = 0 | |
| } | |
| if( inter_pred_idc[ x0 ][ y0 ] != PRED_L0 ) { | |
| if( num_ref_idx_l1_active_minus1 > 0 | |
| && !sym_mvd_flag[ x0 ][ y0 ] ) | |
| ref_idx_l1[ x0 ][ y0 ] | ae(v) |
| if( mvd_l1_zero_flag && | |
| inter_pred_idc[ x0 ][ y0 ] = = PRED_BI ) { | |
| ... | |
| } else { | |
| if( sym_mvd_flag[ x0 ][ y0 ] ) { | |
| MvdL1[ x0 ][ y0 ][ 0 ] = − | |
| MvdL0[ x0 ][ y0 ][ 0 ] | |
| MvdL1[ x0 ][ y0 ][ 1 ] = − | |
| MvdL0[ x0 ][ y0 ][ 1 ] | |
| } else | |
| mvd_coding( x0, y0, 1, 0 ) | |
| } | |
| if( MotionModelIdc[ x0 ][ y0 ] > 0 ) | |
| mvd_coding( x0, y0, 1, 1 ) | |
| if(MotionModelIdc[ x0 ] [ y0 ] > 1 ) | |
| mvd_coding( x0, y0, 1, 2 ) | |
| mvp_l1_ flag[ x0 ][ y0 ] | ae(v) |
| } else { | |
| MvdL1[ x0 ][ y0 ][ 0 ] = 0 | |
| MvdL1[ x0 ][ y0 ][ 1 ] = 0 | |
| } | |
| ... | |
| } | |
| ... | |
| } | |
| } | |

When both a first unidirectional reference picture and a second unidirectional reference picture are on the left (or in a L0 direction) or on the right (or in a L1 direction) based on a current picture, a MVD of L1 may be scaled and used as in the following Equation 18 instead of a symmetric MVD.

$$(mvx0, mvy0) = (mvp\_x0 + mvd\_x0, mvpy0 + mvdy0) \quad \text{[Equation 18]}$$

$$(mvx0, mvy0) = (mvp\_x0 + scale * mvd\_x0, mvpy0 - mvdy0)$$

In Equation 18, a scale value may be defined as in Equation 19.

$$scale = \quad \text{[Equation 19]}$$

$$abs(POC\_Curr - POC\_L0)/abs(POC\_Curr - POC\_L1)$$

$$scale = abs(POC\_Curr - POC\_L1)/$$

$$abs(POC\_Curr - POC\_L0)$$

In Equation 19, POC Curr represents a POC value of a current picture, POC L0 represents a POC value of a first unidirectional reference picture and POC L1 represents a POC value of a second unidirectional reference picture.

When there is a reference picture whose POC value is greater than a current picture in a second unidirectional reference picture list and there is at least one or more pictures whose POC value is smaller than a current picture in a first unidirectional reference picture list, a symmetric MVD may not be used.

Alternatively, when there is no reference picture whose POC value is smaller than a current picture in a first unidirectional reference picture list and there is at least one or more reference pictures whose POC value is greater than a current picture in a second unidirectional reference picture list, a symmetric MVD may not be used.

FIGS. 45 and 46 show a transform method in an encoding/decoding device as an embodiment to which the present disclosure is applied.

An image subtracting a prediction image from an original image is referred to as a residual image.

A residual image may be transformed into a frequency component by applying two-dimensional transform such as DCT (Discrete cosine transform) to a residual image. There is a characteristic that visual distortion is not generated significantly although a high-frequency component is removed from an image. When a value corresponding to high frequency is set to be small or 0, compression efficiency may be improved without significant visual distortion.

DST (Discrete sine transform) may be used according to a size of a block or a prediction mode. Concretely, for example, when a current block is encoded by an intra prediction mode and a size of a block is smaller than N×N, it may be set to use DST transform and otherwise, it may be set to use DCT. In this case, a block may mean a coding block, a prediction block or a transform block. The n may be 8, 16, 32, or more.

DCT is a process in which an image is decomposed (transformed) into two-dimensional frequency components by using cos transform, and frequency components in this case are expressed as a base image. For example, when DCT transform is performed in a N×N block, $N^2$ basic pattern components may be obtained. Performing DCT transform means that a size of each of basic pattern components included in an original pixel block is found. A size of each basic pattern component is defined as a DCT coefficient.

Generally, DCT (Discrete Cosine Transform) may be mainly used in an image that a lot of non-zero components are distributed at a low frequency, and DST (Discrete Sine Transform) may be used in an image that a lot of high-frequency components are distributed.

DST represents a process in which an image is decomposed (transformed) into two-dimensional frequency components by using sin transform. A two-dimensional image may be decomposed (transformed) into two-dimensional frequency components by using a transform method excluding DCT or DST transform, which is defined as two-dimensional image transform.

Two-dimensional image transform may not be performed in a specific block among residual images, which is defined as a transform skip. After a transform skip, quantization may be applied. Whether a transform skip is allowed may be determined based on at least one of a size or a shape of a coding unit. In an example, there may be a limit that a transform skip is used only in a coding unit in a specific size or less. For example, it may be set to use a transform skip only in a block smaller than 32×32. Alternatively, there may be a limit that a transform skip is used only in a square block. Concretely, for example, a transform skip may be applied in a unit of a 32×32, 16×16, 8×8, 4×4 block.

Alternatively, when a sub-partition based intra prediction method is used, a transform skip may be selectively applied in a unit of a sub-partition. Concretely, for example, as in FIG. 45, a transform skip may be used in a top sub-partition, and DST7 may be performed in a horizontal direction and DCT8 (tu_mts_idx_3) may be performed in a vertical direction in a bottom sub-partition.

DCT or DST or two-dimensional image transform may be applied to an arbitrary block in a two-dimensional image, and transform used in this case is defined as first transform. Transform may be performed again in some regions of a transform block after first transform is performed, which is defined as second transform.

First transform may use one of a plurality of transform cores. Concretely, for example, any one of DCT2, DCT8 or DST7 may be selected and used in a transform block. Alternatively, a transform core for transform in a horizontal direction and transform in a vertical direction in a transform block may be individually determined. Accordingly, transform in a horizontal direction and transform in a vertical direction may be the same or different each other. A different transform core may be used in transform in a horizontal direction and transform in a vertical direction, which is defined as a multiple transform selection method (Multiple Transform Selection, MTS).

A unit of a block performing first transform and second transform may be differently set. Concretely, for example, after first transform is performed in a 8×8 block of a residual image, second transform may be performed respectively per 4×4 sub-block, but second transform may be performed only for all or part of regions in a 8×8 block. In this case, some regions may mean a 4×4 top-left block in a 8×8 region, a 8×4 block which includes a 4×4 top-left block and a 4×4 top-right block or a 4×8 region which includes a 4×4 top block and a 4×4 bottom-left block. Alternatively, some regions may be defined as remaining regions excluding a 4×4 bottom-right block. Any one of the some regions may be selectively used, and some regions may be determined based on the above-described encoding parameter. In another example, after first transform is performed in each 4×4 block, second transform may be performed respectively in a 8×8 sized block.

A residual image to which first transform is applied is defined as a first transform residual image.

Transform according to a predetermined transform type may be performed for a first transform residual image, and transform used in this case is defined as second transform. Second transform may include at least one of DCT, DST, two-dimensional image transform or a transform skip. A two-dimensional image to which second transform is applied is defined as a second transform residual image. A sample value in a block after first transform and/or second transform is performed or a sample value in a block after a transform skip is performed is defined as a transform coefficient. Quantization refers to a process in which a transform coefficient is divided by a pre-defined value to reduce energy of a block. A value defined to apply quantization to a transform coefficient is defined as a quantization parameter.

A quantization parameter which is pre-defined in a unit of a sequence or in a unit of a block may be applied. Generally, a quantization parameter may be defined as a value from 1 to 63.

After performing transform and quantization, a residual reconstructed image may be generated by performing dequantization and inverse transform. A first reconstructed image may be generated by adding a prediction image to a residual reconstructed image.

'tu_mts_idx', index information representing a transform type of a current block, may be signaled in a bitstream. tu_mts_idx indicates one of a plurality of transform type candidates and each transform type candidate may be configured with a combination of a transform type in a vertical direction and a transform type in a horizontal direction. Based on a transform type candidate specified by tu_mts_idx, at least one of whether transform in a vertical direction and transform in a horizontal direction are skipped or a transform core in a vertical direction and a transform core in a horizontal direction may be determined. A transform core may include at least one of DCT-2, DCT-8, or DST-7. Alternatively, a transform skip mode may be further included in a transform core. When a sub-partition encoding method is used, a different transform core set may be used per sub-partition, and it may be set to use the same transform core set in a unit of a coding unit. In this case, tu_mts_idx may be signaled in a bitstream only in a first sub-partition.

Concretely, for example, as in the left picture of FIG. 46, DST-7 may be used as a transform core in a horizontal direction and DCT-8 may be used as a transform core in a vertical direction in all sub-partitions in a coding unit. In another example, as in the right picture of FIG. 46, DCT-8 may be used as a transform core in a horizontal direction and DST-8 may be used as a transform core in a vertical direction in all sub-partitions in a coding unit.

FIGS. 47 and 48 show a method in which an in-loop filter is applied to a reconstructed block as an embodiment to which the present disclosure is applied.

In-loop filtering is a technology which adaptively performs filtering for a decoded image to reduce loss of information generated in a process of quantization and encoding. A deblocking filter, a sample adaptive offset filter (SAO) and an adaptive loop filter (ALF) are an example of in-loop filtering.

A second reconstructed image may be generated by performing at least any one of a deblocking filter, a sample adaptive offset (SAO) or an adaptive loop filter (ALF) for a first reconstructed image.

After applying a deblocking filter to a reconstructed image, SAO and ALF may be applied.

Transform and quantization may be performed in a unit of a block in a video encoding process. Loss generated in a quantization process is generated, and discontinuity is generated on a boundary of an image reconstructing it. A discontinuous image generated on a block boundary is defined as blocking artifact.

A deblocking filter is a method which alleviates blocking artifact generated on a block boundary of a first image and improves encoding performance.

Blocking artifact may be alleviated by performing filtering on a block boundary, and a value of a blocking strength (hereinafter, BS) may be determined based on at least any one of whether a block is encoded by an intra prediction mode as in FIG. 47, or whether an absolute difference value of a motion vector from a neighboring block is greater than a predefined predetermined threshold value, or whether a reference picture is the same as that of a neighboring block. When a value of BS is 0, filtering may not be performed and when a value of BS is 1 or 2, filtering may be performed on a block boundary.

Because quantization is performed for a transform coefficient and quantization is performed in a frequency domain, ringing artifact is generated on an edge of an object or a pixel value gets larger or smaller by a certain value compared to an original. SAO may effectively reduce ringing artifact by adding or subtracting a specific offset in a unit of a block by considering a pattern of a first reconstructed image. SAO is configured with an edge offset (hereinafter, EO) and a band offset (BO) according to a feature of a reconstructed image. An edge offset is a method which differently adds an offset to a current sample according to a neighboring pixel sample pattern. A band offset is to reduce an encoding error by adding a certain value to a pixel set with a similar pixel brightness value in a region. Pixel brightness may be divided into 32 uniform bands to form a set of pixels having similar brightness values. For example, 4 adjacent bands may be combined into one category. It may be set to use the same offset value in one category.

ALF (Adaptive Loop Filter) is a method which generates a second reconstructed image by using any one of pre-defined filters for a first reconstructed image or a reconstructed image that deblocking filter is performed for a first reconstructed image as in Equation 20.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 20]

In this case, a filter may be selected in a unit of a picture or in a unit of a CTU.

For a luma component, any one of a 5×5, 7×7 or 9×9 diamond shape may be selected as in FIG. 48. For a chroma component, there may be a limit that only a 5×5 diamond shape is used.

FIGS. 49 to 55 show a method in which one picture is partitioned into various types of partial regions as an embodiment to which the present disclosure is applied.

A high-resolution image is used in an immersive media application such as a panoramic video, a 360-degree video or 4K/8K UHD (Ultra High Definition). A high-resolution image should be parallelized for real-time or low delay encoding. For parallelization, a certain region of a picture should be able to be independently encoded/decoded. To this end, an encoding/decoding device may define various types of partial regions. Types of pre-defined partial regions may include at least one of a sub-picture, a slice, a tile or a sub-tile. One picture may be partitioned into one or more sub-pictures and a sub-picture may mean a basic unit that independent encoding/decoding are allowed like a picture. A slice and/or a tile may mean a basic unit that parallel encoding/decoding are allowed. A slice may be configured with a plurality of CTUs according to a raster scan (hereinafter, a first type) or may be defined as a square or non-square region covering a plurality of CTUs (hereinafter, a second type). A tile may mean a region partitioned by a vertical and/or horizontal line which crosses one picture.

One slice may be configured with one or more tiles. However, one slice may completely cover a plurality of tiles, and a case in which one tile is partitioned to cover a plurality of slices may not be allowed. One slice may be configured with one or more sub-pictures. However, one slice may completely cover a plurality of sub-pictures and a case in which one sub-picture is partitioned to cover a plurality of slices may not be allowed. There may be a limit that one sub-picture is always greater than or the same as one slice. When a slice is partitioned by a first type, partitioning into sub-pictures may not be allowed, and when a slice is partitioned by a second type, partitioning into sub-pictures may be allowed. Alternatively, when partitioning into sub-pictures is allowed, there may be a limit that a slice is partitioned only by a second type.

One tile may be configured with one or more sub-pictures. In this case, a sub-picture may mean a sub-tile. One tile may completely cover a plurality of sub-pictures and a case in which one sub-picture is partitioned to cover a plurality of tiles may not be allowed. Alternatively, one tile may be configured with one or more slices. In this case, a slice may mean a sub-tile. One tile may completely cover a plurality of slices and a case in which one slice is partitioned to cover a plurality of tiles may not be allowed.

Information for specifying a sub-picture (hereinafter, sub-picture information) may be signaled. Sub-picture information may include at least one of number information of sub-pictures configuring one picture, information representing whether in-loop filtering or intra/inter prediction crossing a boundary of a sub-picture is allowed, position/size information of a sub-picture or an identifier (ID) of a sub-picture. Position information of a sub-picture may be represented as position information of a specific CTU in a sub-picture. In this case, a specific CTU may mean a top-left CTU or a bottom-right CTU in a sub-picture. In addition, sub-picture information may further include at least one of information representing whether a sub-picture is processed as one picture or information specifying a unit or a position that the above-described sub-picture information is signaled (e.g., a video sequence, a picture, etc.). However, information representing whether a sub-picture is processed as one picture may be signaled dependently on information representing whether in-loop filtering or intra/inter prediction crossing a boundary of a sub-picture is allowed.

Information specifying a tile (hereinafter, tile information) and information specifying a slice (hereinafter, slice information) may be signaled, respectively. However, tile information and slice information may be signaled only when a current picture is partitioned based on at least one of a plurality of types which are pre-defined in an encoding/decoding device. To this end, a flag representing whether a current picture is partitioned by at least one of a slice or a tile may be used. The above-described sub-picture information may be also signaled only when a current picture is partitioned based on at least one of a plurality of types according to the flag.

Tile information may include at least one of number information of tiles partitioned in a vertical direction, number information of tiles partitioned in a horizontal direction or size information of each tile.

Slice information may include first information representing whether a plurality of tiles belonging to one slice have a raster scan order or cover a rectangular region. According to the first information, when a plurality of tiles belonging to one slice have a raster scan order, additional slice information may not be signaled. Only when a plurality of tiles belonging to one slice cover a rectangular region, additional slice information may be signaled.

Additional slice information may include at least one of information representing whether a sub-picture is configured with one slice, number information of slices belonging to a picture or a sub-picture or size/position information of each slice. Size information of a slice may be encoded in a unit of a tile or a CTU. Based on size information of a slice, whether a plurality of slices are included in one tile may be identified. When a plurality of slices are identified as being included in one tile, number information and size information of slices belonging to one tile may be signaled. In this case, a slice may be generated by partitioning a tile only in a horizontal direction and in this case, only information representing a height of a slice may be signaled as size information. However, it is not limited thereto, and a slice may be generated by partitioning a tile only in a vertical direction and in this case, only information representing a width of a slice may be signaled as size information. Alternatively, a slice may be generated by partitioning a tile in a vertical direction and in a horizontal direction and in this case, information representing a height and a width of a slice may be signaled as size information, respectively. Position information of the slice may be encoded by a difference between a first tile index in a i-th slice and a first tile index in a (i+1)-th slice. In other words, a position of a (i+1)-th slice may be determined based on an encoded difference and position information of a i-th slice. However, it is not limited thereto, and position information of a slice may be encoded by a difference between a last tile index in both slices. Position information on a first slice or a last slice in one picture may be omitted.

A tile is a tool for supporting parallelization of a video. A tile may have a rectangular shape. Alternatively, a non-rectangular tile may be allowed. Information representing whether there is a non-rectangular tile may be encoded. Information necessary for image encoding/decoding is not derived from data in another tile. A probability table of a CABAC (Context adaptive Binary Arithmetic Coding) context may be initialized in a unit of each tile. It may be set not to use an in-loop filter on a tile boundary (on a boundary of two neighboring tiles). Alternatively, information representing whether an in-loop filter is used on a tile boundary may be encoded.

As in FIG. 49, a height of a tile adjacent to the left or the right may be configured to be the same (hereinafter, a tile set in a horizontal direction) and a width of a tile adjacent to the top or the bottom may be configured to be the same (hereinafter, a tile set in a vertical direction), and there may be a limit that all tiles excluding tiles adjacent to a picture boundary in a picture have the same size.

num_tile_columns_minus1, a syntax representing the number of tile sets in a vertical direction in a picture, may be signaled in a picture parameter set, a sequence parameter set or a slice header. In an example of FIG. 49, the number of tile sets in a vertical direction is 4 and a value of num_tile_columns_minus1, a syntax representing it, may be set as 3. column_width_minus1, a syntax representing a width of each tile set in a vertical direction, may be signaled.

num_tile_rows_minus1, a syntax representing the number of tile sets in a horizontal direction in a picture, may be signaled in a picture parameter set, a sequence parameter set or a slice header. In an example of FIG. 49, the number of tile sets in a horizontal direction is 3 and a value of num_tile_rows_minus1, a syntax representing it, may be set as 2. row_height_minus1, a syntax representing a height of each tile set in a horizontal direction, may be signaled.

The following uniform tile spacing flag is a flag representing whether a width and a height of each tile in a picture are uniformly divided, and loop filter across tiles enabled flag is a flag representing whether it is set not to use an in-loop filter on a tile boundary (on a boundary of two neighboring tiles). In an example, a syntax table such as Table 7 may be used.

TABLE 7

```
...
if ( tile_enabled_flag ) {
    num_tile_columns_minus1                           ue(v)
    num_tile_rows_minus1                              ue(v)
    uniform_tile_spacing_flag                         u(1)
    if ( !uniform_tile_spacing_flag ) {
        for ( i=0; i < num_tile_columns_minus1:
        i++ )
            column_width_minus1[ i ]                  ue(v)
        for ( i=0; i < num_tile_rows_minus1:
        i++ )
            row_height_minus1[i]                      ue(v)
    }
    loop_filter_across_tiles_enabled_flag             u(1)
}
...
``` uniform tile spacing flag is a flag representing whether each tile in a picture is uniformly divided, and loop_filter_across_tiles_enabled_flag is a flag representing whether it is set not to use an in-loop filter on a tile boundary (on a boundary of two neighboring tiles).

When a value of uniform tile spacing flag is 1, a size of a tile may be determined based on num_tile_columns_minus1, the number of tiles in a horizontal direction, and num_tile_rows_minus1, the number of tiles in a vertical direction.

When a value of uniform tile spacing flag is 1, information representing a width and a height of each tile may be encoded. In an example, column_width_minus1[i] representing a width of a i-th tile and row_height_minus1[i] representing a height of a i-th tile may be encoded. Alternatively, a difference value of a width/a height between tiles may be encoded.

Concretely, a tile with the smallest width among tiles belonging to a tile set in a horizontal direction is referred to as a minimum width tile. A value of min_column_width_minus1, a syntax representing a width of a minimum width tile, may be signaled, and a width of a minimum width tile may be set as a value of min_column_width_minus1+1.

A tile with the smallest height among tiles belonging to a tile set in a vertical direction is referred to as a minimum height tile. A value of min_row_height_minus1, a syntax representing a height of a minimum height tile, may be signaled, and a height of a minimum height tile may be set as a value of min_row_height_minus1+1.

As in Table 8, diff column width[i], information representing a difference value between a width of a minimum width tile and a i-th tile, and diff row height[i], information representing a difference value between a height of a minimum height tile and a i-th tile, may be encoded.

TABLE 8

```
...
if ( tile_enabled_flag ) {
    num_tile_columns_minus1                           ue(v)
    num_tile_rows_minus1                              ue(v)
    uniform_tile_spacing_flag                         u(1)
    if ( !uniform_tile_spacing_flag ) {
    min_column_width_minus1
    min_row_height_minus1
        for ( i=i < num_tile_columns_minus1:
    i++ )
            diff_column_width[i]                      ue(v)
        for ( i=0; i < num_tile_rows_minus1:
    i++ )
            diff_row_height[i]                        ue(v)
    }
    loop_filter_across_tiles_enabled_flag             u(1)
}
...
```

A height of a tile set in a horizontal direction may be derived as in the following Equation 21.

$$\text{column\_width\_minus}[1] = \text{min\_column\_width\_minus1} + \text{diff\_column\_width}[i] \quad \text{[Equation 21]}$$

A height of a tile set in a vertical direction may be derived as in the following Equation 22.

$$\text{row\_height\_minus}[1] = \text{min\_row\_height\_minus1} + \text{diff\_row\_height}[i] \quad \text{[Equation 22]}$$

Alternatively, a width difference value or a height difference value between a i-th tile and a i−1-th tile may be encoded.

As in Table 9, uniform_tile_spacing_flag, a uniform size tile flag, may be signaled in a bitstream. When a value of Uniform_tile_spacing_flag is 1, it represents that a width of each tile in a picture is uniformly divided and a height of each tile is also uniformly divided. Only when a value of Uniform_tile_spacing_flag is 0, tile_column_width_minus1, a syntax representing a width of each tile, and tile_row_height_minus1, a syntax representing a height of each tile, may be signaled.

TABLE 9

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag | |

TABLE 9-continued

| | Descriptor |
|---|---|
| && !single_tile_per_tile_group_flag ) { | |
|     num_tile_groups_in_pic_minus1 | ue(v) |
|     for( i =0; i <= num_tile_groups_in_pic_minus1; i++ ) { | |
|       if( i > 0) | |
|         top_left_tile_idx[ i ] | u(v) |
|         bottom_right_tile_idx[ i ] | u(v) |
|     } | |
| } | |
|   loop_filter_across_tiles_enabled_flag | u(1) |
| } | |
| if( rect_tile_group_flag ) { | |
|   signalled_tile_group_id_flag | u(1) |
|   if( signalled_tile_group_id_flag ) { | |
|     signalled_tile_group_id_length_minus1 | ue(v) |
|     for( i = 0; i <= num_tile_groups_in_pic_minus1; i++) | |
|       tile_group_id[ i ] | u(v) |
|   } | |
|   rbsp_trailing_bits( ) | |
| } | |

A tile group including at least one or more tiles may be defined. Information on a tile group configuration in a picture may be encoded. Information on a tile group configuration may include at least one of a flag representing whether a picture is configured with one tile (e.g., single_tile_in_pic_flag), a flag representing whether each tile group is configured only with one tile (e.g., single_tile_per_tile_group_flag), a flag representing whether a tile group is rectangular (e.g., rect_tile_group_flag), information representing the number of tile groups in a picture (e.g., num_tile_groups_in_pic_minus1), information representing the number of tile groups in a horizontal direction (e.g., num_tile_columns_minus1), or information representing the number of tile groups in a vertical direction (e.g., num_tile_rows_minus1).

A syntax representing whether a width/a height of tiles included in each tile group is uniformly divided per tile group may be encoded. As in Table 11, uniform_tile_spacing_inTG[i], a syntax representing whether a width of each tile in tile group i is uniformly divided, may be signaled in a bitstream. When a value of uniform_tile_spacing_inTG[i] is 1, it represents that a width of a tile in a i-th tile group is uniformly divided, and when a value of uniform_tile_spacing_inTG[i] is 1, it represents that a width of a tile in a i-th tile group is uniformly divided.

uniform_tile_spacing_inTG[i] may be signaled only when a value of uniform_tile_spacing_flag is 0, and when it is not signaled, that value may be set as 0. Alternatively, according to a shape of a tile group, whether uniform_tile_spacing_inTG[i] is encoded may be determined. In an example, only when a tile group has a rectangular shape, uniform_tile_spacing_inTG[i] may be encoded. When a tile group has a non-rectangular shape, encoding of uniform_tile_spacing_inTG[i] may be omitted.

column_width_minus1, a syntax representing a width of a tile set in a vertical direction, may be signaled per each tile group. num_tile_rows_minus1, a syntax representing the number of tile sets in a horizontal direction, may be signaled per each tile group.

Only when a value of uniform_tile_spacing_inTG[i] is 0, tile_column_width_minus1, a syntax representing a width of a tile, and tile_row_height_minus1, a syntax representing a height, may be signaled.

TABLE 10

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|     single_tile_per_tile_group_flag | u(1) |
|     if(!single_tile_per_tile_group_flag ) | |
|       rect_tile_group_flag | u(1) |
|   if( rect_tile_group_flag | |
| && !single_tile_per_tile_group_flag ) { | |
|     num_tile_groups_in_pic_minus1 | ue(v) |
|   if( !single_tile_in_pic_flag ) { | |
|     num_tile_columns_minus1 | ue(v) |
|     num_tile_rows_minus1 | ue(v) |
|   } | |
|     for( i =0; i <= num_tile_groups_in_pic_minus1; i++) { | |
|       if( i > 0) | |
|         top_left_tile_idx[ i ] | u(v) |
|         bottom_right_tile idx[ i ] | u(v) |
|         num_tile_columns_minus_inTG[ i ] | |
|         num_tile_rows_minus1_inTG[ i ] | |
|         if (!uniform_tile_spacing_flag) { | |
|           uniform_tile_spacing_inTG[ i ] | |
|         if (!uniform_tile_spacing_inTG[i]) { | |
|           for( j = 0; j < num_tile_columns_minus1_inTG[i ]; j++) | |
|             tile_column_width_minus1[ i ][j] | ue(v) |
|           for( j = 0; j < num_tile_rows_minus1_inTG[i ]; j++) | |
|             tile_row_height_minus1[ i ][j] | ue(v) |
|         } | |
|       } | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++) | |
|         tile_group_id[ i ] | u(v) |
|     } | |
|   rbsp_trailing_bits( ) | |
| } | |

A tile group may be defined as a plurality of tiles as in FIG. 50. tile_group_index may be signaled in a bitstream to specify a tile group, and numTotalTileGruop_minus1, a syntax representing the total number of tile groups in a sequence or a picture, may be signaled. A CTU address or a tile address at a position where TileGroup starts may be signaled.

A width and a height of a tile in each tile group may be set differently. In an example, a height of Tile3 and Tile4 belonging to tile group 1 is set differently in FIG. 50.

When a height of adjacent tiles is different, tiles with a different height may be set to be included in a different tile group. In this case, adjacency between tiles may be determined based on a spatial position or a scan order. In an example, when a raster scan order is followed, Tile 3 and Tile 4 in FIG. 51 may be determined to be adjacent each other. As in FIG. 51, when a height of Tile 3 and Tile 4 is different, they may be set to belong to a different tile group.

Tile group may be configured in a rectangular shape, which is referred to as a rectangular tile group. rect_tile_group_flag, a syntax representing whether a tile group is configured in a rectangular shape, may be transmitted to a picture parameter set in a bitstream. When a value of rect_tile_group_flag is 1, it represents that a tile group may be configured in a rectangular shape.

For a rectangular tile group, an ID of a tile at a top-left position of a tile group (hereinafter, top_left_tile_idx) and an ID of a tile at a top-right position (hereinafter, bottom_right_tile_idx) may be transmitted in a bitstream.

isMultipleTileInTileG_flag, a flag representing whether a tile group has a plurality of tiles, may be signaled.

When a value of isMultipleTileInTileG_flag is 1, it represents that there are at least two or more tiles in a tile group and when a value of isMultipleTileInTileG_flag is 0, it represents that there is only one tile in all tile groups in a picture.

For a rectangular tile group and a last tile group, at least one of top_left_tile_idx or bottom_right_tile_idx may be omitted without being signaled. Concretely, for example, as in an example of FIG. 52, when the total number of tile groups is 4, when a position and a size of tile group0, tile group1, tile group2 are set, top_left_tile_idx and bottom_right_tile_idx per each tile group may be signaled to set a position and a size of tile group0, tile group1, tile group2.

A size of tile group3, a last tile group in a picture, may be set as a region, not tile group0, tile group1, tile group2, and an ID of a top-left tile in this region may be derived as a value of top_left_tile_idx and an ID of a bottom-right tile may be derived as a value of bottom_right_tile_idx.

Generally, one tile may be configured with a plurality of CTUs. In this case, excluding a tile adjacent to a right/bottom boundary of a picture, a tile may not include a region smaller than a CTU. In other words, a boundary of a tile may be set the same as that of a CTU. Tiles adjacent to a right and left boundary of a picture may exceptionally include a region smaller than a CTU.

For example, when uniform_tile_spacing_flag is 1, a right boundary of a first tile may be set as a right boundary of a third CTU column (CTU 2, CTU 9).

However, in this case, a problem that a size of each tile is different occurs. In an example, in the left picture of FIG. 53, a size of a first tile is different from a tile adjacent to the right of a picture and a tile adjacent to the bottom of a picture.

A tile may be partitioned into sub-tiles in a smaller unit. For example, as in Tile8 of FIG. 53, a specific tile may be partitioned into sub-tiles. A sub-tile may be partitioned in a vertical and horizontal direction like Tile8 and may be partitioned only in a horizontal direction. A CABAC state may be initialized in a first sub-tile of a tile. In other words, a CABAC state may not be initialized in a second sub-tile.

sub_tile_present_flag, a syntax representing whether there is at least one sub-tile in a current picture, may be signaled in a bitstream. When a value of sub_tile_present_flag is 1, it represents that there is at least one sub-tile in a picture and when a value of sub_tile_present_flag is 0, it represents that there is no sub-tile in a picture.

When a sub-tile of tiles in tile group i is used, uniform_subtile_spacing_flag[i], a syntax representing whether a width and/or a height of a sub-tile is uniformly divided, may be signaled in a bitstream.

When uniform_subtile_spacing_flag[i] is 1, it represents that a width and/or a height of a sub-tile in tile group i or in tile i is uniformly divided.

num_subtile_row_minus1, a flag representing the number of sub-tiles, may be signaled in a bitstream.

When uniform_subtile_spacing_flag[i] is 1, subtile_rows_height_minus1, a syntax representing a height of a sub-tile which uniformly divides a tile, may be signaled. For example, when subtile_row_height_minus1 is 7, it represents that uniform partition may be performed so that a height of a sub-tile in a tile group or a tile is 8.

sub_tile_split_flag[j], a flag representing whether partition is performed into sub-tiles, may be signaled per each tile. When a value of sub_tile_split_flag[j] is 1, it represents that a tile whose tile index is j (hereinafter, a j-th tile) is partitioned into sub-tiles.

When uniform_subtile_spacing_flag[i] is 0 and a value of sub_tile_split_flag[j] is 1, num_sub_tile_columns_minus1[j], a syntax representing the number of sub-tiles in a horizontal direction in a j-th tile, and num_sub_tile_rows_minus1[j], a syntax representing the number of sub-tiles in a vertical direction, may be transmitted to a bitstream.

Heights of sub-tiles adjacent to the left or the right within a tile may be configured to be equal to each other (hereinafter, a sub-tile set in a horizontal direction) and widths of sub-tiles adjacent to the top or the bottom may be configured to be equal to each other (hereinafter, a sub-tile set in a vertical direction).

sub_tile_column_width_minus1, a syntax representing a width of a sub-tile set in a vertical direction, may be signaled per each tile. sub_tile_num_tile_rows_minus1, a syntax representing the number of tile sets in a horizontal direction, may be signaled per each tile.

Information on a tile and a sub-tile may be signaled by using a syntax table as in the following Table 11 to Table 12.

TABLE 11

| | Descriptor |
|---|---|
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++) | |
|         tile_column_width_minus1[ i ] { | ue(v) |
|       for( i = 0; i < num_tile_rows_minus1; i++) | |
|         tile_row_height_minus1[ i ] | ue(v) |
|     } | |
|     single_tile_per_tile_group_flag | u(1) |
|     if( !single_tile_per_tile_group_flag ) { | |
|       rect_tile_group_flag | u(1) |
|       sub_tile_present_flag | u(1) |
|     } | |
|     if( rect_tile_group_flag | |
| && !single_tile_per_tile_group_flag ) { | |
|       num_tile_groups_in_pic_minus1 | ue(v) |
|       for( i = 0; i <= | |
| num_tile_groups_in_pic_minus1; i++) { | |
|         if( i > 0 ) | |
|           top_left_tile_idx[ i ] | u(v) |
|         bottom_right_tile_idx[ i ] | u(v) |
|       } | |
|     } | |
|     loop_filter_across_tiles_enabled_flag | u(1) |
|     if( loop_filter_across_tiles_enabled_flag ) | |
|       loop_filter_across_tile_groups_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= | |
| num_tile_groups_in_pic_minus1; i++ ) { | |
|         tile_group_id[ i ] | u(v) |
|         if (sub_tile_present_flag) | |
|           uniform_subtile_spacing_flag[i] | |
|       } | |
|     } | |
|   } | |
|   for( j = 0; sub_tile_present_flag && j < | |
| NumofTiles; i++) { | |

TABLE 11-continued

| | Descriptor |
|---|---|
|         sub_tile_split_flag[ji ] | u(1) |
|         if( sub_tile_split_flag | |
| && !uniform_subtile_spacing_flag) { | |
|             num_sub_tile_columns_minus1[ j ] | ue(v) |
|             num_sub_tile_rows_minus1[ j ] | ue(v) |
|             for( i = 0; i < num_sub_tile_columns_minus1; i | |
|                 sub_tile_column_width_minus1[ i ] | ue(v) |
|             for( i = 0; i < num_sub_tile_rows_minus1; i++ ) | |
|                 sub_tile_row_height_minus1[ i ] | ue(v) |
|             } | |
|         } | |
|     } | |
| ... | |
| } | |

TABLE 12

| | Descriptor |
|---|---|
| pic_parameter_set_rbsp( ) { | |
|   pps_pic_parameter_set_id | ue(v) |
|   pps_seq_parameter_set_id | ue(v) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++) | |
|         tile_column_width_minus1[ i ] | ue(v) |
|       for( i = 0; i < num tile_rows_minus1; | i++) |
|         tile_row_height_minus1[ i ] | ue(v) |
|     } | |
|     sub_tile_present_flag | u(1) |
|     if (sub_tile_present_flag) | |
|       uniform_subtile_spacing_flag[i] | u(1) |
|     for( j = 0; sub_tile_present_flag && j < NumofTiles; i++ ) { | |
|       sub_tile_split_flag[ji ] | u(1) |
|       num_subtile_row_minus1 | ue(v) |
|       if (uniform_subtile_spacing_flag) | |
|         subtile_rows_height_minus1 | ue(v) |
|       if( sub_tile_split_flag | |
| && !uniform_subtile_spacing_flag) { | |
|         num_sub_tile_columns_minus1[ j ] | ue(v) |
|         num_sub_tile_rows_minus1[ j ] | ue(v) |
|         for( i = 0; i < num_sub_tile_columns_minus1; i++ ) | |
|           sub_tile_column_width_minus1[ i ] | ue(v) |
|         for( i = 0; i < num sub_tile_rows_minus1; i++ ) | |
|           sub_tile_row_height_minus1[ i ] | ue(v) |
|       } | |
|     } | |
|     single_tile_per_tile_group_flag | u(1) |
|     if( !single_tile_per_tile_group_flag ) { | |
|       rect_tile_group_flag | u(1) |
|     } | |
|     if( rect_tile_group_flag | |
| && !single_tile_per_tile_group_flag ) { | |
|       num_tile_groups_in_pic_minus1 | ue(v) |
|       for( i = 0; i <= num_tile_groups_in_pic_minus1; i++ ) { | |
|         if( i > 0 ) | |
|           top_left_tile_idx[ i ] | u(v) |
|           bottom_right_tile_idx[ i ] | u(v) |
|       } | |
|     } | |
|     loop_filter_across_tiles_enabled_flag | u(1) |
|     if( loop_filter_across_tiles_enabled_flag ) | |
|       loop_filter_across_tile_groups_enabled_flag | u(1) |
|     } | |
|     if( rect_tile_group_flag ) { | |
|       signalled_tile_group_id_flag | u(1) |

TABLE 12-continued

| | Descriptor |
|---|---|
|       if( signalled_tile_group_id_flag ) { | |
|         signalled_tile_group_id_length_minus1 | ue(v) |
|         for( i = 0; i <= num_tile_groups_in_pic_minus1; i++ ) { | |
|           tile_group_id[ i ] | u(v) |
|         } | |
|       } | |
|     } | |
| ... | |
| } | |

As in Table 13, when a value of uniform_subtile_spacing_flag is 1, num_subtile_row_minus1, a flag representing the number of sub-tiles, may not be signaled. In this case, num_subtile_row_minus1 may be derived from subtile_rows_height_minus1.

TABLE 13

| | Descriptor |
|---|---|
| pic_parameter_set_rbsp( ) { | |
|   pps_pic_parameter_set id | ue(v) |
|   pps_seq_parameter_set_id | ue(v) |
|   single_tile_in_pic_flag | u(1) |
|   if( !single_tile_in_pic flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++) | |
|         tile_column_width_minus1[ i ] | ue(v) |
|       for( i = 0; i < num_tile_rows_minus1; i++) | |
|         tile_row_height_minus1[ i ] | ue(v) |
|     } | |
|     sub_tile_present_flag | u(1) |
|     if (sub_tile_present_flag) | |
|       uniform_subtile_spacing_flag[i] | u(1) |
|     for( j = 0; sub_tile_present_flag && j < NumofTiles; i++ ) { | |
|       sub_tile_split_flag[ji ] | u(1) |
|       if (sub_tile_split_flag && uniform_subtile_spacing_flag) | |
|         subtile_rows_height_minus1 | ue(v) |
|       if( sub_tile_split_flag | |
| && !uniform_subtile_spacing_flag) { | |
|         num_subtile_row_minus1 | |
|         num_sub_tile_columns_minus1[ j ] | ue(v) |
|         num_sub_tile_rows_minus1[ j ] | ue(v) |
|         for( i = 0; i < num_sub_tile_columns_minus1; i++ ) | |
|           sub_tile_column_width_minus1[ i ] | ue(v) |
|         for( i = 0; i < num_sub_tile_rows_minus1; i++ ) | |
|           sub _tile_row_height_minus1[ i ] | ue(v) |
|       } | |
|     } | |
|     single_tile_per tile_group_flag | u(1) |
|     if( !single_tile_per_tile_group_flag ) { | |
|       rect_tile_group_flag | u(1) |
|     } | |
|     if( rect_tile_group_flag | |
| && !single_tile_per tile_group_flag ) { | |
|       num_tile_groups_in_pic_minus1 | ue(v) |
|       for( i = 0; i <= num_tile_groups_in_pic minus1; i++) { | |
|         if( i > 0 ) | |
|           top_left_tile idx[ i ] | u(v) |
|           bottom_right_tile_idx[ i ] | u(v) |
|       } | |
|     } | |
|     loop_filter_across_tiles_enabled_flag | u(1) |
|     if( loop_filter across_tiles_enabled_flag ) | |
|       loop_filter_across_tile groups_enabled_flag | u(1) |
|     } | |

TABLE 13-continued

| | Descriptor |
|---|---|
| if( rect_tile_group_flag ) { | |
|   signalled_tile_group_id_flag | u(1) |
|   if( signalled_tile_group_id_flag ) { | |
|     signalled_tile_group_id_length_minus1 | ue(v) |
|     for( i = 0; i | |
| num_tile groups_in pic_minus1; i++) { | |
|       tile_group_id[ i ] | u(v) |
|     } | |
|   } | |
| } | |
| ... | |
| } | |

Concretely, for example, a value of num_subtile_row_minus1 may be derived as in Equation 23.

$$\text{num\_subtile\_row\_minus1} = \text{(TileWidth/subtile\_rows\_height\_minus1)} \quad \text{[Equation 23]}$$

As in Table 14, top_left_brick_idx and bottom_right_brick_idx, a flag representing a position of a sub-tile, may be signaled in a bitstream.

TABLE 14

| pic_parameter_set_rbsp( ) { | Descriptor |
|---|---|
| pps_pic_parameter_set_id | ue(v) |
| pps_seq_parameter_set_id | ue(v) |
| single_tile_in_pic_flag | u(1) |
| if( !single_tile_in_pic_flag ) { | |
|   num_tile_columns_minus1 | ue(v) |
|   num_tile_rows_minus1 | ue(v) |
|   uniform_tile_spacing_flag | u(1) |
|   if ( !uniform_tile_spacing_flag ) { | |
|     for ( i = 0; i < num_tile_columns_minus1; i++ ) | |
|       tile_column_width_minus1[ i ] | ue(v) |
|     for ( i = 0; i < num_tile_rows_minus1; i++ ) | |
|       tile_row_height_minus1[ i ] | ue(v) |
|   } | |
|   sub_tile_present_flag | u(1) |
|   if (sub_tile_present_flag) | |
|     uniform_subtile_spacing_flag[i] | u(1) |
|   for ( j = 0; sub_tile_present_flag && j < NumofTiles; i++ ) { | |
|     sub_tile_split_flag[ji ] | u(1) |
|     if (sub_tile_split_flag && uniform_subtile_spacing_flag) | |
|       subtile_rows_height_minus1 | ue(v) |
|     if( sub_tile_split_flag && !uniform_subtile_spacing_flag) { | |
|       num_subtile_row_minus1 | |
|       num_sub_tile_columns_minus1[ j ] | ue(v) |
|       num_sub_tile_rows_minus1[ j ] | ue(v) |
|       for ( i = 0; i < num_sub_tile_columns_minus1; i++ ) | |
|         sub_tile_column_width_minus1[ i ] | ue(v) |
|       for ( i = 0; i < num_sub_tile_rows_minus1; i++ ) | |
|         sub_tile_row_height_minus1[ i ] | ue(v) |
|     } | |
|   } | |
|   single_tile_per_tile_group_flag | u(1) |
|   if ( !single_tile_per_tile_group_flag ){ | |
|     rect_tile_group_flag | u(1) |
|   } | |
|   if( rect_tile_group_flag && !single_tile_per_tile_group_flag ) { | |
|     num_tile_groups_in_pic_minus1 | ue(v) |
|     for ( i = 0; i <= num_tile_groups_in_pic_minus1; i++ ) { | |
|       if( i > 0 ) { | |
|         top_left_tile_idx[ i ] | u(v) |
|       bottom_right_tile_idx[ i ] | u(v) |
|       for ( j= 0 ; j <= num_subtile_inTile; j++){ | |
|         if (j>0) | |
|           top_left_subtile_idx[j] | u(v) |
|         if (i != num_tile_groups_in_pic_minus1) | |
|           bottom_right_subtile_idx[j] | u(v) |
|       } | |
|     } | |
|   } | |
|   loop_filter_across_tiles_enabled_flag | u(1) |
|   if( loop_filter_across_tiles_enabled_flag ) | |
|     loop_filter_across_tile_groups_enabled_flag | u(1) |
| } | |
| if( rect_tile_group_flag ) { | |
|   signalled_tile_group_id_flag | u(1) |
|   if( signalled_tile_group_id_flag ) { | |
|     signalled_tile_group_id_length_minus1 | ue(v) |
|     for( i = 0; i <= num_tile_groups_in_pic_minus1; i++ ){ | |
|       tile_group_id[ i ] | u(v) |
|     } | |
|   } | |
| } | |
| ... | |
| } | |

As in the following Table 15, when it belongs to a sub-group belonging to a rectangular tile group and a value of uniform_subtile_spacing_flag is 1, at least any one of top_left_brick_idx and bottom_right_brick_idx may not be signaled.

TABLE 15

| pic_parameter_set_rbsp( ) { | Descriptor |
|---|---|
| pps_pic_parameter_set_id | ue(v) |
| pps_seq_parameter_set_id | ue(v) |
| single_tile_in_pic_flag | u(1) |
| if( !single_tile_in_pic_flag ) { | |
|   num_tile_columns_minus1 | ue(v) |
|   num_tile_rows_minus1 | ue(v) |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   sub_tile_present_flag | u(1) |
|   if (sub_tile_present_flag) | |
|     uniform_subtile_spacing_flag[i] | u(1) |
|   for ( j = 0; sub_tile_present_flag && j < NumofTiles; i++ ) { | |
|     sub_tile_split_flag[ji ] | u(1) |
|     if (sub_tile_split_flag && uniform_subtile_spacing_flag) | |
|       subtile_rows_height_minus1 | ue(v) |
|     if( sub_tile_split_flag && !uniform_subtile_spacing_flag) { | |
|       num_subtile_row_minus1 | |
|       num_sub_tile_columns_minus1[ j ] | ue(v) |
|       num_sub_tile_rows_minus1[ j ] | ue(v) |
|       for( i = 0; i < num_sub_tile_columns_minus1; i++ ) | |
|         sub_tile_column_width_minus1[ i ] | ue(v) |
|       for ( i = 0; i < num_sub_tile_rows_minus1; i++ ) | |
|         sub_tile_row_height_minus1[ i ] | ue(v) |
|     } | |
|   } | |
|   single_tile_per_tile_group_flag | u(1) |
|   if( !single_tile_per_tile_group_flag ){ | |

TABLE 15-continued

| pic_parameter_set_rbsp( ) { | Descriptor |
|---|---|
|     rect_tile_group_flag | u(1) |
| } | |
| if( rect_tile_group_flag | |
| && !single_tile_per_tile_group_flag ) { | |
|     num_tile_groups_in_pic_minus1 | ue(v) |
|     for( i = 0; i <= num_tile_groups_in_pic_minus1; i++ ) { | |
|         if( i > 0 ) | |
|             top_left_tile_idx[ i ] | u(v) |
|         bottom_right_tile_idx[ i ] | u(v) |
|         if ( !uniform_subtile_spacing_flag){ | |
|             for ( j= 0 ; j <= num_subtile_inTile; j++){ | |
|                 if (j>0) | |
|                     top_left_subtile_idx[j] | u(v) |
|                 if (i != num_tile_groups_in_pic_minus1) | |
|                     bottom_right_subtile_idx[j] | u(v) |
|             } | |
|         } | |
|     } | |
| } | |
| loop_filter_across_tiles_enabled_flag | u(1) |
| if( loop_filter_across_tiles_enabled_flag ) | |
|     loop_filter_across_tile_groups_enabled_flag | u(1) |
| } | |
| if( rect_tile_group_flag ) { | |
|     signalled_tile_group_id_flag | u(1) |
|     if( signalled_tile_group_id_flag ) { | |
|         signalled_tile_group_id_length_minus1 | ue(v) |
|         for( i = 0; i <= num_tile_groups_in_pic_minus1; i++ ) { | |
|             tile_group_id[ i ] | u(v) |
|         } | |
|     } | |
| } | |
| ... | |
| } | |

As in the following Table 16, when it belongs to a sub-group belonging to a rectangular tile group and a value of uniform_subtile_spacing_flag is 0, at least any one of top_left_brick_idx or bottom_right_brick_idx may not be signaled.

In this case, a value of top_left_tile_idx[i] may be derived as bottom_right_subtile_idx[j−1]+1.

TABLE 16

| pic_parameter_set_rbsp( ) { | Descriptor |
|---|---|
| pps_pic_parameter_set_id | ue(v) |
| pps_seq_parameter_set_id | ue(v) |
| single_tile_in_pic_flag | u(1) |
| if ( !single_tile_in_pic_flag ) { | |
|     num_tile_columns_minus1 | ue(v) |
|     num_tile_rows_minus1 | ue(v) |
|     uniform_tile_spacing_flag | u(1) |
|     if ( !uniform_tile_spacing_flag ) { | |
|         for ( i = 0; i < num_tile_columns_minus1; i++ ) | |
|             tile_column_width_minus1[ i ] | ue(v) |
|         for ( i = 0; i < num_tile_rows_minus1; i++ ) | |
|             tile_row_height_minus1[ i ] | ue(v) |
|     } | |
|     sub_tile_present_flag | u(1) |
|     if (sub_tile_present_flag) | |
|         uniform_subtile_spacing_flag[i] | u(1) |
|     for ( j = 0; sub_tile_present_flag && j < NumofTiles; i++ ) { | |
|         sub_tile_split_flag[ji ] | u(1) |
|         if ( sub_tile_split_flag && uniform_subtile_spacing_flag) | |
|             subtile_rows_height_minus1 | ue(v) |
|         if( sub_tile_split_flag && !uniform_subtile_spacing_flag) { | |
|             num_subtile_row_minus1 | |
|             num_sub_tile_columns_minus1[ j ] | ue(v) |

TABLE 16-continued

| pic_parameter_set_rbsp( ) { | Descriptor |
|---|---|
|             num_sub_tile_rows_minus1[ j ] | ue(v) |
|         for( i = 0; i < num_sub_tile_columns_minus1; i++ ) | |
|             sub_tile_column_width_minus1[ i ] | ue(v) |
|         for( i = 0; i < num_sub_tile_rows_minus1; i++ ) | |
|             sub_tile_row_height_minus1[ i ] | ue(v) |
|         } | |
|     } | |
| single_tile_per_tile_group_flag | u(1) |
| if( !single_tile_per_tile_group_flag ) { | |
|     rect_tile_group_flag | u(1) |
| } | |
| if( rect_tile_group_flag | |
| && !single_tile_per_tile_group_flag ) { | |
|     num_tile_groups_in_pic_minus1 | ue(v) |
|     for ( i = 0; i <= num_tile_groups_in_pic_minus1; i++ ) { | |
|         if( i > 0 ) | |
|             top_left_tile_idx[ i ] | u(v) |
|         bottom_right_tile_idx[ i ] | u(v) |
|         if (!uniform_subtile_spacing_flag){ | |
|             for ( j= 0 ; j <= num_subtile_inTile; j ++){ | |
|                 if (i != num_tile_groups_in_pic_minus1) | |
|                     bottom_right_subtile_idx[j] | u(v) |
|             } | |
|         } | |
|     } | |
| } | |
| loop_filter_across_tiles_enabled_flag | u(1) |
| if( loop_filter_across_tiles_enabled_flag ) | |
|     loop_filter_across_tile_groups_enabled_flag | u(1) |
| } | |
| if( rect_tile_group_flag ) { | |
|     signalled_tile_group_id_flag | u(1) |
|     if( signalled_tile_group_id_flag ) { | |
|         signalled_tile_group_id_length_minus1 | ue(v) |
|         for ( i = 0; i <= num_tile_groups_in_pic_minus1; i++ ){ | |
|             tile_group_id[ i ] | u(v) |
|         } | |
|     } | |
| } | |
| ... | |
| } | |

A width of a sub-tile set in a vertical direction in a current tile may be set to be smaller than a width of a tile set in a vertical direction to which a current tile belongs. In other words, a width of a sub-tile set in a vertical direction in a current tile may not be set to be the same as or greater than a width of a tile set in a vertical direction to which a current tile belongs.

In addition, a width of a sub-tile set in a horizontal direction in a current tile may be set to be smaller than a width of a tile set in a horizontal direction to which a current tile belongs. In other words, a width of a sub-tile set in a horizontal direction in a current tile may not be set to be the same as or greater than a width of a tile set in a horizontal direction to which a current tile belongs.

As in FIG. 54, all tiles in a tile group may have a sub-tile. isAll_subtile_flag, a syntax representing whether all tiles in a tile group have a sub-tile, may be signaled in a bitstream. When a value of isAll_subtile_flag is 1, it represents that a sub-tile exists in all tiles in a tile group. When a value of isAll_subtile_flag is 0, it represents that at least one tile without a sub-tile exists in a tile group. Information on a tile and a sub-tile may be signaled by using a syntax table as in the following Table 17.

TABLE 17

| pic_parameter_set_rbsp( ) { | Descriptor |
|---|---|
| pps_pic_parameter_set_id | ue(v) |
| pps_seq_parameter_set_id | ue(v) |
| single_tile_in_pic_flag | u(1) |
| if( !single_tile_in_pic_flag ) { | |
|   num_tile_columns_minus1 | ue(v) |
|   num_tile_rows_minus1 | ue(v) |
|   uniform_tile_spacing_flag | u(1) |
|   if( !uniform_tile_spacing_flag ) { | |
|     for( i = 0; i < num_tile_columns_minus1; i++ ) | |
|       tile_column_width_minus1[ i ] | ue(v) |
|     for( i = 0; i < num_tile_rows_minus1; i++ ) | |
|       tile_row_height_minus1[ i ] | ue(v) |
|   } | |
|   single_tile_per_tile_group_flag | u(1) |
|   if( !single_tile_per_tile_group_flag ){ | |
|     rect_tile_group_flag | u(1) |
|     sub_tile_present_flag | u(1) |
|     sub_tile_present_inTG_flag | u(1) |
|   } | |
|   if( rect_tile_group_flag | |
| && !single_tile_per_tile_group_flag ) { | |
|     num_tile_groups_in_pic_minus1 | ue(v) |
|     for( i = 0; i <= num_tile_groups_in_pic_minus1; i++ ) { | |
|       if( i > 0 ) | |
|         top_left_tile_idx[ i ] | u(v) |
|       bottom_right_tile_idx[ i ] | u(v) |
|     } | |
|   } | |
|   loop_filter_across_tiles_enabled_flag | u(1) |
|   if( loop_filter_across_tiles_enabled_flag ) | |
|     loop_filter_across_tile_groups_enabled_flag | u(1) |
| } | |
| if( rect_tile_group_flag ) { | |
|   signalled_tile_group_id_flag | u(1) |
|   if( signalled_tile_group_id_flag ) { | |
|     signalled_tile_group_id_length_minus1 | ue(v) |
|     for( i = 0; i <= num_tile_groups_in_pic_minus1; i++ ){ | |
|       tile_group_id[ i ] | u(v) |
|       if (sub_tile_present_inTG_flag){ | |
|         uniform_subtile_spacing_flag[i] | u(v) |
|         isAll_subtile_flag | u(v) |
|       } | |
|     } | |
|   } | |
| } | |
| for( j = 0; sub_tile_present_inTG_flag && j < NumofTiles; i++ ) { | |
|   if (!isAll_subtile_flag) | |
|     sub_tile_split_flag[ji ] | u(1) |
|   if( sub_tile_split_flag || isAll_subtile_flag) | |
| { | |
|     num_sub_tile_columns_minus1[ j ] | ue(v) |
|     num_sub_tile_rows_minus1[ j ] | ue(v) |
|     for( i = 0; !uniform_subtile_spacing_flag && i < num_sub_tile_columns_minus1; i++ ) | |
|       sub_tile_column_width_minus1[ i ] | ue(v) |
|     for( i = 0; i < num_sub_tile_rows_minus1; i++ ) | |
|       sub_tile_row_height_minus1[ i ] | ue(v) |
|     } | |
|   } | |
| } | |
| ... | |

Generally, one tile may be configured with a plurality of CTUs. In this case, excluding a tile adjacent to a right/bottom boundary of a picture, a tile may not include a region smaller than a CTU. In other words, a boundary of a tile may be set the same as that of a CTU. Tiles adjacent to a right and left boundary of a picture may exceptionally include a region smaller than a CTU.

For example, when uniform_tile_spacing_flag is 1, a right boundary of a first tile may be set as a right boundary of a third CTU column (CTU 2, CTU 9).

However, in this case, a problem that a size of each tile is different occurs. In an example, in the left picture of FIG. 55, a size of a first tile is different from a tile adjacent to the right of a picture and a tile adjacent to the bottom of a picture.

Accordingly, a size of each tile may be adjusted to be more uniform by allowing a tile smaller than a CTU size. It is defined as a flexible size tile.

For example, when uniform_tile_spacing_flag is 1, as in the right picture of FIG. 55, partitioning may be performed so that a region smaller than a CTU will belong to a tile. A region smaller than a CTU belonging to a tile is referred to as a minimum unit tile region. A sub-tile in a tile may be set to be greater than or the same as a CTU. When a flexible size tile is used, a sub-tile smaller than a CTU may be used.

A variety of embodiments of the present disclosure do not enumerate all possible combinations, but are to describe the representative aspect of the present disclosure, and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for encoding/decoding a video.

What is claimed is:

1. An image decoding method, comprising:
generating a prediction block of a current block based on a pre-defined prediction mode;
generating a residual block of the current block based on a predetermined transform type; and
reconstructing the current block based on the prediction block and the residual block,
wherein when the pre-defined prediction mode is a merge mode, generating the prediction block comprises:
generating a merge candidate list of the current block;
deriving motion information of the current block based on the merge candidate list and a merge index of the current block; and
performing inter prediction of the current block based on the derived motion information,
wherein the merge candidate list includes at least one of a spatial merge candidate or a temporal merge candidate,
wherein a merge candidate from a motion information list is additionally inserted into the merge candidate list, and
wherein the motion information list is configured with motion information of one or more blocks which are decoded before the current block.

2. The method of claim 1, wherein the motion information list is updated based on the motion information of the current block only when the current block is a block having a last decoding order in a parallel merge region.

3. The method of claim 2, wherein the parallel merge region refers to a region which is configured with a plurality of coding blocks which are decoded independently of each other.

4. The method of claim 1, wherein the motion information of the current block includes at least one of a motion vector, a reference picture index, or prediction direction information, and
wherein performing the motion compensation of the current block comprises modifying the motion vector of the current block based on a predetermined difference motion vector (MVD).

5. The method of claim 4, wherein the difference motion vector includes a first difference motion vector in a first direction ($MVD_{L0}$) and a second difference motion vector in a second direction ($MVD_{L1}$), and
wherein the second difference motion vector in the second direction is set as a vector which has a same size as and a direction opposite to the first difference motion vector in the first direction.

6. The method of claim 4, wherein the motion vector is modified based on an encoding parameter of the current block, and
wherein the encoding parameter includes at least one of a prediction mode, the motion information, or a size of the current block.

7. The method of claim 1, wherein the transform type is determined based on information which is explicitly signaled from an encoding device and a table which is pre-defined in a decoding device.

8. The method of claim 1, wherein the transform type is implicitly derived based on at least one of a size, a shape, an intra prediction mode, or a component type of the current block.

9. An image encoding method, comprising:
generating a prediction block of a current block based on a pre-defined prediction mode;
generating a residual block of the current block based on the prediction block; and
encoding residual data of the residual block, wherein when the pre-defined prediction mode is a merge mode, generating the prediction block comprises:
generating a merge candidate list of the current block;
determining motion information of the current block from the merge candidate list; and
performing inter prediction of the current block based on the determined motion information,
wherein the merge candidate list includes at least one of a spatial merge candidate or a temporal merge candidate,
wherein a merge candidate from a motion information list is additionally inserted into the merge candidate list, and
wherein the motion information list is configured with motion information of one or more blocks which are encoded before the current block.

10. A computer readable recoding medium storing a bitstream encoded by an image encoding method, the image encoding method comprising:
generating a prediction block of a current block based on a pre-defined prediction mode;
generating a residual block of the current block based on the prediction block; and
encoding residual data of the residual block,
wherein when the pre-defined prediction mode is a merge mode, generating the prediction block comprises:
generating a merge candidate list of the current block;
determining motion information of the current block based on the merge candidate list; and
performing inter prediction of the current block based on the determined motion information,
wherein the merge candidate list includes at least one of a spatial merge candidate or a temporal merge candidate,
wherein a merge candidate from a motion information list is additionally inserted into the merge candidate list, and
wherein the motion information list is configured with motion information of one or more blocks which are encoded before the current block.

* * * * *